(12) United States Patent
Nagahama

(10) Patent No.: US 12,155,078 B2
(45) Date of Patent: Nov. 26, 2024

(54) BATTERY PACK

(71) Applicant: MAKITA CORPORATION, Anjo (JP)

(72) Inventor: Tatsuya Nagahama, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 17/036,435

(22) Filed: Sep. 29, 2020

(65) Prior Publication Data

US 2021/0098757 A1 Apr. 1, 2021

(30) Foreign Application Priority Data

Sep. 30, 2019 (JP) ................................. 2019-180792
Sep. 30, 2019 (JP) ................................. 2019-180793
Sep. 30, 2019 (JP) ................................. 2019-180795

(51) Int. Cl.
*H01M 10/42* (2006.01)
*H01M 50/10* (2021.01)
*H01M 50/213* (2021.01)
*H01M 50/30* (2021.01)
(Continued)

(52) U.S. Cl.
CPC ....... *H01M 50/213* (2021.01); *H01M 10/425* (2013.01); *H01M 50/10* (2021.01); *H01M 50/394* (2021.01); *H01M 50/543* (2021.01); *H01M 50/572* (2021.01); *H01M 2220/30* (2013.01)

(58) Field of Classification Search
CPC ........... H01M 10/425; H01M 10/6562; H01M 50/213; H01M 50/247; H01M 50/10; H01M 50/202; H01M 50/204; H01M 50/233; H01M 50/242; H01M 50/244; H01M 50/262; H01M 50/284; H01M 2220/30
See application file for complete search history.

(56) References Cited

U.S. PATENT DOCUMENTS

| 5,558,949 | A | 9/1996 | Iwatsuki et al. |
| 5,661,392 | A | 8/1997 | Imazeki |
| 6,227,322 | B1 | 5/2001 | Nishikawa |

(Continued)

FOREIGN PATENT DOCUMENTS

| CN | 102306721 A | 1/2012 |
| CN | 202924141 U | 5/2013 |

(Continued)

OTHER PUBLICATIONS

Extended European Search Report from the European Patent Office dated Feb. 23, 2021 in related application No. EP 20198597, including European Search Opinion and examined claims 1-15.

(Continued)

*Primary Examiner* — Brian R Ohara
*Assistant Examiner* — Brent C Thomas
(74) *Attorney, Agent, or Firm* — J-TEK LAW PLLC; Jeffrey D. Tekanic; Scott T. Wakeman

(57) ABSTRACT

A battery pack (2; 602) includes: an outer case (12; 612), which comprises an upper-part case (14) and a lower-part case (15; 615) fixed to the upper-part case (14); at least one battery cell (90*a*-90*j*); and a cell case (80), which houses the battery cell(s) (90*a*-90*j*). A clearance (C11-C13) is provided between the lower-part case (15; 615) and the entire lower surface of the cell case (80).

24 Claims, 38 Drawing Sheets

(51) Int. Cl.
    *H01M 50/543*  (2021.01)
    *H01M 50/572*  (2021.01)

(56) References Cited

U.S. PATENT DOCUMENTS

| | | | |
|---|---|---|---|
| 6,350,149 | B1 | 2/2002 | Nakane |
| 6,627,345 | B1 | 9/2003 | Zemlok et al. |
| 8,684,106 | B2 | 4/2014 | Hanawa et al. |
| 9,318,729 | B2 | 4/2016 | Ogura |
| 9,601,729 | B2 | 3/2017 | Naito |
| 9,847,562 | B2 | 12/2017 | Kondo |
| 10,348,110 | B2 | 7/2019 | Kondo et al. |
| 2004/0081885 | A1 | 4/2004 | Ziegler et al. |
| 2005/0287426 | A1 | 12/2005 | Kim et al. |
| 2006/0091858 | A1 | 5/2006 | Johnson et al. |
| 2006/0110656 | A1 | 5/2006 | Moores et al. |
| 2008/0061738 | A1 | 3/2008 | Hanawa et al. |
| 2008/0084181 | A1 | 4/2008 | Griffin |
| 2008/0102355 | A1 | 5/2008 | Moores et al. |
| 2008/0286642 | A1 | 11/2008 | Naito et al. |
| 2009/0229957 | A1 | 9/2009 | Nishimiya et al. |
| 2009/0246615 | A1 | 10/2009 | Park |
| 2010/0092850 | A1 | 4/2010 | Ueda et al. |
| 2010/0112435 | A1 | 5/2010 | Hanawa et al. |
| 2010/0156350 | A1 | 6/2010 | Murayama et al. |
| 2010/0248016 | A1 | 9/2010 | Hanawa et al. |
| 2011/0005793 | A1 | 1/2011 | Hanawa et al. |
| 2011/0025269 | A1 | 2/2011 | Funabashi et al. |
| 2011/0250476 | A1 | 10/2011 | Taga |
| 2011/0250780 | A1 | 10/2011 | Fukumoto et al. |
| 2011/0253402 | A1 | 10/2011 | Aradachi et al. |
| 2011/0293998 | A1 | 12/2011 | Sato et al. |
| 2012/0045667 | A1 | 2/2012 | Yoneda et al. |
| 2012/0045671 | A1 | 2/2012 | Miller et al. |
| 2012/0100400 | A1 | 4/2012 | Kang et al. |
| 2012/0127676 | A1 | 5/2012 | Warmuth et al. |
| 2013/0143452 | A1 | 6/2013 | Yoshikawa |
| 2013/0224539 | A1 | 8/2013 | Hayashi et al. |
| 2013/0230757 | A1 | 9/2013 | Sakakibara |
| 2014/0106195 | A1 | 4/2014 | Milbourne et al. |
| 2014/0248519 | A1 | 9/2014 | Nishikawa et al. |
| 2014/0302353 | A1* | 10/2014 | Ogura ............... H01M 50/213 429/7 |
| 2014/0302376 | A1 | 10/2014 | Naito |
| 2014/0302377 | A1 | 10/2014 | Naito |
| 2015/0075831 | A1 | 3/2015 | Hanawa et al. |
| 2015/0249237 | A1 | 9/2015 | Naito |
| 2015/0325826 | A1 | 11/2015 | Verhaag et al. |
| 2016/0006005 | A1 | 1/2016 | Sakakibara |
| 2016/0240901 | A1 | 8/2016 | Kondo |
| 2016/0241065 | A1 | 8/2016 | Kondo et al. |
| 2016/0329532 | A1 | 11/2016 | Nishimura et al. |
| 2017/0187010 | A1 | 6/2017 | Hayashi et al. |
| 2018/0130980 | A1 | 5/2018 | Ogura et al. |
| 2018/0241017 | A1 | 8/2018 | Nakamura et al. |
| 2018/0262150 | A1 | 9/2018 | White et al. |
| 2019/0259984 | A1 | 8/2019 | Nishikawa et al. |
| 2019/0280501 | A1 | 9/2019 | Kondo et al. |
| 2020/0203682 | A1* | 6/2020 | Bannai ............... H01M 10/0525 |
| 2021/0098755 | A1 | 4/2021 | Nagahama et al. |
| 2021/0098756 | A1 | 4/2021 | Naito et al. |

FOREIGN PATENT DOCUMENTS

| | | |
|---|---|---|
| CN | 104103783 A | 10/2014 |
| CN | 104600236 A | 5/2015 |
| CN | 107068922 A | 8/2017 |
| CN | 207416528 U | 5/2018 |
| EP | 1548859 A2 | 6/2005 |
| EP | 2830122 B1 | 2/2016 |
| JP | H08115712 A | 5/1996 |
| JP | H11288744 A | 10/1999 |
| JP | 2000164182 A | 6/2000 |
| JP | 2001256940 A | 9/2001 |
| JP | 2003217537 A | 7/2003 |
| JP | 2005026190 A | 1/2005 |
| JP | 2005209369 A | 8/2005 |
| JP | 2007172981 A | 7/2007 |
| JP | 2010050044 A | 3/2010 |
| JP | 2011222171 A | 11/2011 |
| JP | 2011222459 A | 11/2011 |
| JP | 2013114782 A | 6/2013 |
| JP | 2013191288 A | 9/2013 |
| JP | 2014170635 A | 9/2014 |
| JP | 2014175193 A | 9/2014 |
| JP | 2014203660 A | 10/2014 |
| JP | 2014203661 A | 10/2014 |
| JP | 2014203703 A | 10/2014 |
| JP | 2016018604 A | 2/2016 |
| JP | 2016018605 A | 2/2016 |
| JP | 2016149841 A | 8/2016 |
| JP | 2016207517 A | 12/2016 |
| JP | 2017188300 A | 10/2017 |
| JP | 2018054000 A | 4/2018 |
| JP | 2018063913 A | 4/2018 |
| JP | 2018106796 A | 7/2018 |
| KR | 200484087 Y1 | 7/2017 |
| WO | 2006067919 A2 | 6/2006 |
| WO | 2013140951 A1 | 9/2013 |
| WO | 2017073201 A1 | 5/2017 |
| WO | 2017126285 A1 | 7/2017 |
| WO | 2017221536 A1 | 12/2017 |
| WO | 2019044069 A1 | 3/2019 |

OTHER PUBLICATIONS

Extended European Search Report from the European Patent Office dated Feb. 24, 2021 in related application No. EP 20 198 595, including European Search Opinion and examined claims 1-15.
Office Action from the United States Patent Office mailed Dec. 22, 2021 in related U.S. Appl. No. 17/036,356, including examined claims 1-20.
Office Action from the United States Patent Office mailed Dec. 23, 2021 in related U.S. Appl. No. 17/036,411, including examined claims 1-19.
Unpublished U.S. Appl. No. 17/036,356.
Unpublished U.S. Appl. No. 17/036,411.
Office Action mailed Jun. 17, 2022, in U.S. Appl. No. 17/036,411.
Office Action from the Japanese Patent Office dispatched Apr. 19, 2023 in counterpart Japanese application No. JP2019-180793, and machine translation thereof.
Office Action from the Japanese Patent Office dispatched Apr. 4, 2023 in counterpart Japanese application No. JP2019-180792, and machine translation thereof.
Office Action from the Japanese Patent Office dispatched Apr. 4, 2023 in counterpart Japanese application No. JP2019-180795, and machine translation thereof.
Search Report from the Japanese Patent Office dated Mar. 22, 2023 in counterpart Japanese application No. 2019-180793, and machine translation thereof.
Search Report from the Japanese Patent Office dated Mar. 29, 2023 in counterpart Japanese application No. 2019-180792, and machine translation thereof.
Search Report from the Japanese Patent Office dated Mar. 29, 2023 in counterpart Japanese application No. 2019-180795, and machine translation thereof.
Office Action from the United States Patent Office mailed May 17, 2022 in related U.S. Appl. No. 17/036,356, Including examined claims 1-3, 5-19 and 21-22.
Office Action and Search Report from the Chinese Patent Office dispatched Nov. 16, 2023 in counterpart application No. 202010862538.9, and machine translation thereof.
Office Action and Search Report from the Chinese Patent Office dispatched Nov. 20, 2023 in counterpart application No. 202010863135.6, and machine translation thereof.
Office Action from the United States Patent Office mailed May 17, 2024 in related U.S. Appl. No. 17/036,356, including examined claims 1-3, 5-11, 13-19, and 21-26.

(56) References Cited

OTHER PUBLICATIONS

Office Action from the Chinese Patent Office dispatched Mar. 19, 2024, in counterpart application No. 202010862538.9, and translation thereof.
Office Action from the Chinese Patent Office dispatched Mar. 21, 2024, in counterpart application No. 202010863135.6, and translation thereof.

* cited by examiner

FIG. 1C
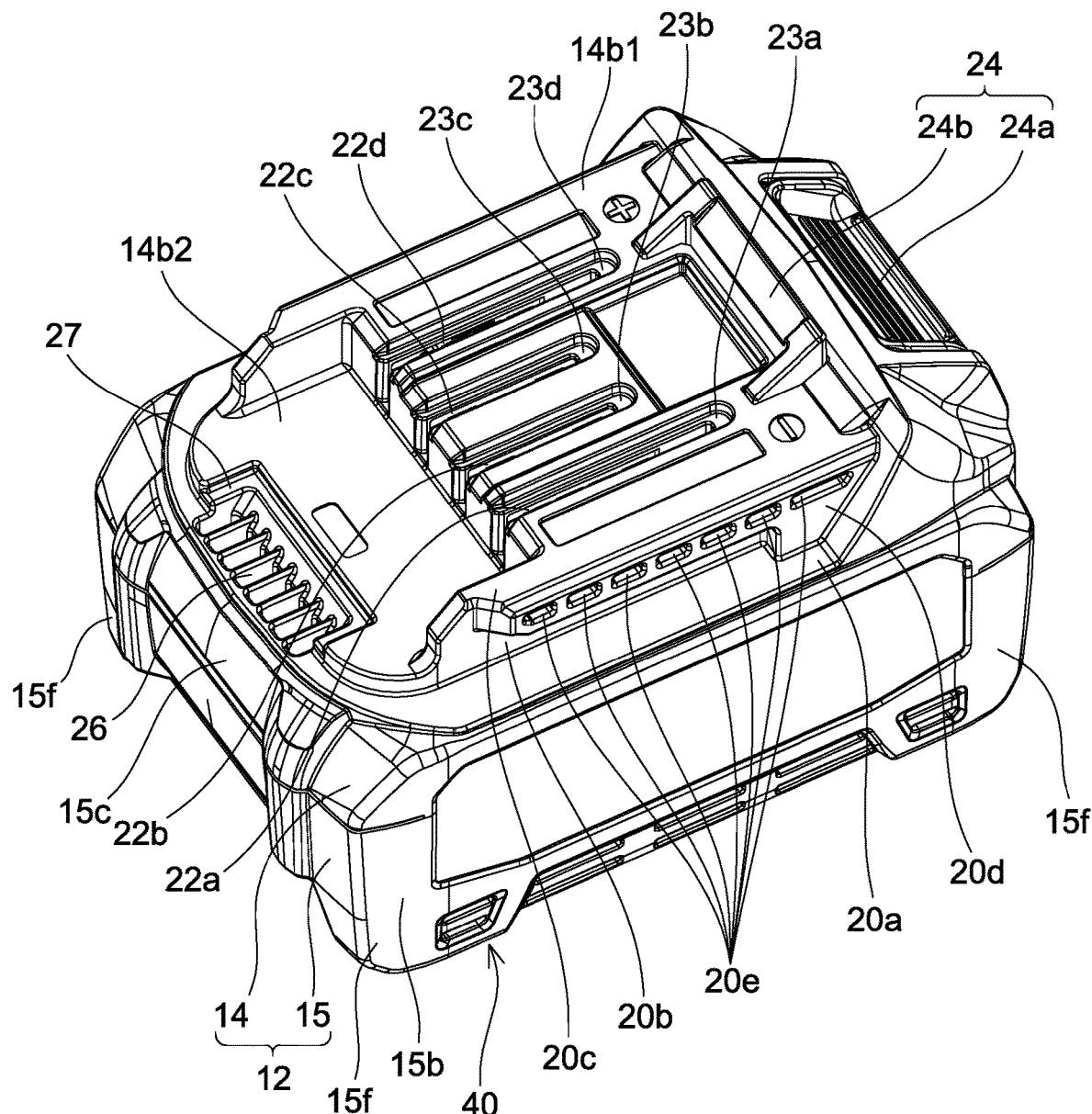
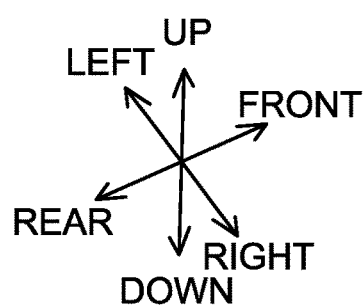

FIG. 3
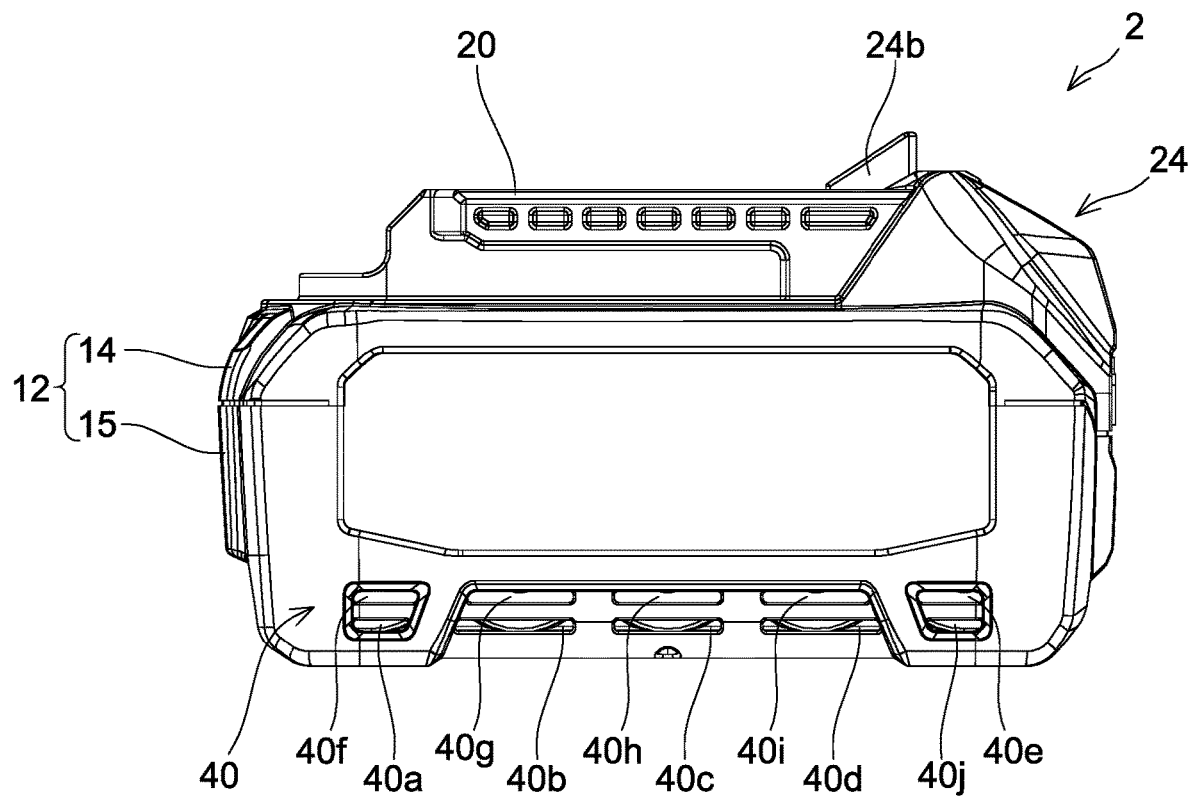
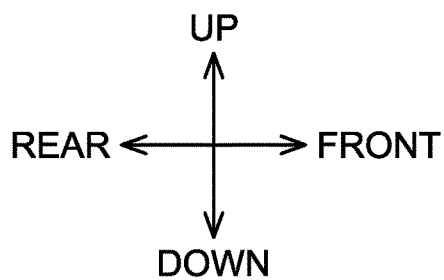

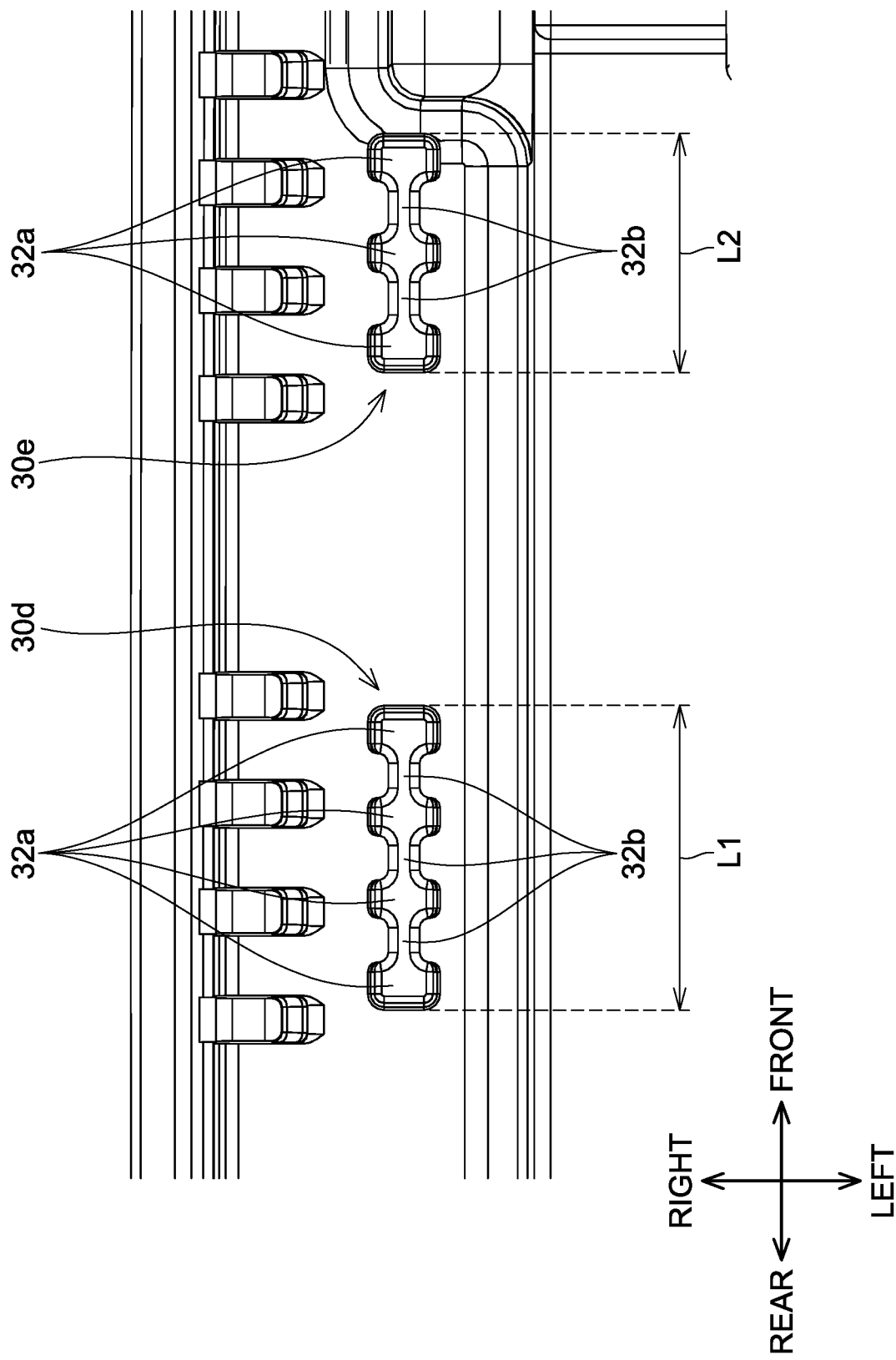

FIG. 7
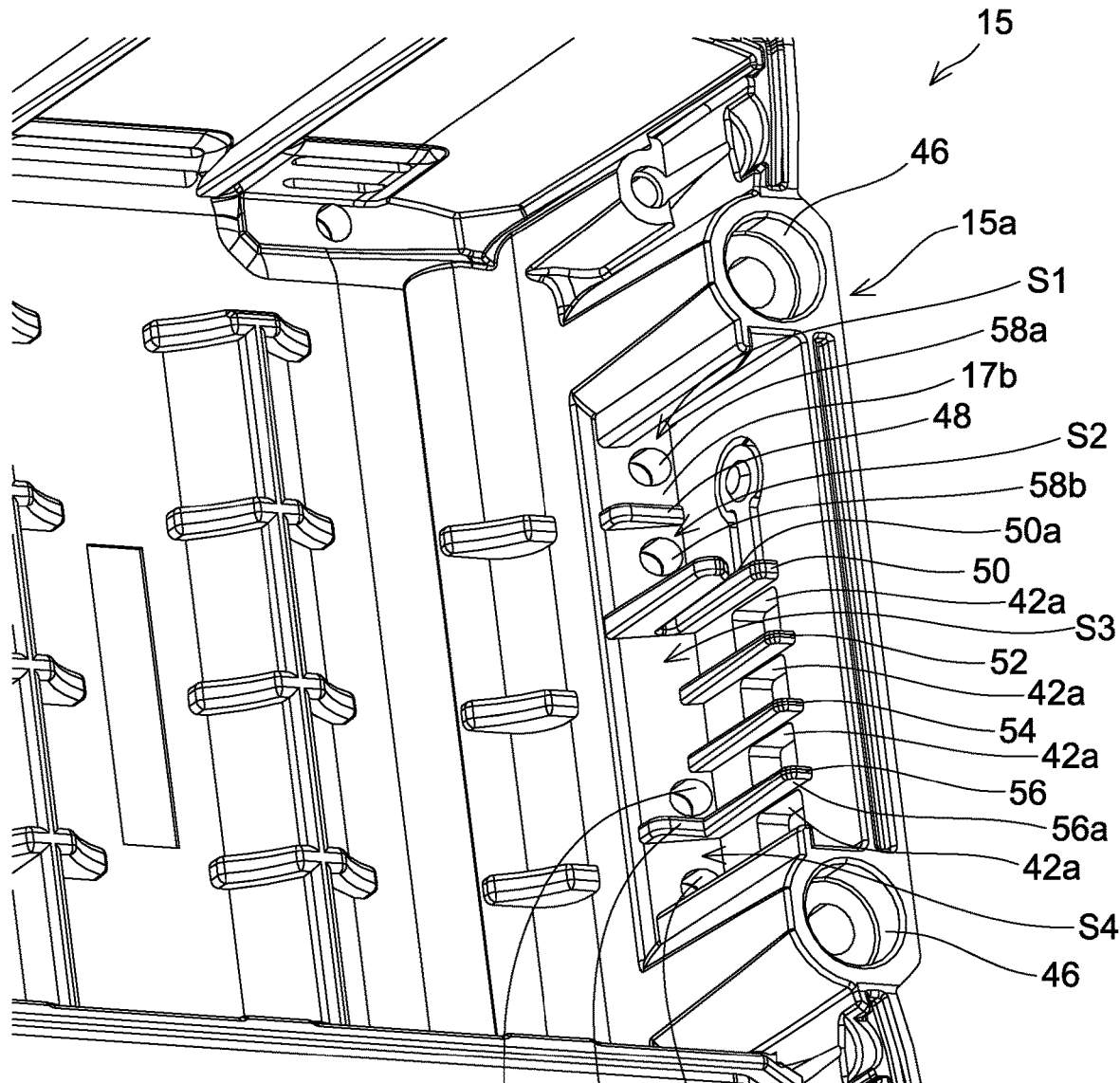
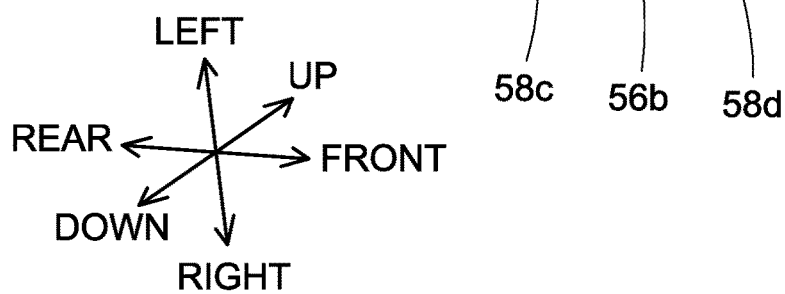

FIG. 11C
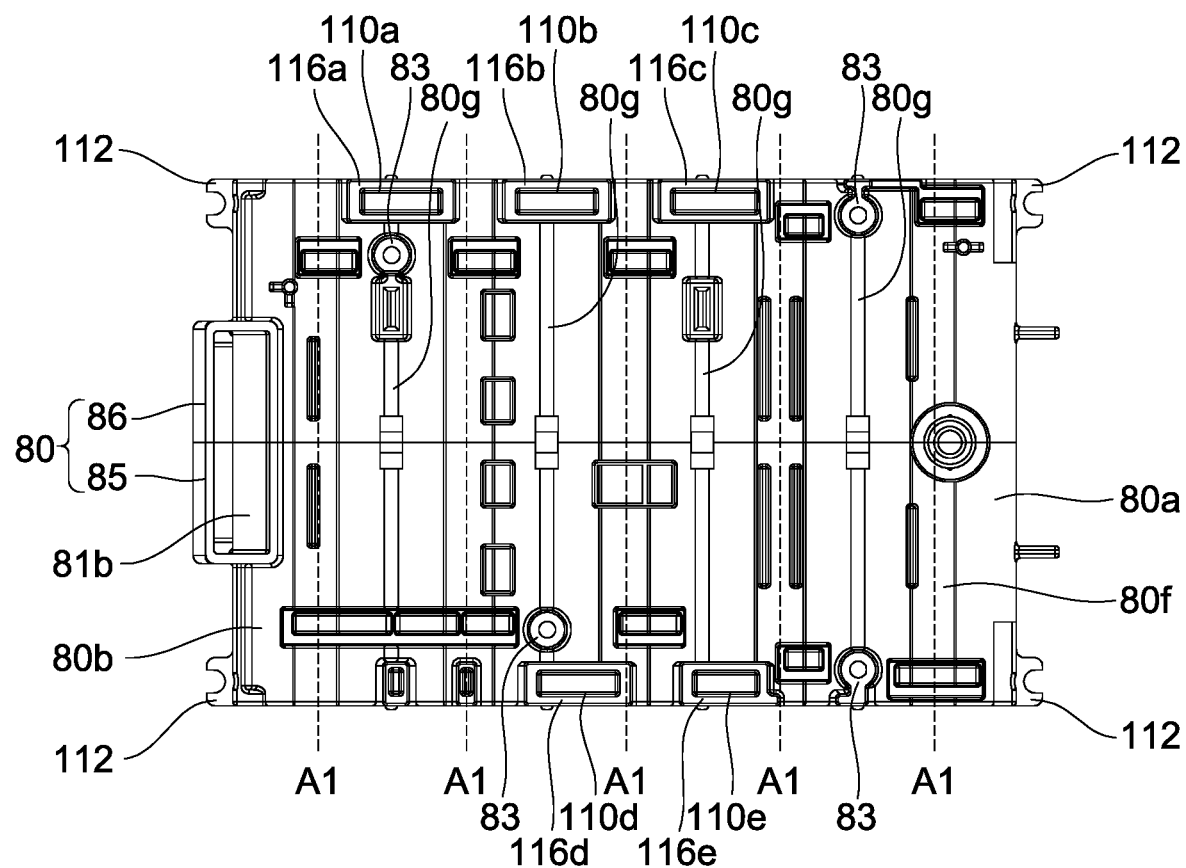
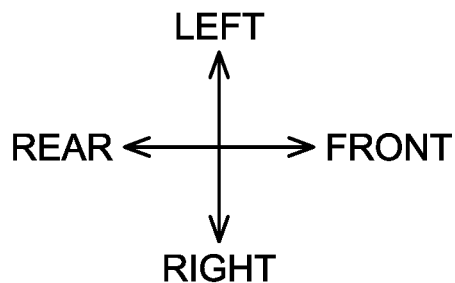

FIG. 12B
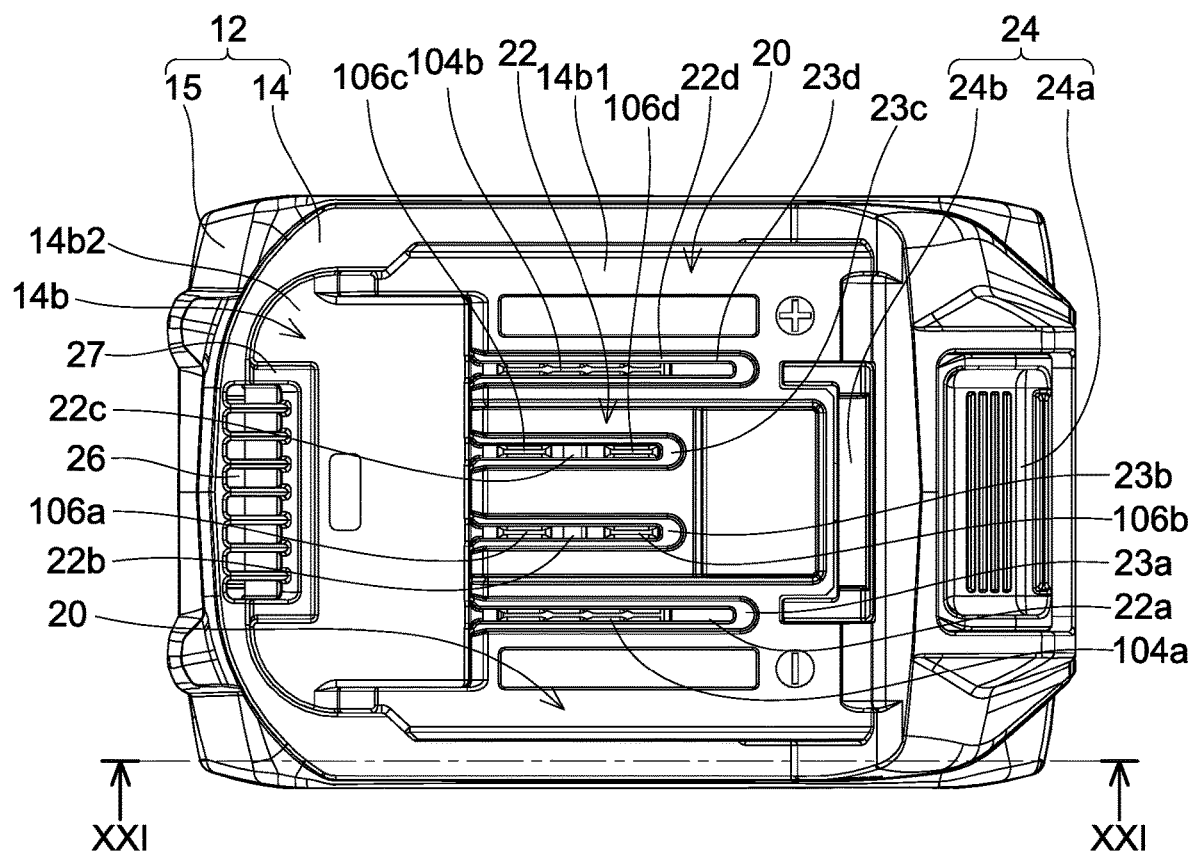
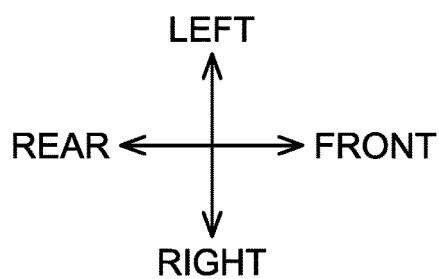

FIG. 15
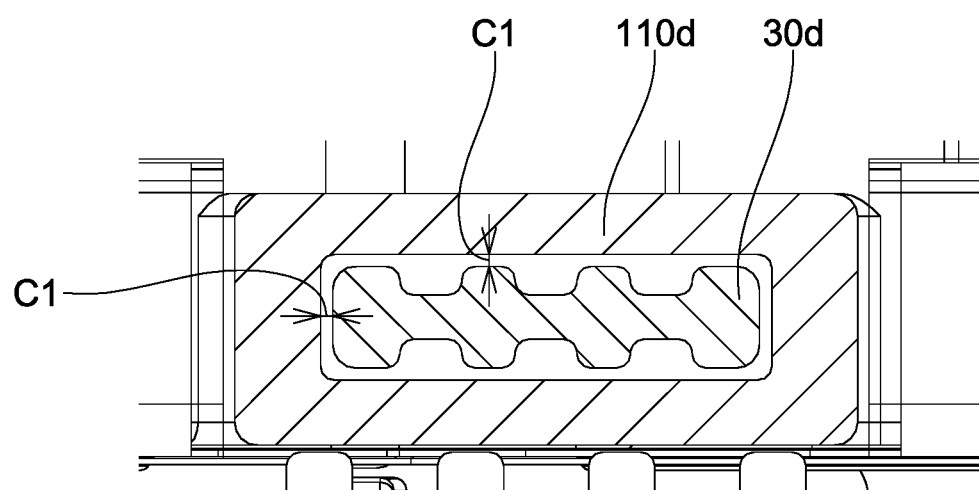
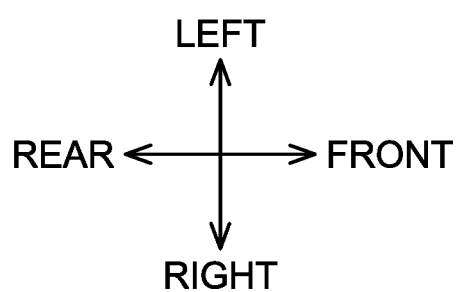

FIG. 20
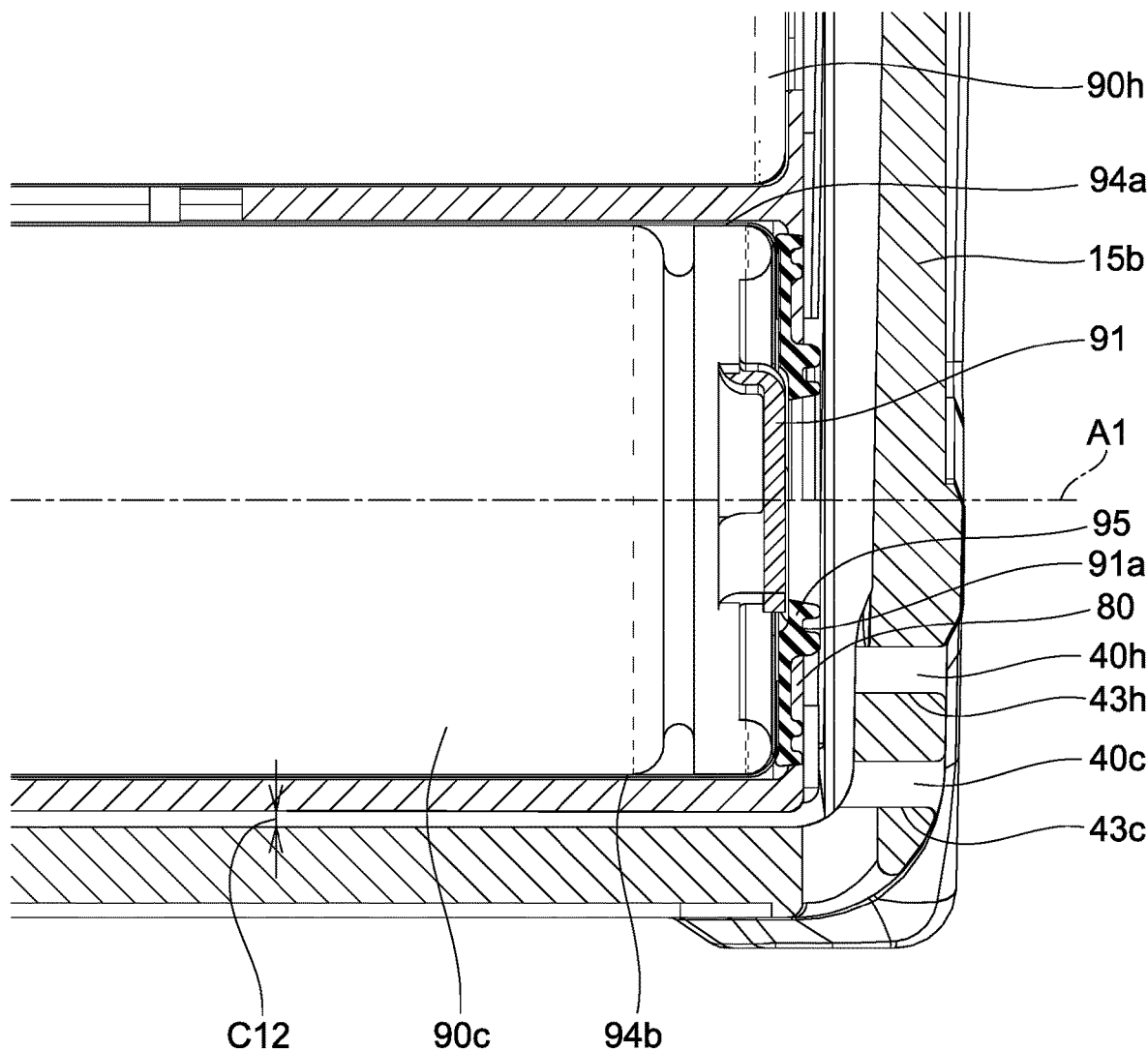
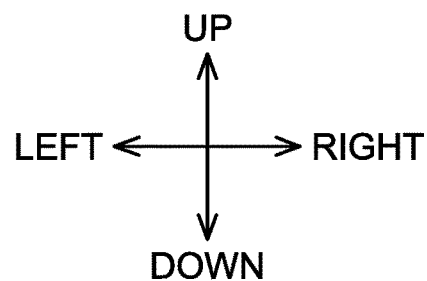

FIG. 22
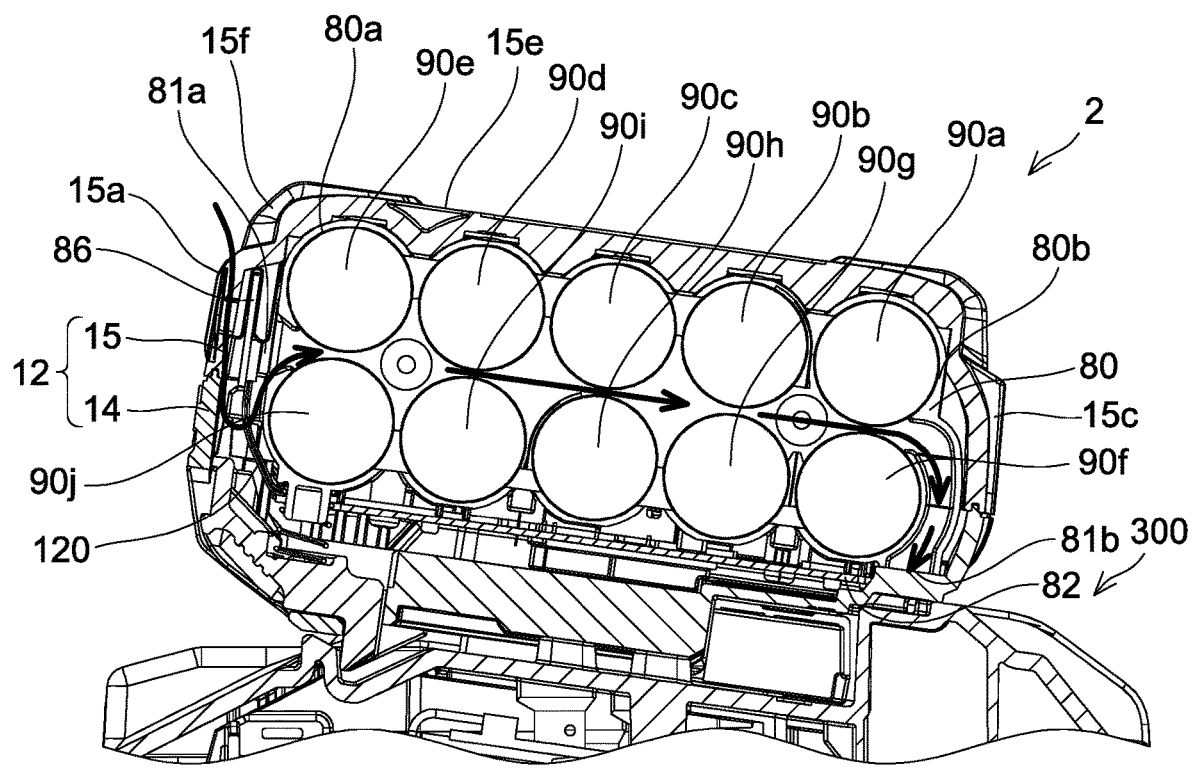
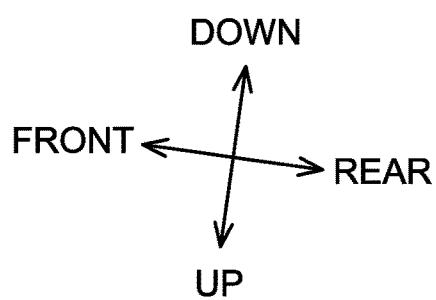

FIG. 23
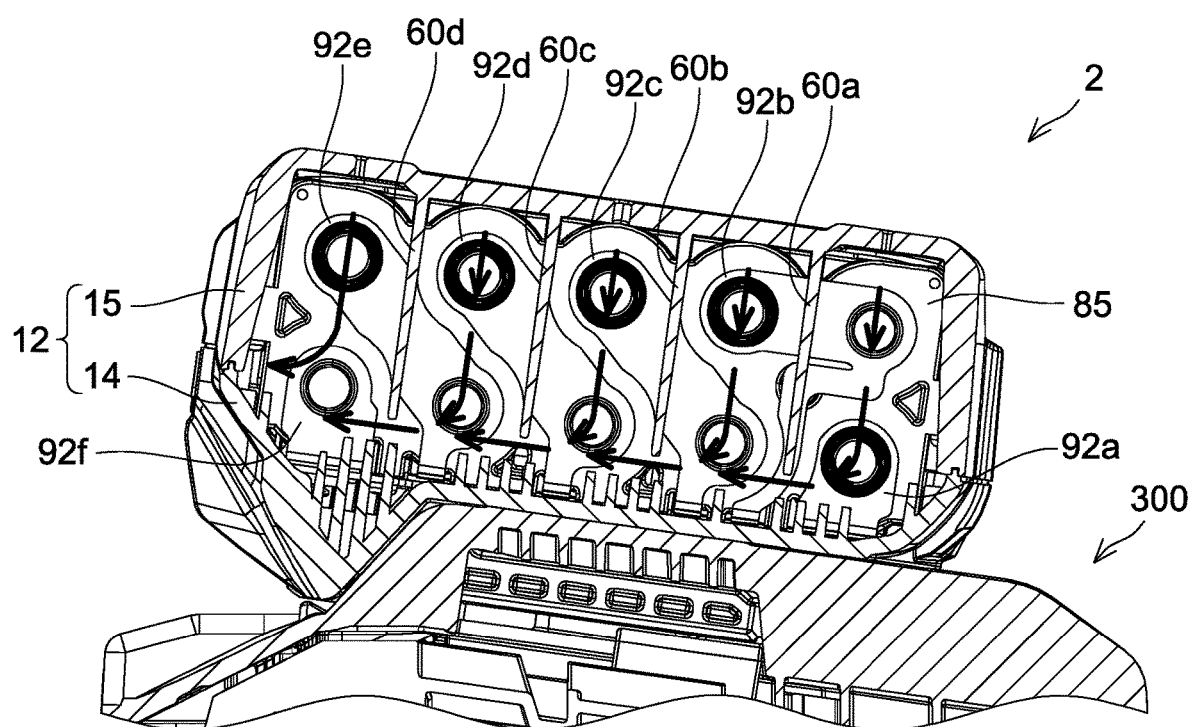
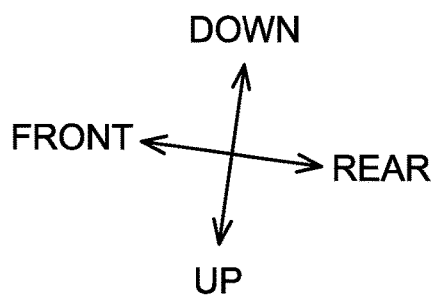

FIG. 24A
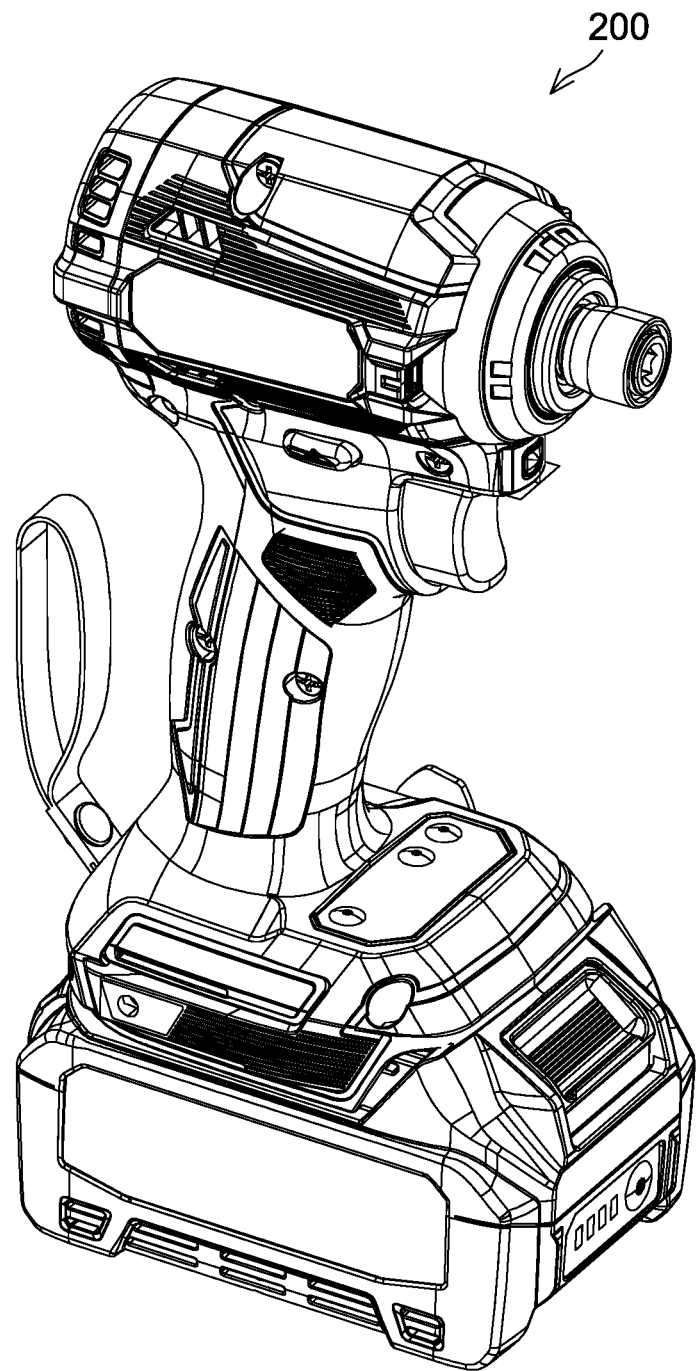
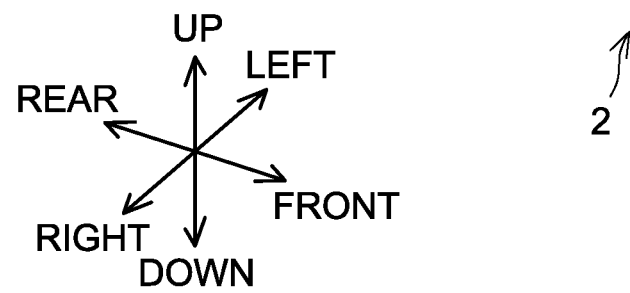

FIG. 25A
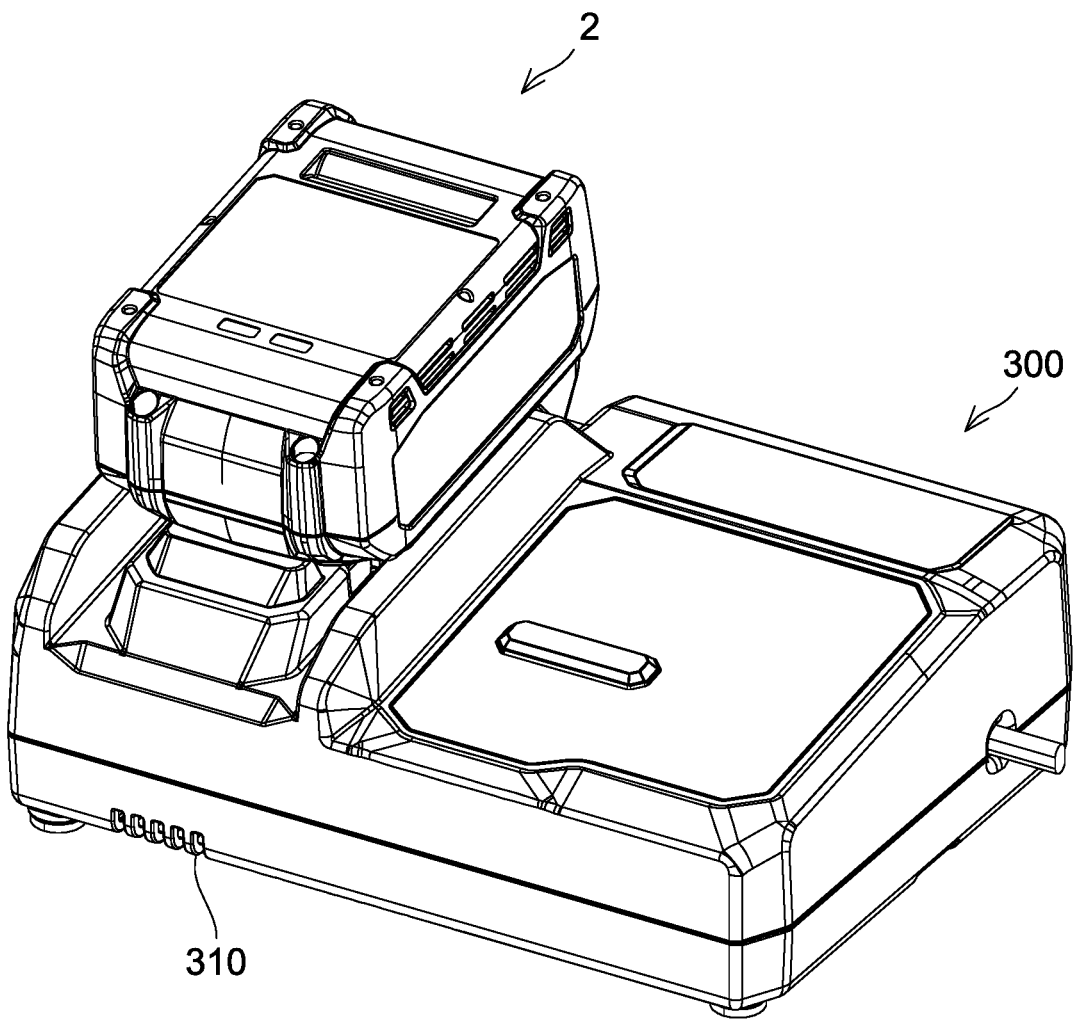
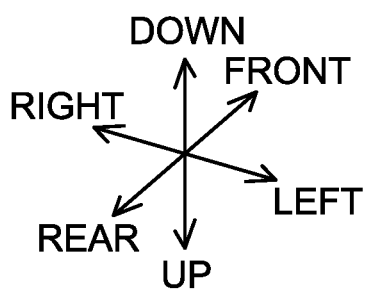

FIG. 25B
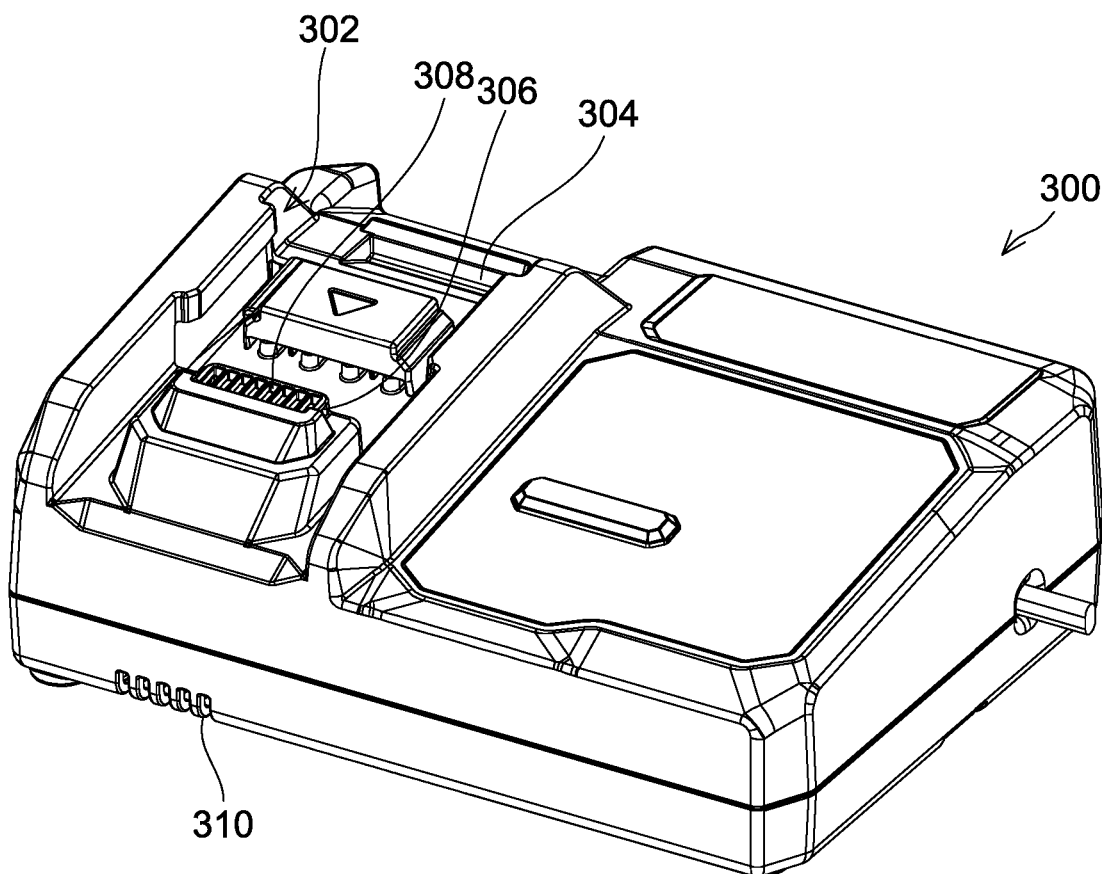
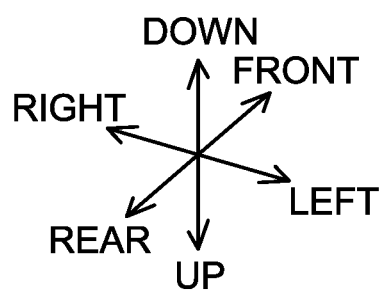

( Second Embodiment )

BATTERY PACK

CROSS-REFERENCE TO RELATED APPLICATION

This application claims priority to Japanese patent application nos. 2019-180792, 2019-180793 and 2019-180795, all filed on Sep. 30, 2019, the contents of each of which are fully incorporated herein by reference.

TECHNICAL FIELD

The subject matter disclosed by the present specification generally relates to battery packs, such as, e.g., battery packs for power tools and outdoor power equipment.

BACKGROUND ART

Japanese Laid-open Patent Publication 2014-203703 discloses a battery pack that comprises: an outer case, which comprises an upper-part case and a lower-part case fixed to the upper-part case; battery cells; and a cell case, which houses the battery cells.

SUMMARY OF THE INVENTION

If a user drops such a battery pack, there is a possibility that an impact will be imparted to the lower-part case of the outer case and thereby the lower-part case might become deformed. If the lower-part case of such a battery pack becomes deformed, then there is a risk that the lower-part case will make contact with the cell case, and thereby the battery cells housed in the cell case might be damaged by the deformation of the cell case.

It is one non-limiting object of the present teachings to disclose techniques that reduce the likelihood of damage to one or more battery cells housed in a cell case, e.g., in the event that a lower-part case of the battery pack is subjected to an impact.

In one aspect of the present teachings, a battery pack disclosed in the present specification comprises: an outer case, which comprises an upper-part case and a lower-part case fixed to the upper-part case; one or more battery cells; and a cell case, which houses the battery cell(s). A clearance is provided (continuously extends) between the lower-part case and the entire lower surface of the cell case.

In the above-mentioned battery pack, even if the lower-part case of the outer case is subjected to an impact and thereby the lower-part case deforms, the likelihood of contact of the lower-part case with the lower surface of the cell case is reduced, thereby reducing the likelihood of damage to the battery cell(s) housed in the cell case.

BRIEF DESCRIPTION OF THE DRAWINGS

FIG. 1C is an oblique view, viewed from the rear, the right, and above, of the battery pack 2 according to the first embodiment.

FIG. 3 is a right view, viewed from the right, of the battery pack 2 according to the first embodiment.

FIG. 5 is an enlarged view of the broken-line area V in FIG. 4A.

FIG. 7 is an enlarged, oblique view, viewed from the rear, the right, and above, of the broken-line area VII in FIG. 6.

FIG. 11C is a top view, viewed from above, of the cell case 80 according to the first embodiment.

FIG. 12B is a top view, viewed from above, of the battery pack 2 according to the first embodiment.

FIG. 15 is an enlarged view of the broken-line area XV in FIG. 14.

FIG. 20 is a cross-sectional view, viewed from the rear, of the battery pack 2 according to the first embodiment.

FIG. 22 is a cross-sectional view, viewed from the left, of the state in which the battery pack 2 according to the first embodiment is mounted on a charger 300.

FIG. 23 is a cross-sectional view, viewed from the left, of the state in which the battery pack 2 according to the first embodiment is mounted on the charger 300.

FIG. 24A is an oblique view, viewed from the right, above, and the front, of the state in which the battery pack 2 according to the first embodiment is mounted on a power tool 200.

FIG. 25A is an oblique view, viewed from the left, below, and the rear, of the state in which the battery pack 2 according to the first embodiment is mounted on the charger 300.

FIG. 25B is an oblique view, viewed from the left, the rear, and below, of the charger 300.

DETAILED DESCRIPTION OF EMBODIMENTS OF THE PRESENT TEACHINGS

Figure 1A:
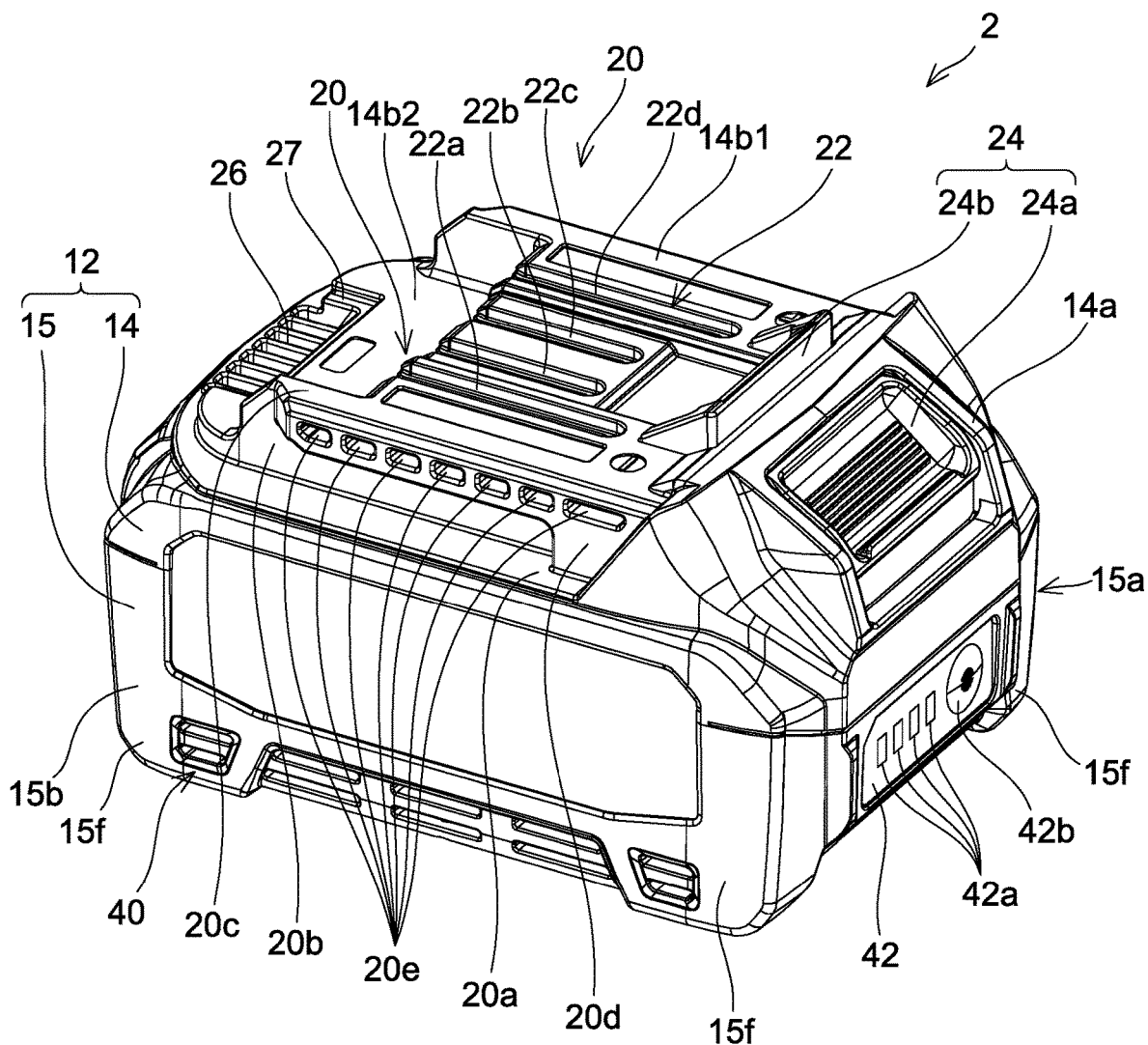
FIG. 1A is an oblique view, viewed from the front, the right, and above, of a battery pack 2 according to a first embodiment of the present teachings.

In one or more embodiments of the above-described aspect of the present teachings, the cell case may be screw-fastened to the outer case.

According to the above-mentioned configuration, if a user drops the battery pack, the likelihood of mispositioning (misalignment) between the outer case and the cell case can be reduced. Accordingly, if an impact is imparted to the lower-part case, the likelihood of damage to the battery cell(s) housed in the cell case can be reduced.

In one or more embodiments, three or more of the battery cells may be housed, in the lower-part case (more preferably, within the cell case), lined up parallel to a bottom surface (bottom wall) of the lower-part case. The three or more battery cells may include outward battery cells, which are respectively closest to corner portions of the lower-part case, and an inward battery cell, which is provided inward of (between) the outward battery cells. A clearance (a gap having a first depth) between a first holding part of the lower surface of the cell case, which first holding part holds one of the outward battery cells, and the lower-part case is larger than a clearance (a gap having a second (lesser) depth) between a second holding part of the lower surface of the cell case, which second holding part holds the inward battery cell, and the lower-part case.

If a user drops such a battery pack, it is possible that an impact will be imparted to the corner portion at one of four corners of the bottom surface of the lower-part case of the outer case. That is, the corner portions at the four corners of the bottom surface of the lower-part case are the most prone to deformation in the event that the battery pack is dropped. The distance between the first holding part, which holds one of the outward battery cells, and the corner portion, among the corner portions at the four corners of the bottom surface of the lower-part case, whose distance to the adjacent outward battery cell is shortest is shorter than the distance between the second holding part, which holds the adjacent inward battery cell, and the corner portion, among the corner portions at the four corners of the bottom surface of the lower-part case, whose distance to the adjacent outward battery cell is shortest. Consequently, if a corner portion at one of the four corners of the bottom surface of the lower-part case has been deformed, the bottom surface of the lower-part case would (in past designs) be prone to make contact with the first holding part more than with the second holding part. However, according to the above-mentioned configuration of the present teachings, even if a corner portion at one of the four corners of the bottom surface of the lower-part case has been deformed, the likelihood that the lower-part case will contact the lower surface of the cell case can be reduced. Accordingly, if the lower-part case of such a battery pack according to the present teachings is subjected to an impact, the likelihood of damage to the battery cell(s) housed in the cell case can be reduced.

In one or more embodiments, the first holding part may comprise an end-surface-side holding part, which holds one of the outward battery cells on an end-surface side in the longitudinal direction, and a center holding part, which holds the one of the outward battery cells on the center side (in a central portion thereof) in the longitudinal direction. The clearance (a gap having the first depth) between the end-surface-side holding part and the lower-part case may be larger than the clearance (a gap having the second depth) between the center holding part and the lower-part case.

The end-surface-side holding part is closer to a corner portion at one of the four corners of the bottom surface of the lower-part case than is the center holding part. Therefore, even if the corner portion at one of the four corners of the bottom surface of the lower-part case has been deformed, the likelihood that the lower-part case will contact the lower surface of the cell case can be reduced. Accordingly, if the lower-part case is subjected to an impact, the likelihood of damage to the battery cell(s) housed in the cell case can be reduced.

In one or more embodiments, a step part may be provided within the bottom surface of the lower case between a side surface of one of the outward battery cells and the portion of the bottom surface that opposes a side surface of the adjacent inward battery cell. The step part may descend downward from the inward battery cell side toward the outward battery cell side.

According to the above-mentioned configuration, the clearance (a gap having the first depth) between the first holding part and the lower-part case can be made larger than the clearance (a gap having the second depth) between the second holding part and the lower-part case. Consequently, even if the corner portion of one of the four corners of the bottom surface of the lower-part case has been deformed, the likelihood that the lower-part case will contact the lower surface of the cell case can be reduced, thereby further reducing the likelihood of damage to the battery cell(s) housed in the cell case.

In one or more embodiments, a wall thickness of the corner portion at one, two, three or four of the four corners of a lower portion of the cell case may be thicker than the wall thickness of the cell case downward of a longitudinal-direction axis of the battery cell(s).

If the lower-part case has been deformed, there is a higher possibility that the lower-part case will make contact with one of the four corner portions of the lower portion of the cell case. However, according to the above-mentioned configuration, because it is possible to increase the strength of the portion(s) of the cell case, which has (have) the highest likelihood of contacting the lower-part case in the event of deformation of the lower-part case, even if the lower-part case makes contact with the cell case, the likelihood of damage to the battery cell(s) housed in the cell case can be reduced.

First Embodiment

A battery pack 2 according to the first embodiment of the present teachings is explained below, with reference to the drawings. As shown in FIG. 24A, the battery pack 2 can be mounted on a power tool 200 in a detachable manner. In FIG. 24A, the power tool 200 is a power driver, but the power tool 200 may be, for example, a power drill, a power grinder, a power circular saw, a power chain saw, a power reciprocating saw, a power lawnmower, a power brush cutter, a power blower, etc. When mounted on the power tool 200, the battery pack 2 supplies electric power to the power tool 200. In addition, as shown in FIG. 25A, the battery pack 2 can be mounted on a charger 300 in a detachable manner. When mounted on the charger 300, the battery pack 2 is supplied with electric power from the charger 300. It is noted that, in the explanation below, when the battery pack 2 is being mounted on the power tool 200 or the charger 300, the direction in which the power tool 200 or the charger 300 is located, when viewed from the battery pack 2, is called "upward", and the direction opposite thereof is called "downward". In addition, when the battery pack 2 is being mounted on the power tool 200 or the charger 300, the direction in which the battery pack 2 is slid is called "rearward"; and when the battery pack 2 is being removed from the power tool 200 or the charger 300, the direction in which the battery pack 2 is slid is called "forward". That is, in the explanation below, the front-rear direction corresponds to a sliding direction, in which the battery pack 2 is slid relative to the power tool 200 or the charger 300.

As shown in FIG. 1 to FIG. 13B, the battery pack 2 comprises a battery module 10 (refer to FIG. 9) and an outer case (outer shell) 12 (refer to FIG. 1), which houses the battery module 10. The entirety of the outer case 12 is formed substantially in a rectangular-parallelepiped shape and is divided into an upper-part case (or simply "upper case" or even "upper case half") 14 and a lower-part case (or simply "lower case" or even "lower case half") 15. As shown in FIG. 2, the upper-part case 14 and the lower-part case 15 are fixed to one another by four screws 18.

Configuration of Upper-Part Case 14

Figure 2:
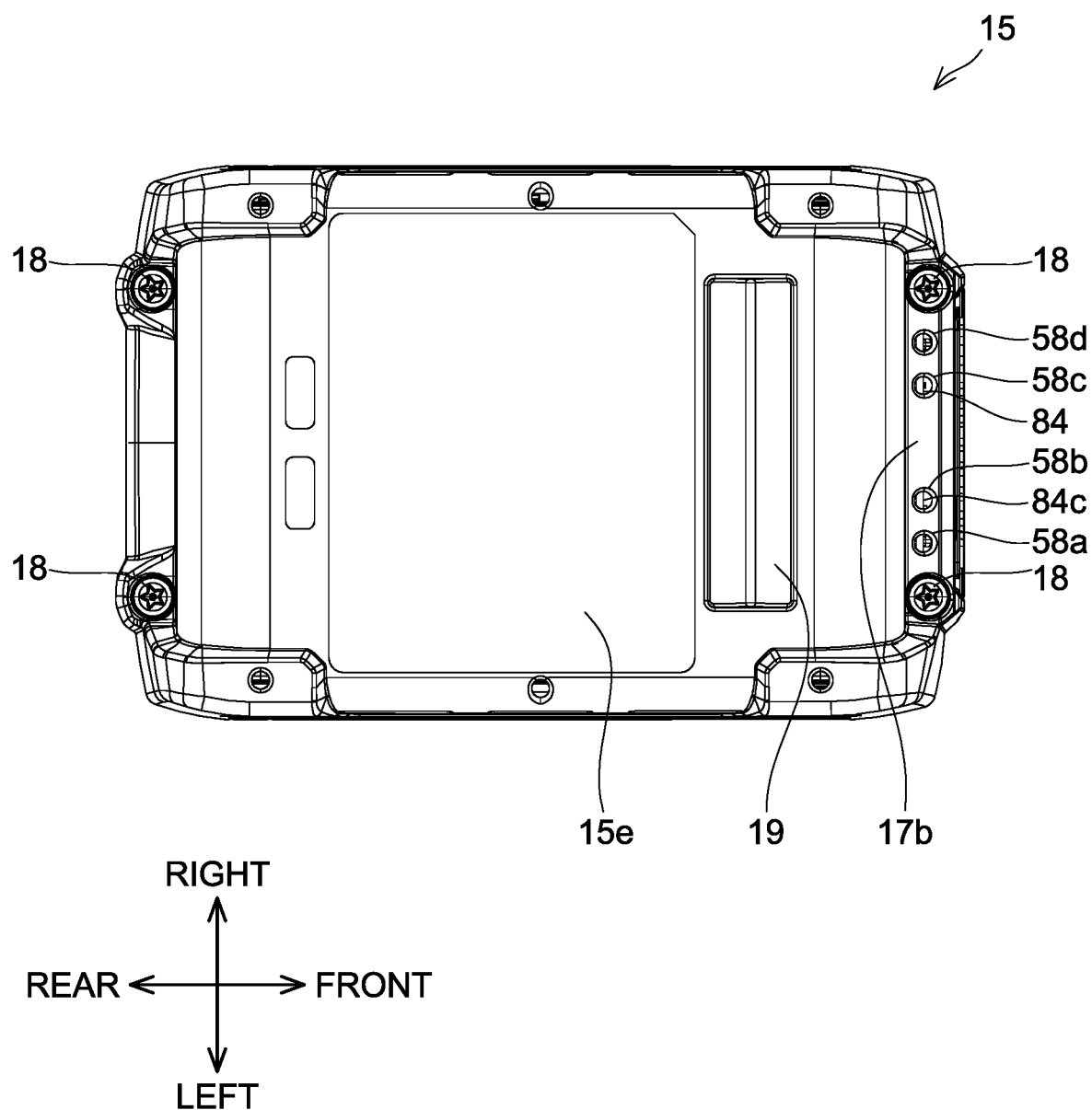
FIG. 2 is a bottom view, viewed from below, of the battery pack 2 according to the first embodiment.

As shown in FIG. 1A, slide rails 20, a terminal-receiving part 22, a hook 24, and a vent 26 are formed on or in the upper-part case 14.

The slide rails 20 extend in the front-rear direction and are respectively disposed on left- and right-end portions of an upper portion of the upper-part case 14. As shown in FIG. 1A, the right-side slide rail 20 comprises a base part 20a, an upward-extending part 20b, a first rightward-extending part 20c, and a second rightward-extending part 20d. Furthermore, the left-side slide rail 20 comprises a base part 20a, an upward-extending part 20b, a first leftward-extending part 20c, and a second leftward-extending part 20d. As shown in FIG. 4C, the upward-extending part 20b of the right-side slide rail 20 extends upward from a left end of the base part 20a. The first rightward-extending part 20c extends rightward from the upward-extending part 20b. A lower end of the first rightward-extending part 20c is located upward of the upper end of the base part 20a. A right end of the first rightward-extending part 20c is located leftward of a right end of the base part 20a. The second rightward-extending part 20d extends rightward from the upward-extending part 20b. A right end of the second rightward-extending part 20d coincides with the location of the right end of the first rightward-extending part 20c in a left-right direction. As shown in FIG. 1A, the second rightward-extending part 20d is connected to the base part 20a. A plurality of slots (recessed parts) 20e is provided on (in) the first rightward-extending part 20c and the second rightward-extending part 20d and the slots 20e are lined up (colinear) in the front-rear direction. When the battery pack 2 is being mounted on or removed from the power tool 200 or the charger 300, the slide rails 20 slidably engage with slide rails (not shown) of the power tool 200 or with slide rails 302 (refer to FIG. 25B) of the charger 300. Specifically, the slide rails (not shown) of the power tool 200 or the slide rails 302 of the charger 300 respectively slide between the base part 20a and the first rightward-extending part 20c of the right-side slide rail 20 and between the base part 20a and the first leftward-extending part 20c of the left-side slide rail 20.

Figure 24B:
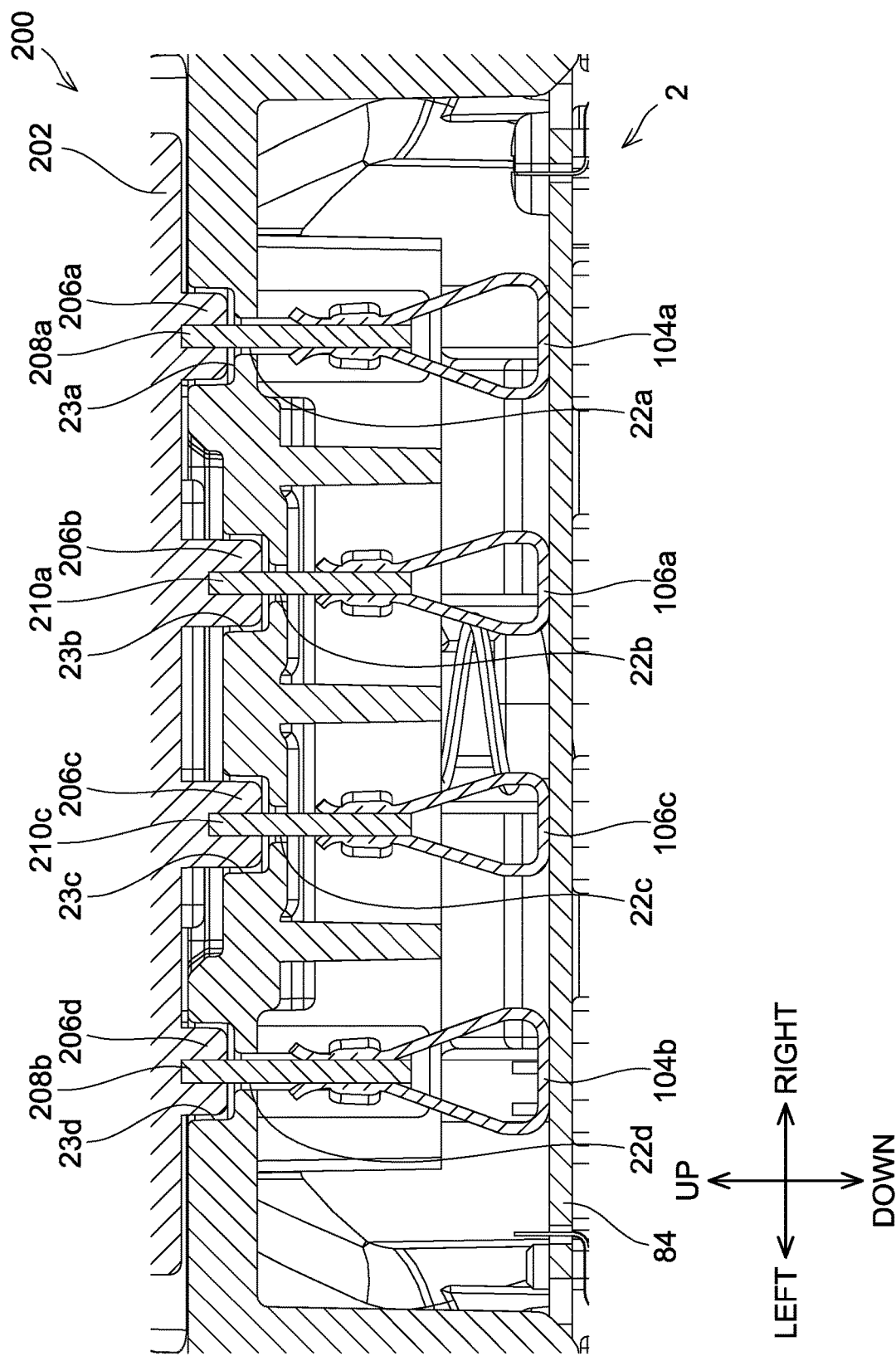
FIG. 24B is a cross-sectional view, viewed from the rear, of the state in which the battery pack 2 according to the first embodiment is mounted on the power tool 200.

The terminal-receiving part 22 comprises four terminal-opening parts (terminal openings) 22a-22d, which are provided on an upper wall 14b of a forward-upper surface 14b1 of the upper-part case 14. The terminal-opening parts 22a-22d are disposed between the left and right slide rails 20. Therefore, when the battery pack 2 is being mounted on the power tool 200 or on the charger 300, the terminal-opening parts 22a-22d respectively receive terminals 208a, 208b, 210a, 210c (refer to FIG. 24B) of the power tool 200 or terminals (not shown) of the charger 300. The terminal-opening parts 22a-22d are provided in the order of, from the right-side slide rail 20 to the left-side slide rail 20, the (first) terminal-opening part 22a, the (second) terminal-opening part 22b, the (third) terminal-opening part 22c, and the (fourth) terminal-opening part 22d. As shown in FIG. 1C, FIG. 12B, and FIG. 24B, battery-side channels (recessed parts, steps) 23a-23d are provided such that they respectively surround the terminal-opening parts 22a-22d. The terminal-opening parts 22a-22d and the battery-side channels 23a-23d each have a U shape when the battery pack 2 is viewed from above (i.e. in plan view of the battery pack 2). The bases or bottom surfaces of the respective battery-side channels 23a-23d are provided (extend) slightly downward of the forward-upper surface 14b1 of the outer case 12. That is, the forward-upper surface 14b1 and the battery-side channels 23a-23d each have a step shape.

The hook 24 is disposed on a front-upper portion of the upper-part case 14. The hook 24 is made of synthetic resin (polymer) and comprises a manipulatable part (button) 24a and a projection (protruding part) 24b. The manipulatable part 24a is provided on a front surface 14a of the upper-part case 14. The hook 24 is held, such that it is moveable in the up-down direction, by the upper-part case 14. The hook 24 is biased in the upward direction by a compression spring (not shown) and moves downward when the manipulatable part 24a or the projection 24b is manually pressed downward. When the battery pack 2 has been mounted on the power tool 200 or the charger 300, the projection 24b engages with a housing (not shown) of the power tool 200 or with a housing 304 (refer to FIG. 25B) of the charger 300 and thereby fixes the battery pack 2 to the power tool 200 or the charger 300. When the battery pack 2 is to be removed from the power tool 200 or the charger 300, the user presses the manipulatable part 24a downward, and thereby the projection 24b moves downward. In this state, by sliding the battery pack 2 relative to the power tool 200 or the charger 300, the battery pack 2 can be removed from the power tool 200 or the charger 300. The manipulatable part 24a has a shape that is hollowed inward. Consequently, when the user hooks his or her finger in the manipulatable part 24a and presses the manipulatable part 24a downward, the manipulatable part 24a can be pressed downward without the finger slipping.

The vent 26 is provided rearward of the slide rails 20. The vent 26 is provided in a rear part of a rearward-upper surface 14b2 of the outer case 12. The rearward-upper surface 14b2 is located downward of the forward-upper surface 14b1 and upward of the base parts 20a of the slide rails 20. A battery-side channel (recessed part) 27 is provided partially rightward, partially leftward, and forward of the vent 26. The base or bottom of the battery-side channel 27 is provided (extends) slightly downward of (parallel to) the rearward-upper surface 14b2. That is, the rearward-upper surface 14b2 and the battery-side channel 27 together form a stepped shape. A charger-side ridge part 306 (refer to FIG. 25B), which has a shape that matches (corresponds to, is complementary to) the battery-side channel 27, is provided on the charger 300. Consequently, when the battery pack 2 is to be mounted on the charger 300, the charger-side ridge part 306 is inserted into the battery-side channel 27.

Figure 4A:
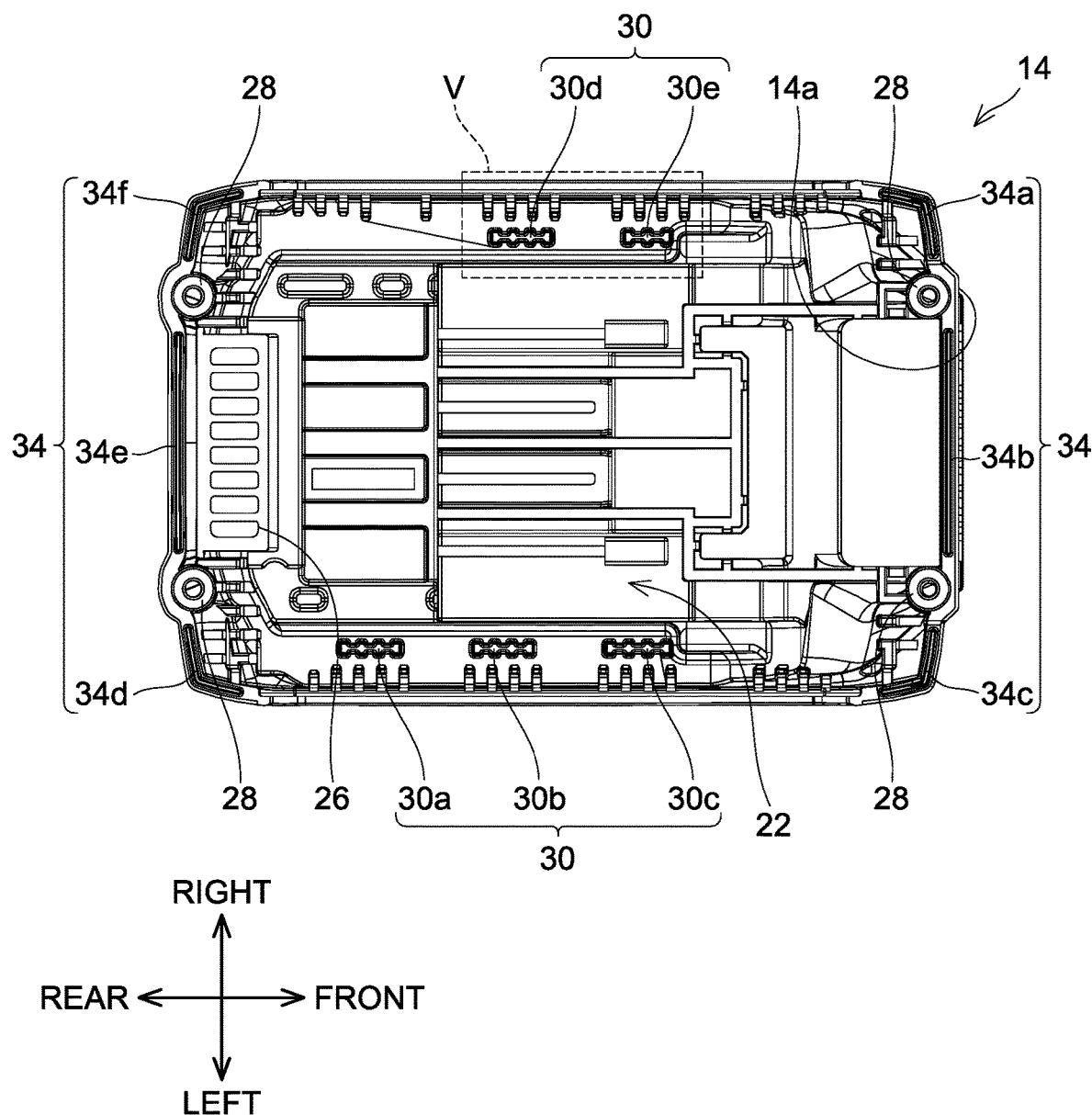
FIG. 4A is a bottom view, viewed from below, of an upper-part case 14 according to the first embodiment.
Figure 4B:
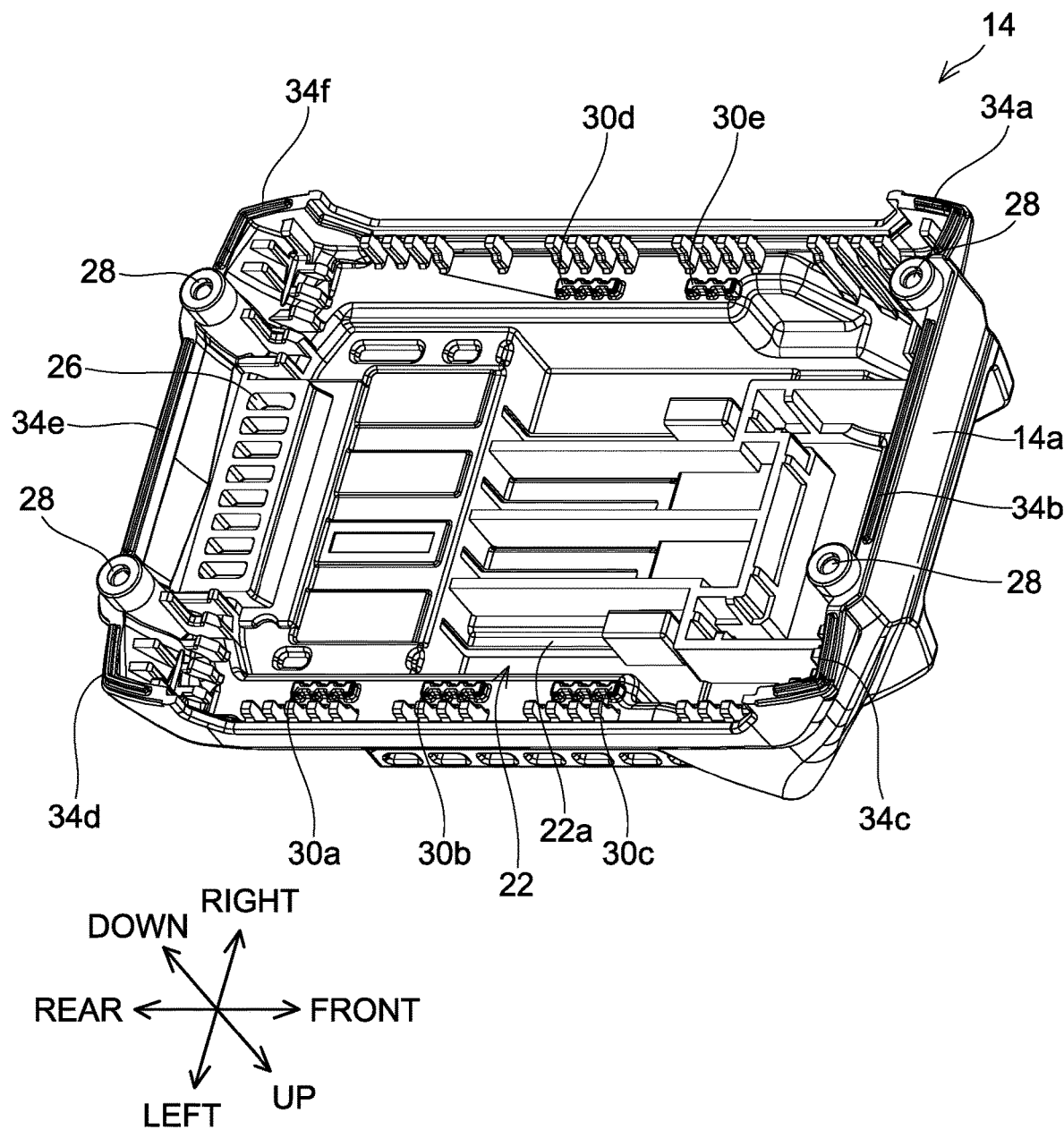
FIG. 4B is an oblique view, viewed from the front, the left, and below, of the upper-part case 14 according to the first embodiment.
Figure 4C:
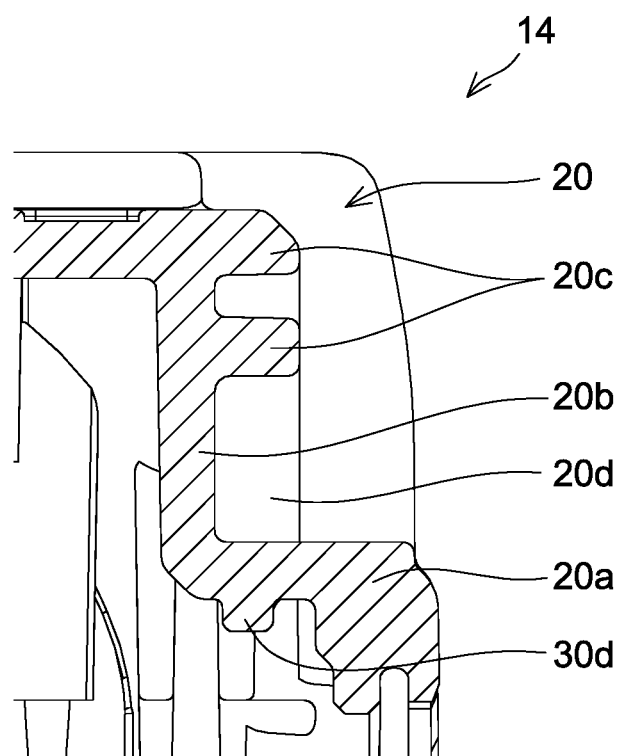
FIG. 4C is a cross-sectional view, viewed from the rear, of a slide rail 20 of the upper-part case 14 according to the first embodiment.

As shown in FIG. 4A, four screw holes 28 are provided in the upper-part case 14 and five first ridge parts (first ridges, first projections) 30, more specifically five first ridge parts 30a-30e, are provided on the upper-part case 14. The screws 18 (refer to FIG. 2) are respectively screwed into the four screw holes 28. As shown in FIG. 4B, the five first ridge parts 30a-30e protrude downward (i.e., toward the side of a cell case 80) from the lower surface of the upper-part case 14. FIG. 4C shows one of the first ridge part (30d), which is provided downward (extends integrally downward from) of the slide rail 20 (in greater detail, downward of (from) the base part 20a), i.e., inward of the upper-part case 14. The other first ridge parts 30, i.e. the other four first ridge parts 30a-30c, 30e, are likewise provided downward of the slide rails 20. As shown in FIG. 4A and in an enlarged view in FIG. 5, the first ridge parts 30 each comprise thick-wall parts 32a and thin-wall parts 32b. That is, the thickness (length, dimension) of each thick-wall part 32a in the left-right direction is greater than the thickness (length, dimension) of each thin-wall part 32b in the left-right direction. In each first ridge part 30, the thick-wall parts 32a and the thin-wall parts 32b are formed in an alternating manner in the front-rear direction. As shown in FIG. 4A, the first ridge parts 30a-30d each comprise four of the thick-wall parts 32a and three of the thin-wall parts 32b. The first ridge part 30e comprises three of the thick-wall parts 32a and two of the thin-wall parts 32b. As shown in FIG. 5, length L1 of the first ridge parts 30a-30d in the front-rear direction is longer than length L2 of the first ridge part 30e in the front-rear direction.

As shown in FIG. 4A, second ridge parts 34, more specifically six second ridge parts 34a-34f, for aligning the upper-part case 14 and the lower-part case 15 are provided on the upper-part case 14, as will be further explained below.

Configuration of Lower-Part Case 15

Figure 1B:
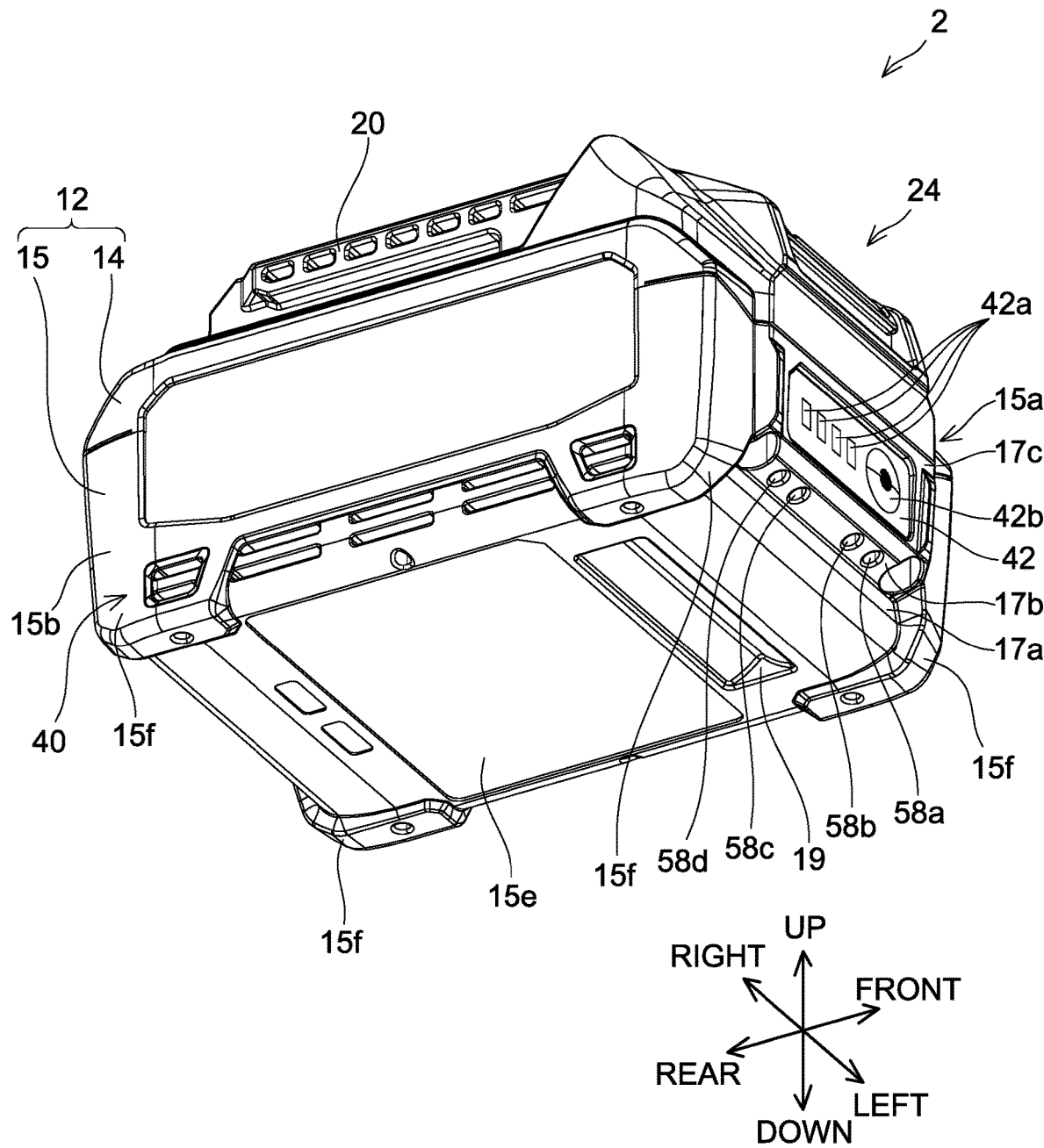
FIG. 1B is an oblique view, viewed from the front, the right, and below, of the battery pack 2 according to the first embodiment.
Figure 8:
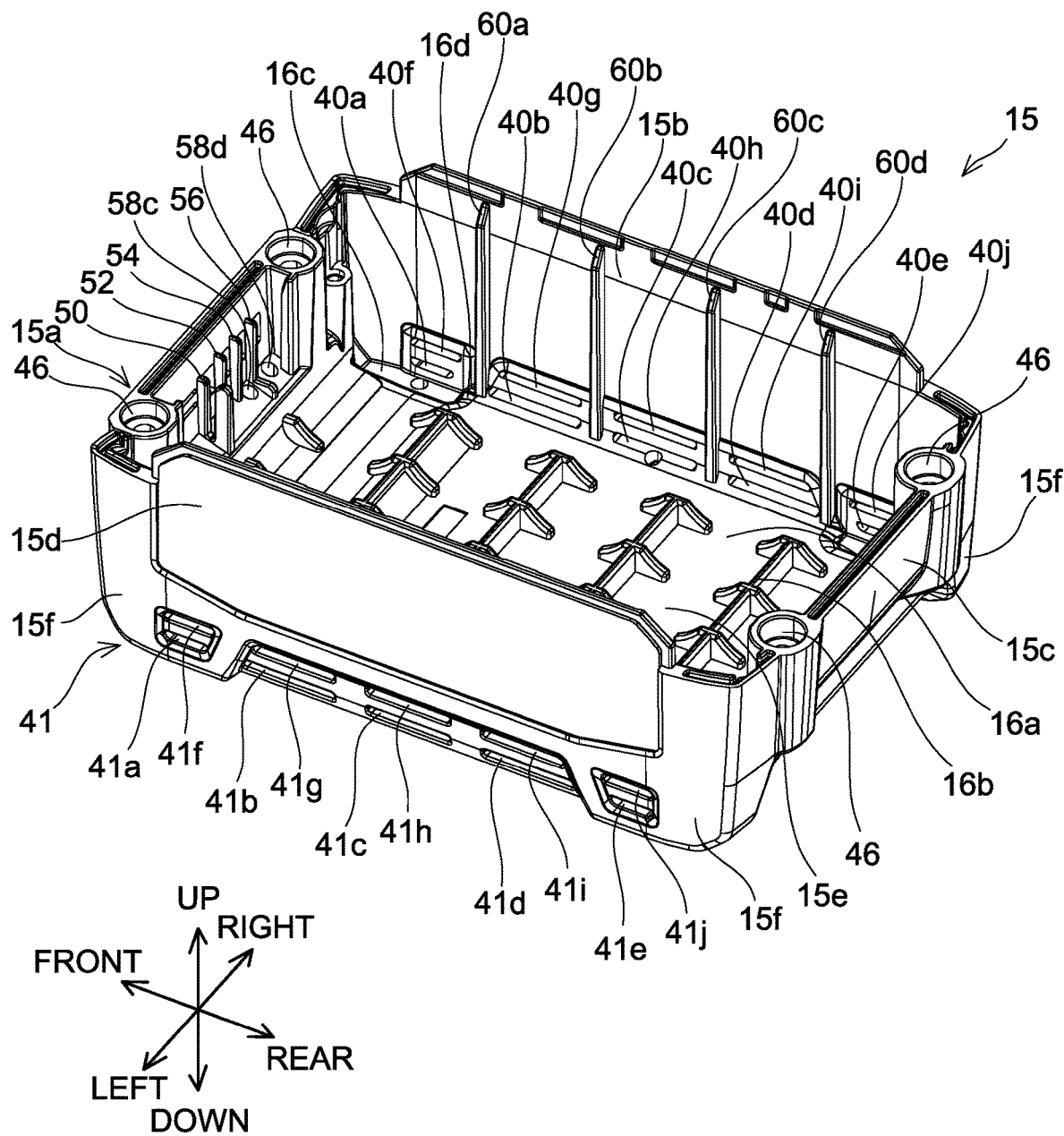
FIG. 8 is an oblique view, viewed from the left, the rear, and above, of the lower-part case 15 according to the first embodiment.
Figure 13A:
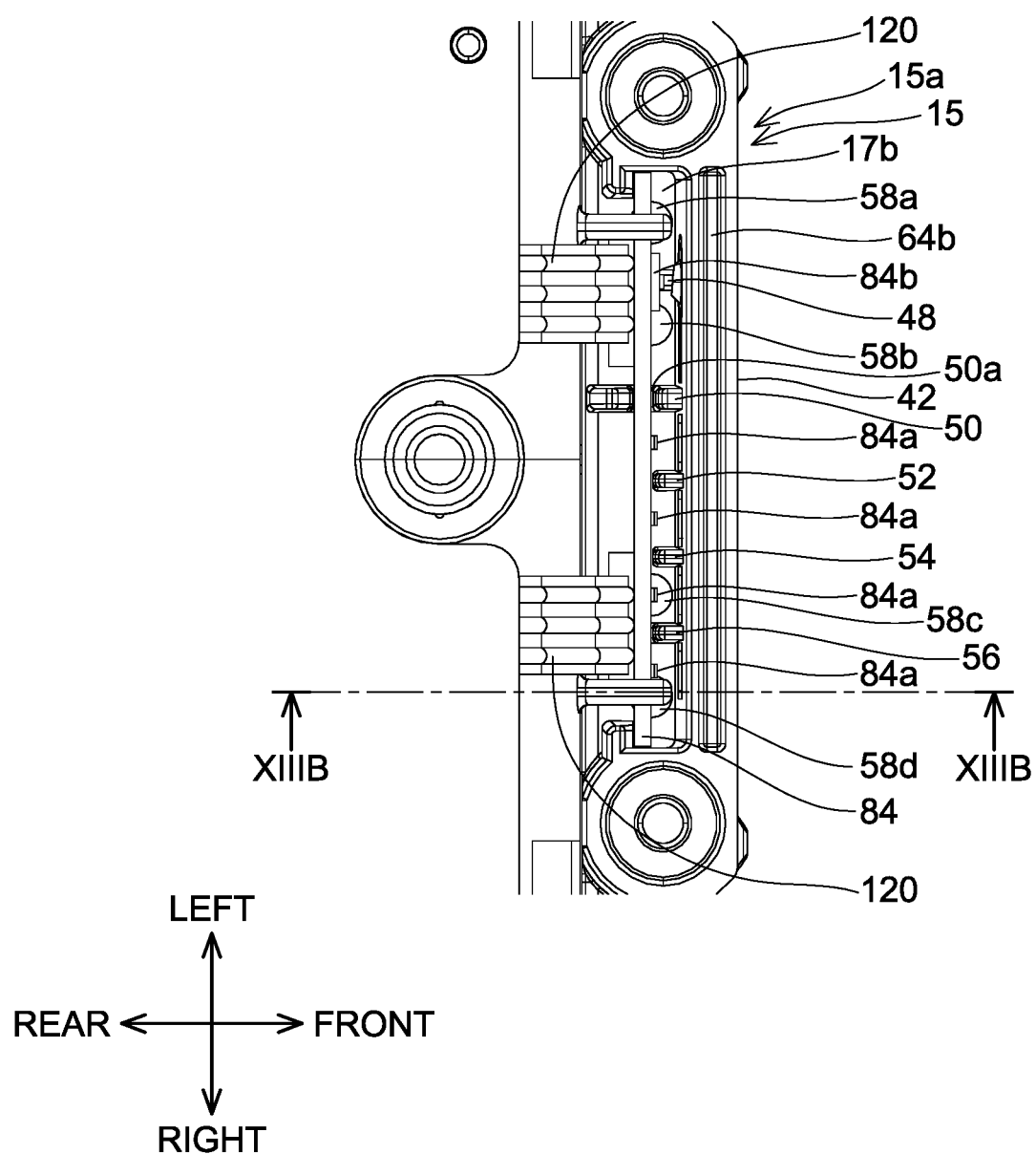
FIG. 13A is an enlarged view of the broken-line area XIII in FIG. 12A.
Figure 13B:
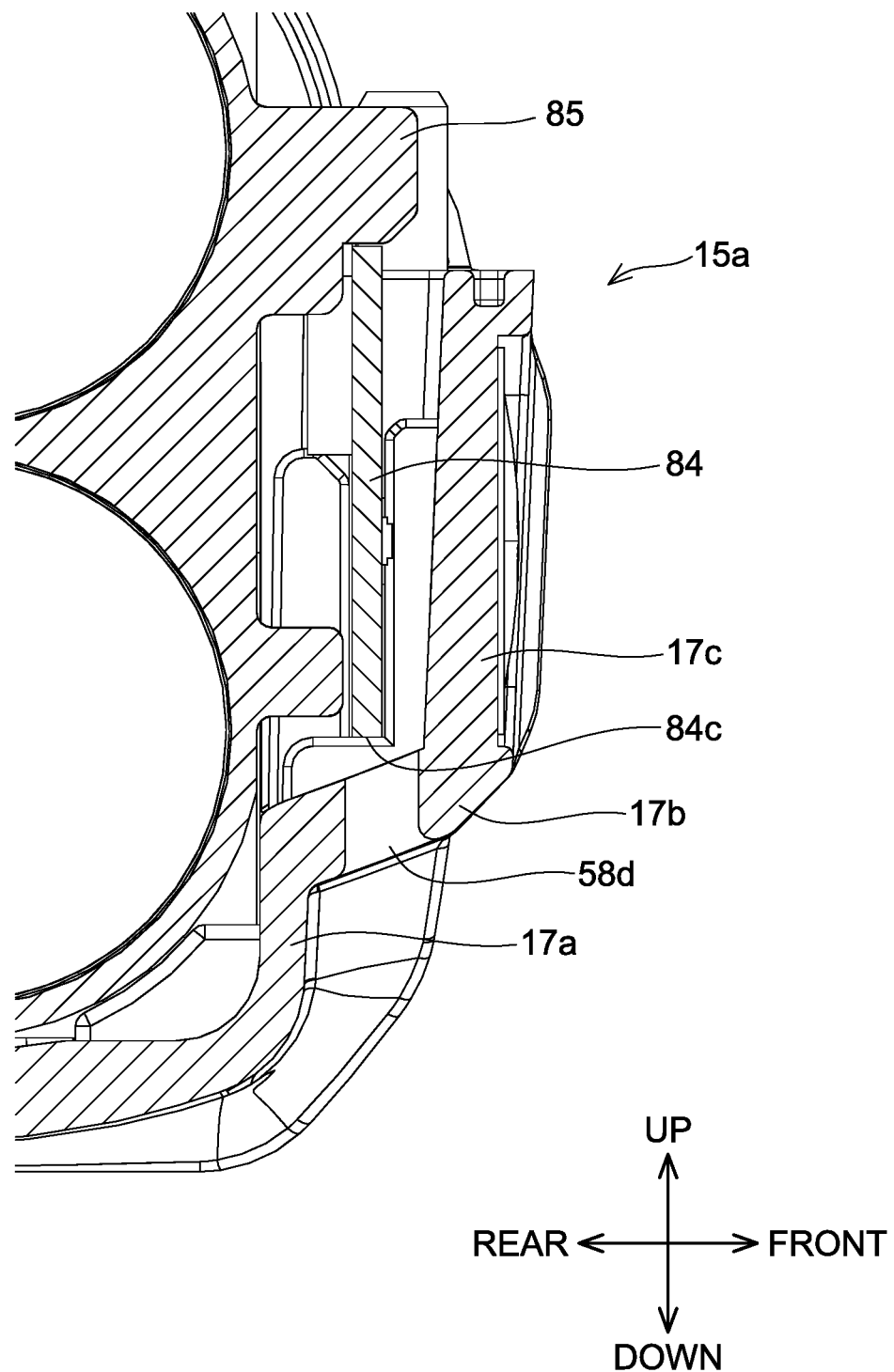
FIG. 13B is a cross-sectional view taken along line XIIIB-XIIIB in FIG. 13A.

As shown in FIG. 1B and FIG. 8, the lower-part case 15 has a front surface (front wall) 15a, a right-side surface (right-side wall) 15b, a rear surface (rear wall) 15c, a left-side surface (left-side wall) 15d, and a bottom wall (bottom plate) 15e. The front surface 15a has: a first upward-extending surface 17a, which extends perpendicularly to lower surface of the bottom wall 15e; a tilted surface 17b, which is tilted (oblique) with respect to the bottom wall 15e; and a second upward-extending surface 17c, which extends perpendicularly to the lower surface of the bottom wall 15e. As shown in FIG. 13B, the tilted surface 17b is tilted such that it goes rearward as it goes downward. As shown in FIG. 1A, a vent 40 and a display part 42 are provided on (in) the lower-part case 15. The display part 42 is provided on the front surface 15a of the lower-part case 15. The display part 42 comprises remaining-battery-charge display parts (e.g., LEDs) 42a, which are configured (adapted) to indicate (notify) the remaining charge of the battery pack 2 to the user, and a button 42b, which is depressible to switch ON and OFF the illumination of the remaining-battery-charge display parts (e.g., LEDs) 42a to indicate the amount of remaining charge in four levels (e.g., one illuminated LED means 0-25% remaining charge, two illuminated LEDs means 25-50% remaining charge, three illuminated LEDs means 50-75% remaining charge and four illuminated LEDs means 75-100% remaining charge). In addition, as shown in FIG. 1B, vents (drainage holes) 58a-58d are provided in the tilted surface 17b of the lower-part case 15. In addition, a hook part 19 is provided on the lower surface of the bottom wall 15e of the lower-part case 15. The hook part 19 is used when removing the battery pack 2 from the power tool 200 or the charger 300. Specifically, the user pushes the manipulatable part 24a (refer to FIG. 1A) downward with his or her thumb while his or her index finger and/or middle finger is hooked in the hook part 19.

As shown in FIG. 3, the vent 40 is provided at a lower portion of the right-side surface 15b of the lower-part case 15. The vent 40 is configured with ten holes 40a-40j. The ten holes 40a-40j are disposed such that they are lined up (colinear) in two levels: an upper level and a lower level. Of the five holes 40a-40e provided in the lower level, the length of the hole 40a, which is provided on the rearmost side, and of the hole 40e, which is provided on the frontmost side, in the front-rear direction is shorter than the length of the (middle) holes 40b-40d in the front-rear direction. In addition, of the five holes 40f-40j provided in the upper level, the length of the hole 40f, which is provided on the rearmost side, and of the hole 40j, which is provided on the frontmost side, in the front-rear direction is shorter than the length of the (middle) holes 40g-40i in the front-rear direction. In addition, as shown in FIG. 8, a vent 41, which is configured in the same manner as the vent 40, is also provided at the lower portion of the left-side surface 15d of the lower-part case 15. The vent 41 is also configured with ten holes 41a-41j. It is noted that holes 40a, 40e need not be the same width, but it is preferably that the width(es) of holes 40a, 40e is (are) shorter than the width(es) of holes 40b-40d. The same applies the width(es) of the (outer) holes 40f, 40j and the width(es) of the (inner) holes 40g-40h. Similarly, the same applies to the widths of the ten holes 41a-41j.

Figure 6:
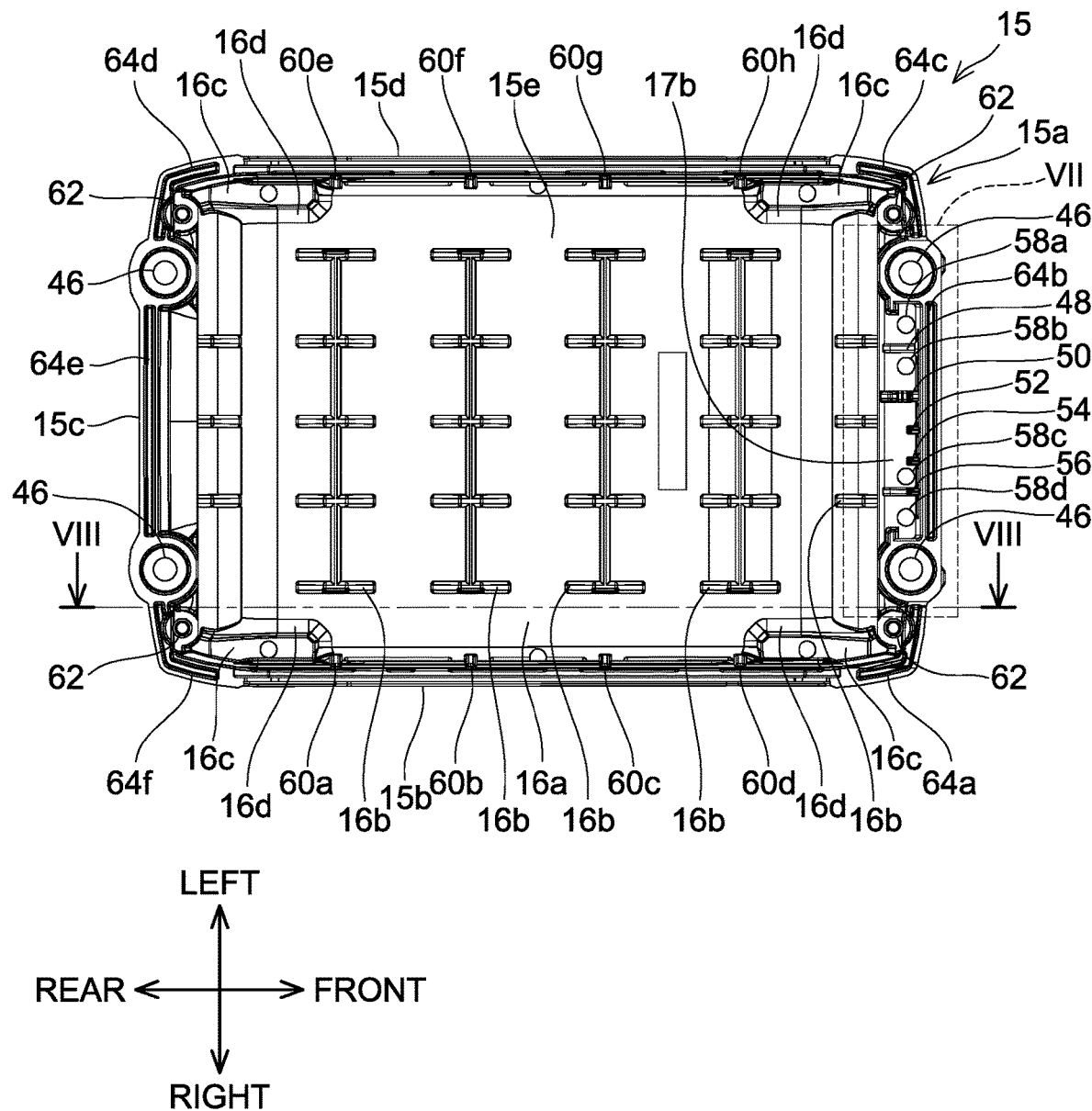
FIG. 6 is a top view, viewed from above, of a lower-part case 15 according to the first embodiment.
Figure 18:
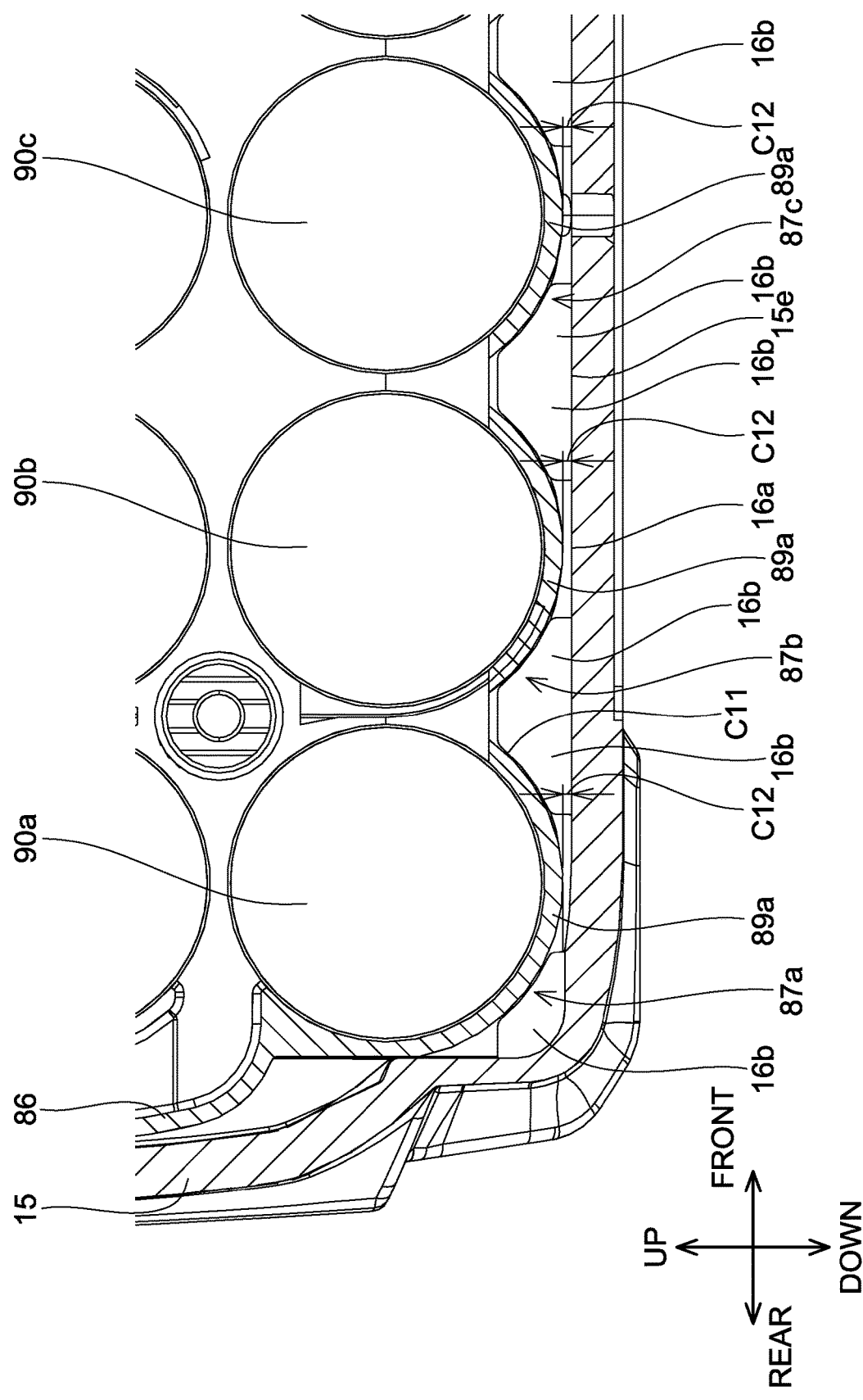
FIG. 18 is a cross-sectional view, viewed from the right, of the battery pack 2 according to the first embodiment.
Figure 19:
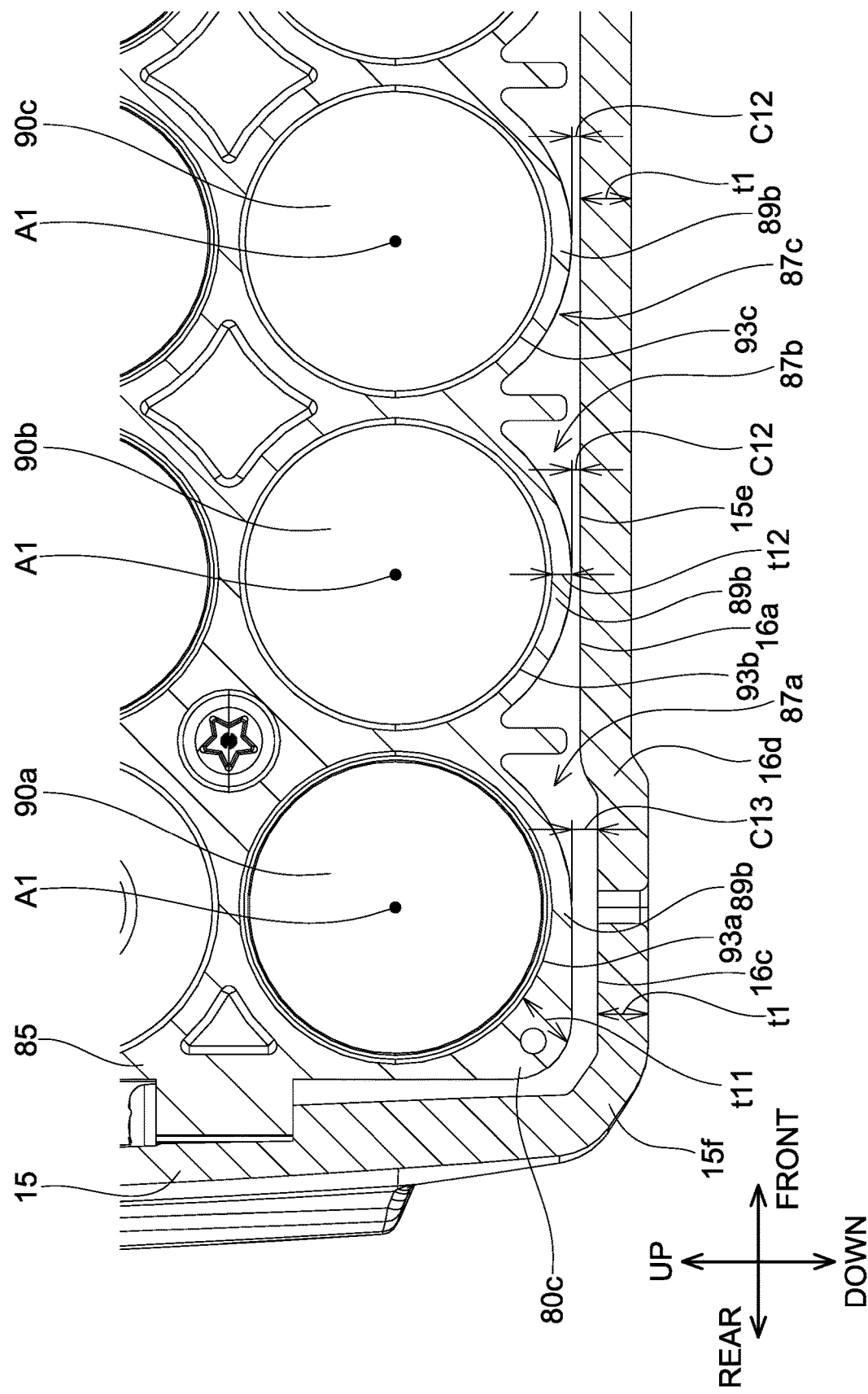
FIG. 19 is a cross-sectional view, viewed from the right, of the battery pack 2 according to the first embodiment.

In addition, as shown in FIG. 6, four screw holes 46, five front-part ribs 48, 50, 52, 54, 56, the four vents 58a-58d, eight side-part ribs (vertical ribs) 60a-60h, four screw holes 62, and six second recessed parts 64a-64f are provided on or in the lower-part case 15. The four screw holes 46 are provided at locations corresponding to the four screw holes 28 (refer to FIG. 4A) of the upper-part case 14. The four screw holes 62 are utilized to fix the lower-part case 15 and the battery module 10 to one another. The second recessed parts 64a-64f are provided at locations corresponding to the second ridge parts 34a-34f (refer to FIG. 4A), respectively, of the upper-part case 14. An upper surface of the bottom wall 15e of the lower-part case 15 comprises a flat part (planar portion) 16a, projections (protruding parts) 16b, depressions (recessed parts) 16c, and step parts (steps) 16d. The projections 16b protrude (project) upward from the flat part 16a. As shown in FIG. 18, the projections 16b each have a shape that conforms to a lower surface of the cell case 80, which is described below. As shown in FIG. 6, the depressions 16c are provided on (in, at) corner parts 15f at the four corners of the bottom wall 15e of the lower-part case 15. As shown in FIG. 19, each of the step parts 16d connects the flat part 16a and its corresponding depression 16c. The step parts 16d descend downward as they go from inward to outward of the lower-part case 15. As also shown in FIG. 19, thickness t1 of the lower-part case 15 at the flat part 16a and thickness t1 of the lower-part case 15 at the depressions 16c are the same. Thus, corresponding step portions are formed at the four corners of the lower surface of the bottom wall 15e such that, when placed on a surface, the battery pack 2 contacts the surface only at the four corners 15f. This design helps to ensure that, if the battery pack 2 is placed on a surface having a water puddle thereon, it is less likely that water will enter into the vents 40, 41.

As shown in FIG. 7, the front-part ribs 48, 50, 52, 54, 56 are provided on the tilted surface 17b. The front-part ribs 48, 50, 52, 54, 56 extend upward from the tilted surface 17b and rearward from the front surface 15a of the lower-part case 15. A rear end of the front-part rib 48 coincides substantially with a rear end of the tilted surface 17b, and an upper end of the front-part rib 48 coincides substantially with an uppermost end of the tilted surface 17b. The upper surface of the front-part rib 48 is a flat surface. The rear end of the front-part rib 50 substantially coincides with a rear end of the tilted surface 17b, and an upper end of the front-part rib 50 is located upward of an upper end of the remaining-battery-charge display parts 42a. In addition, a groove part (groove) 50a is provided on (in) the front-part rib 50. An LED board 84 (refer to FIG. 13A), which is described below, passes through the interior of the groove part 50a. Rear ends of the front-part ribs 52, 54 are located forward of a rear end of the tilted surface 17b. In addition, upper ends of the front-part ribs 52, 54 are located upward of upper ends of the remaining-battery-charge display parts 42a. The front-part rib 56 comprises a light-shielding wall part 56a and a flat part 56b. The structure of the light-shielding wall part 56a is the same as the front-part ribs 52, 54. The structure of the flat part 56b is the same as the front-part rib 48.

The front-part ribs 48, 50, 56 sectionalize (compartmentalize) the space upward of the tilted surface 17b into four spaces S1-S4. Specifically, the first space S1 is demarcated by the front-part rib 48, the second space S2 is demarcated by the front-part ribs 48, 50, the third space S3 is demarcated by the front-part ribs 50, 56, and the fourth space S4 is demarcated by the front-part rib 56. The vents 58a-58d are provided in the spaces S1-S4, respectively. The vents 58a-58d pass through the lower-part case 15 in the up-down direction. Consequently, if any water enters the interior of the outer case 12, such water can flow into the spaces S1-S4 and be discharged via the vents 58a-58d.

As shown in FIG. 6, the side-part ribs 60a-60d extend leftward from the right-side surface 15b of the lower-part case 15. In addition, as shown in FIG. 8, the lower ends of the side-part ribs 60a-60d extend upward from the upper surface of the bottom wall 15e of the lower-part case 15. The upper ends of the side-part ribs 60a-60d are located slightly downward of the upper end of the lower-part case 15. The side-part ribs 60a-60d are provided between respective holes 40a-40j of the vent 40 that are adjacent in the front-rear direction. Specifically, the (first) side-part rib 60a is provided between the holes 40a, 40f and the holes 40b, 40g, the (second) side-part rib 60b is provided between the holes 40b, 40g and the holes 40c, 40h, the (third) side-part rib 60c is provided between the holes 40c, 40h and the holes 40d, 40i, and the (fourth) side-part rib 60d is provided between the holes 40d, 40i and the holes 40e, 40j. The structures of side-part ribs 60e-60h are the same as the side-part ribs 60a-60d, with the exception that they extend rightward from the left-side surface 15d of the lower-part case 15. The side-part ribs 60a-60h define vertically isolated channels that reduce the likelihood of a short circuit between battery cells 90a-90j in the event that water were to penetrate into the interior of the battery pack 2 via the holes 40a-40j. The side-part ribs 60a-60h also position the battery module 10 in the left-right direction of the battery pack 2 so that vertical air channels for heat dissipation are defined between the left and right interior walls of the outer case 12 and the corresponding left and right sides of the battery module 10, as will be further described below.

Configuration of Battery Module 10

Figure 9A:
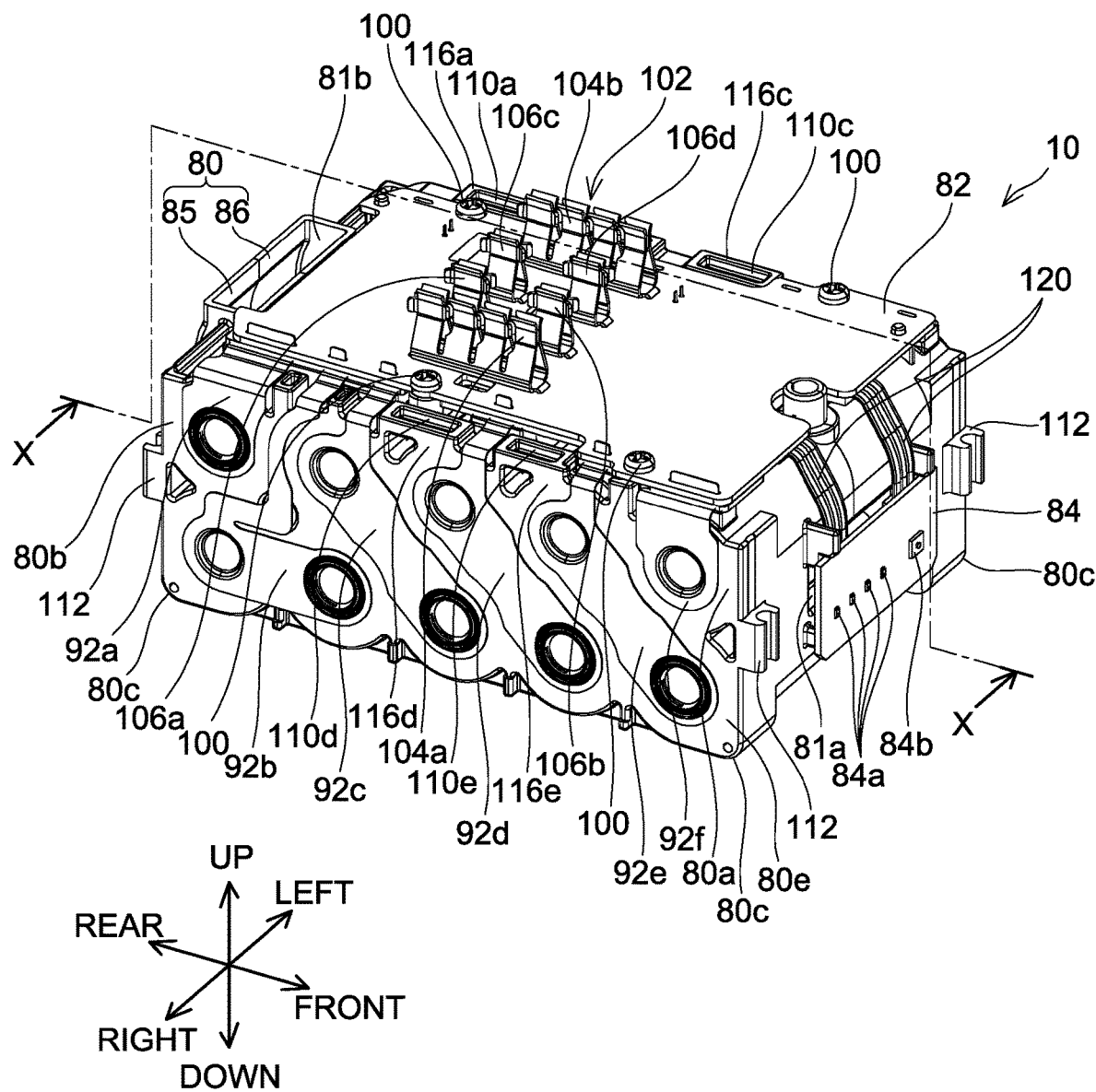
FIG. 9A is an oblique view, viewed from the front, the right, and above, of a battery module 10 according to the first embodiment.
Figure 9B:
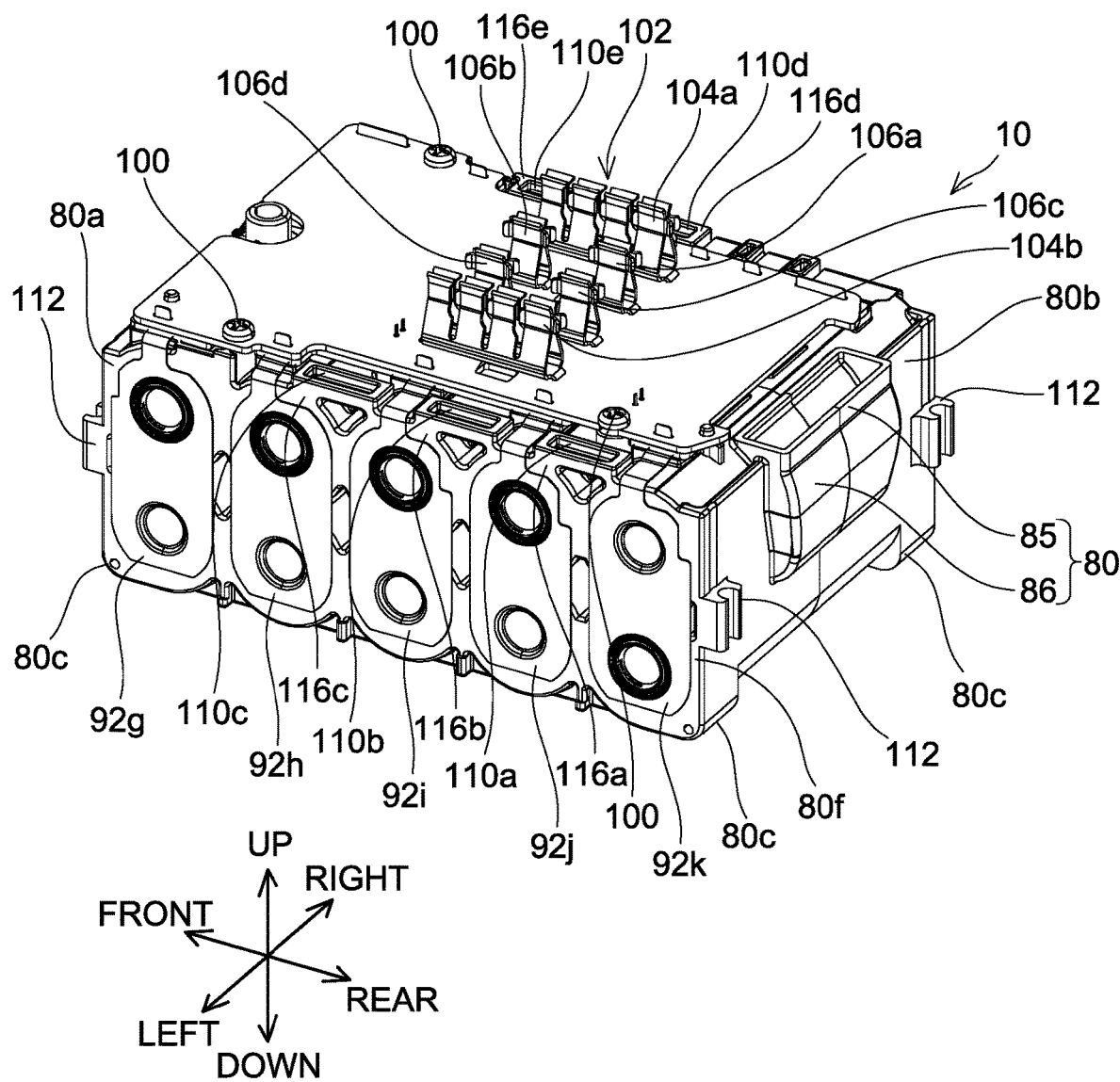
FIG. 9B is an oblique view, viewed from the rear, the left, and above, of the battery module 10 according to the first embodiment.

As shown in FIG. 9A, the battery module 10 comprises the cell case (battery cell case) 80, a control board (circuit board) 82, and the LED board 84. The cell case 80 is made of a rigid, electrically-insulating material, e.g., a synthetic resin (polymer) material such as polyamide. As shown in FIG. 11A, the cell case 80 is divided into a right cell case (right cell case half) 85 and a left cell case (left cell case half) 86. A (first) vent 81a is provided in a front part 80a of the cell case 80, and a (second) vent 81b is provided in a rear part 80b of the cell case 80. As shown in FIG. 11B, thick-wall parts 80c are respectively provided at corner portions at the four corners of a lower portion of the cell case 80. As shown in FIG. 19, thickness t11 of each of the thick-wall parts 80c is greater than thickness t12 of the respective cell-holding parts 87, which are described below. As shown in FIGS. 11A and 11B, an upper portion (that includes an upper surface 80d) of the cell case 80 has a shape that matches (corresponds to, is complementary with, fits with) side surfaces of battery cells 90f-90j (refer to FIGS. 10 and 16), which are described below, in the longitudinal direction. Hollow parts (depressions) 80g are provided on (in) the upper surface 80d of the cell case 80 between adjacent battery cells 90f-90j. Four screw bosses 83 are provided on the upper surface 80d of the cell case 80 and are used to connect the control board 82 and the cell case 80 to one another. As shown, e.g., in FIG. 9B, protruding parts (protrusions) 116a-116c protrude upward from the upper surface 80d of an upper portion of a left-side surface 80f of the cell case 80. As shown in FIG. 11C, the protruding parts 116a-116c are disposed such that they each span (partially overlap, bridge) two adjacent battery cells 9090f-90i of the upper level of the battery cells 90a-90j. First recessed parts (recesses, blind holes) 110a-110c are respectively provided on (in) the protruding parts 116a-116c. The first recessed parts 110a-110c are provided at locations corresponding to the first ridge parts 30a-30c (refer to FIG. 4A), respectively, of the upper-part case 14. As shown in FIG. 9A, protruding parts 116d, 116e protrude upward from the upper surface 80d of an upper portion of a right-side surface 80e of the cell case 80. As shown in FIG. 11C, the protruding parts 116d, 116e are disposed such that they span two adjacent battery cells 90g-90i. First recessed parts 110d, 110e are provided on (in) the protruding parts 116d, 116e. The first recessed parts 110d, 110e are provided at locations corresponding to the first ridge parts 30d, 30e (refer to FIG. 4A), respectively, of the upper-part case 14. As shown in FIGS. 9B and 11C, the protruding parts 116a-116e and the first recessed parts 110a-110e are each provided outward of the control board 82 in the left-right direction when the battery module 10 is viewed from above (i.e. in plan view). In other words, in the left-right direction of the battery pack 2, the control board 82 is entirely disposed between the protruding parts 116a-116c on the left side and the protruding parts 116d-116e on the right side. The first recessed parts 110a-110e are respectively provided between two adjacent lead plates 92. More specifically, as shown in FIG. 9A, the protruding part 116d and the first recessed part 110d are provided between lead plates 92c, 92d, and the protruding part 116e and the first recessed part 110e are provided between lead plates 92d, 92e. In addition, as shown in FIG. 9B, the protruding part 116a and the first recessed part 110a are provided between lead plates

92*j*, 92*k*, the protruding part 116*b* and the first recessed part 110*b* are provided between lead plates 92*i*, 92*j*, and the protruding part 116*c* and the first recessed part 110*c* are provided between lead plates 92*h*, 92*i*.

As shown in FIG. 11B, the cell-holding parts 87 include ten cell-holding parts 87*a*-87*j* that are provided on the right cell case 85. The ten cell-holding parts 87*a*-87*j* are disposed such that they are lined up in two levels: an upper level and a lower level. As shown in FIG. 18, which is a cross-sectional view of the battery pack 2 at its center position in the left-right direction, the cell-holding parts 87*a*-87*c* have center holding parts 89*a*, which hold the lower level of the battery cells 90*a*-90*e* at their centers and are described below. In addition, as shown in FIG. 19, which is a cross-sectional view of the battery pack 2 at the location at which the right-side, rearward depression 16*c* of the lower-part case 15 is provided, the cell-holding parts 87*a*-87*c* have end-surface-side holding parts 89*b*, which hold the right-end-surface sides of the battery cells 90*a*-90*e* in the longitudinal direction. Although not shown, the cell-holding parts 87*d*, 87*e* also have center holding parts and end-surface-side holding parts. As shown in FIG. 11B, coupling parts 88, which are for coupling the right cell case 85 and the left cell case 86, are provided between the cell-holding parts 87*a*, 87*b*, 87*f*, 87*g* and between the cell-holding parts 87*d*, 87*e*, 87*i*, 87*j*. It is noted that, although not shown, ten cell-holding parts, which correspond to the ten cell-holding parts 87*a*-87*j* of the right cell case 85, and two coupling parts, which correspond to the two coupling parts 88 of the right cell case 85, are also provided on the left cell case 86.

Figure 10:
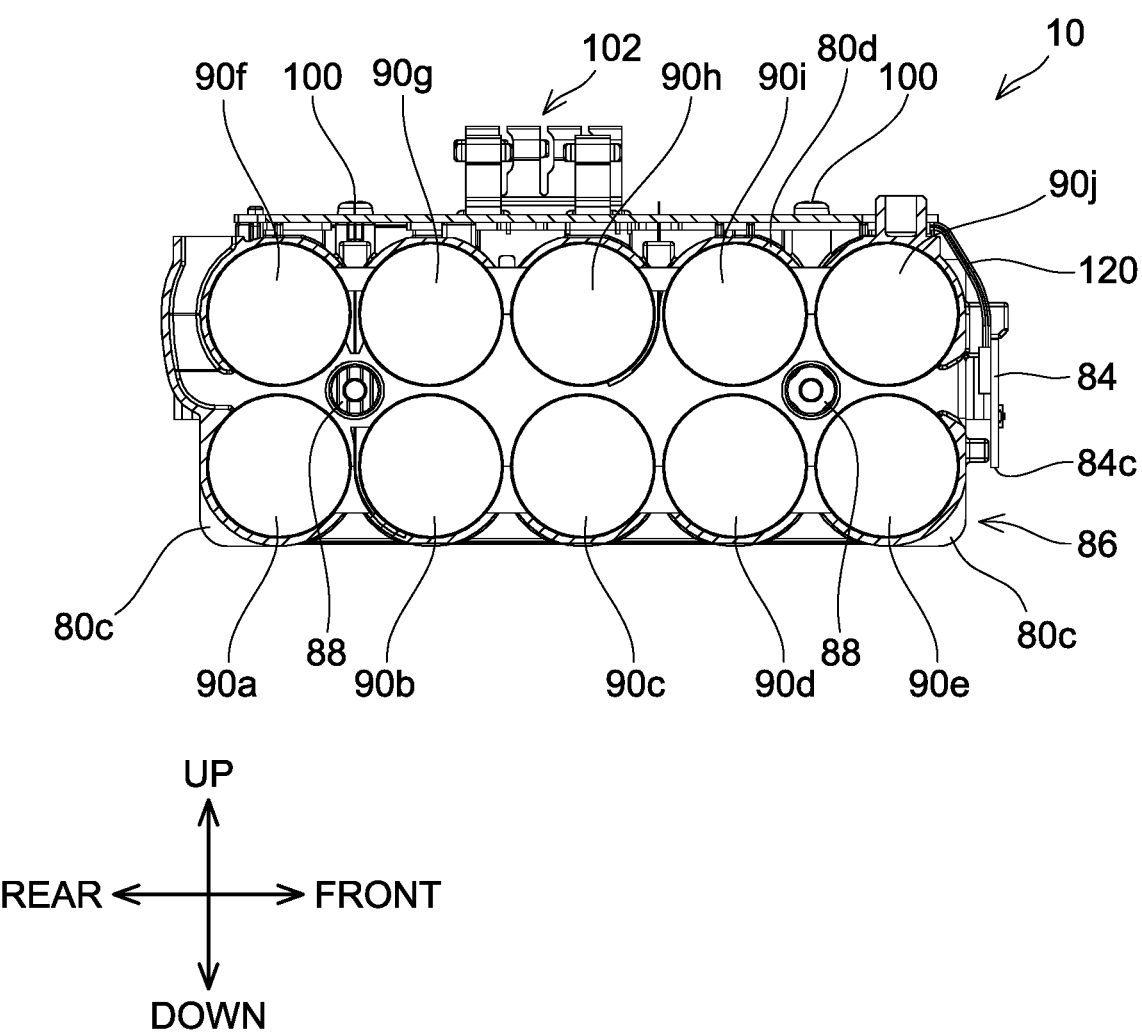
FIG. 10 is a cross-sectional view taken along line X-X in FIG. 9A.
Figure 11A:
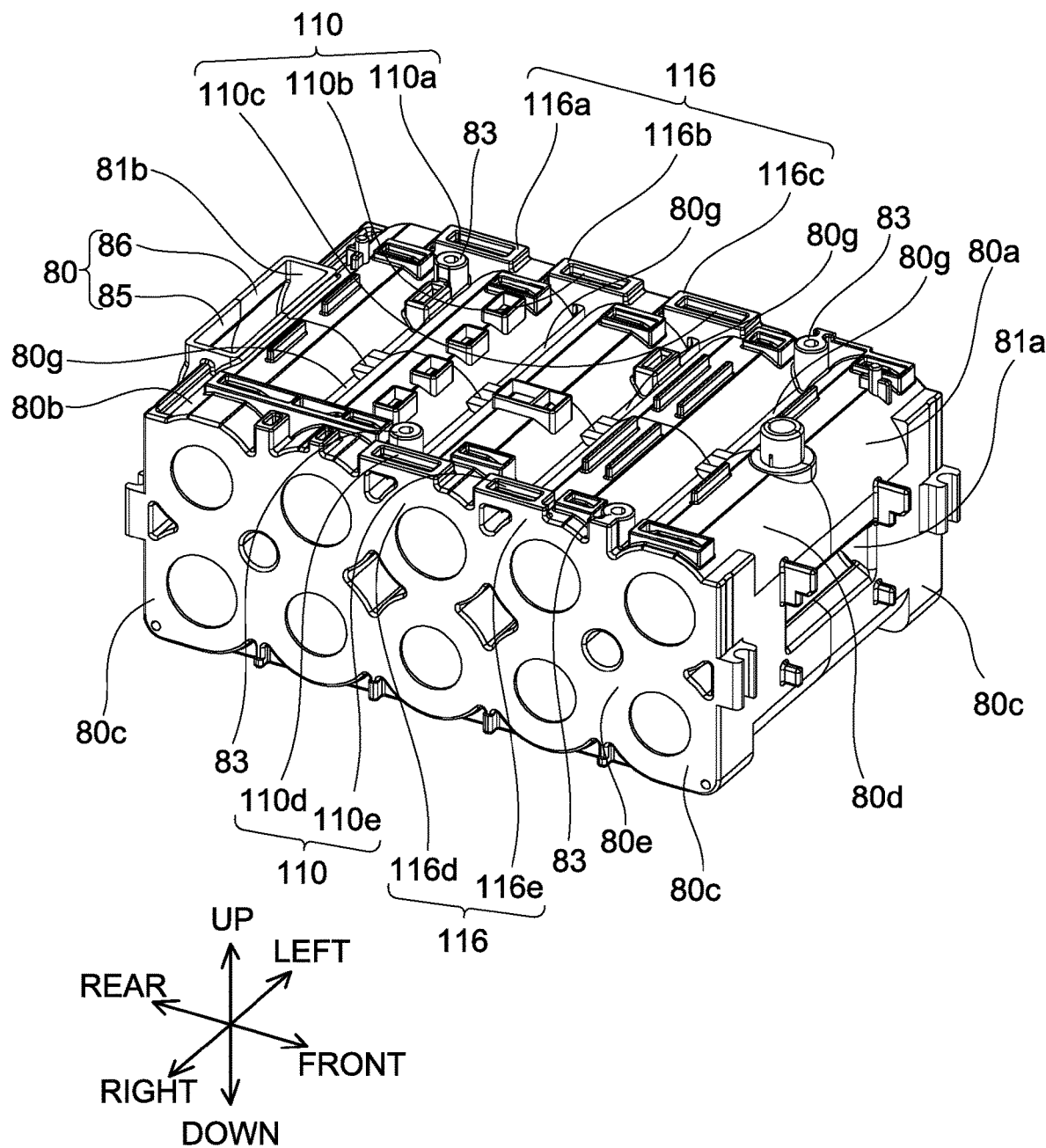
FIG. 11A is an oblique view, viewed from the front, the right, and above, of a cell case 80 according to the first embodiment.
Figure 11B:
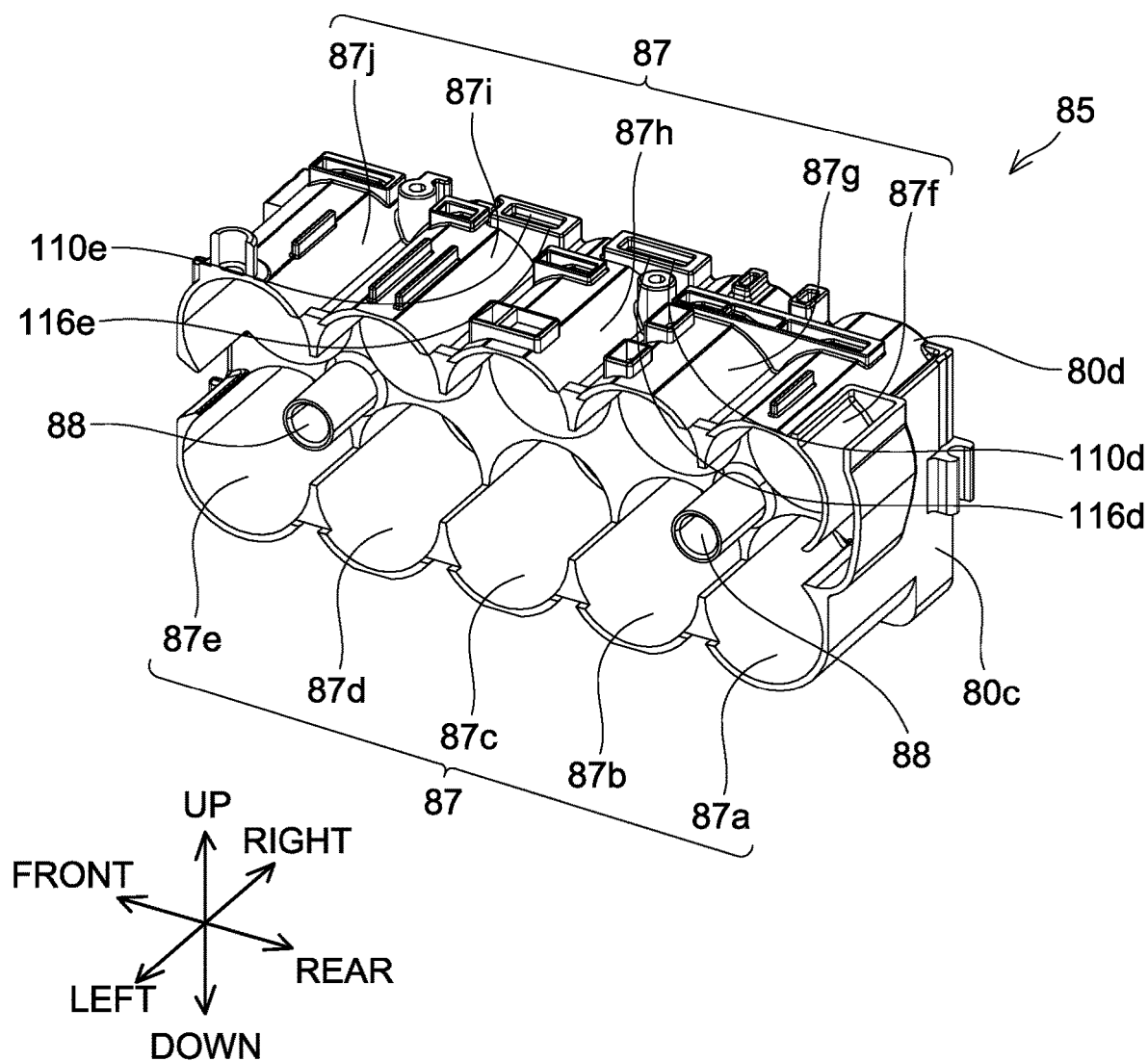
FIG. 11B is an oblique view, viewed from the rear, the left, and above, of a right cell case 85 according to the first embodiment.

As shown in FIG. 10, the ten battery cells 90*a*-90*j* are disposed, such that they are lined up in two levels, an upper level and a lower level, in the cell case 80. Each battery cell 90*a*-90*j* is a rechargeable battery cell, e.g., a lithium-ion battery cell, having a circular-cylinder shape and on which a positive electrode is formed on a first end portion and a negative electrode is formed on a second (opposite) end portion. In the present embodiment, the battery cells 90*a*-90*j* are 18650-type, lithium-ion battery cells having a rated voltage of 3.6V. The battery cells 90*a*-90*j* are disposed such that, among battery cells 90*a*-90*j* adjacent in the up-down direction, the positive electrodes and the negative electrodes are oriented in the reverse direction from one another. The battery cell 90*a*, which is the rearmost of the battery cells 90*a*-90*e* in the lower level, is disposed such that its right-end-surface side is its negative electrode and its left-end-surface side is its positive electrode. In addition, the battery cells 90*b*-90*e* are disposed such that their right-end-surface sides are their positive electrodes and their left-end-surface sides are their negative electrodes. In addition, the battery cell 90*f*, which is the rearmost of the battery cells 90*f*-90*j* in the upper level, is disposed such that its right-end-surface side is its positive electrode and its left-end-surface side is its negative electrode. In addition, the battery cells 90*g*-90*j* are disposed such that their right-end-surface sides are their negative electrodes and their left-end-surface sides are their positive electrodes. A metal part 91 (e.g., refer to FIG. 20), which constitutes the positive electrode of each battery cell 90*a*-90*j*, and a metal part, which constitutes the negative electrode of each battery cell 90*a*-90*j*, are respectively connected to the first and second end surfaces of each battery cell 90*a*-90*j*. The first end portions of the battery cells 90*a*-90*j* are connected via the metal parts to lead plates 92*a*-92*f* (refer to FIG. 9A), which are made of a conductive metal or alloy, such as copper, copper alloy, aluminum, aluminum alloy, etc., and are provided on the right-side surface 80*e* side of the cell case 80. The second end portions of the battery cells 90*a*-90*j* are connected via the metal parts to lead plates 92*g*-92*k* (refer to FIG. 9B), which are also made of a conductive metal or alloy, such as copper, copper alloy, aluminum, aluminum alloy, etc., and are provided on the left-side surface 80*f* side of the cell case 80. It is noted that, as shown in FIG. 20, for each of the battery cells 90*a*-90*j*, a waterproof ring 95 is provided on the metal part 91 that constitutes the positive electrode of the battery cell 90*a*-90*j*. In FIG. 9A and FIG. 9B, the portions denoted by thick-line circles on the surfaces of the lead plates 92 indicate that the waterproof rings 95 are disposed inward thereof. Accordingly, the positive electrodes of the battery cells 90*a*-90*j* are connected to the portions denoted by the thick-line circles on the surfaces of the lead plates 92.

As shown in FIG. 9A, the lead plates 92*a*-92*f* are disposed spaced apart from one another, i.e. there is no direct contact between the lead plates 92*a*-92*f* that could cause electrically shorting. Accordingly, the lead plates 92*a*-92*f* are electrically insulated from one another by the gaps therebetween. The lead plate 92*a* is connected only to the positive electrode of the battery cell 90*f*. The lead plate 92*f* is connected only to the negative electrode of the battery cell 90*j*. The lead plate 92*b* connects the two battery cells 90*a*, 90*b*, which are adjacent in the front-rear direction. The lead plates 92*c*-92*e* connect the two battery cells that are adjacent in a diagonal direction. Specifically, the lead plate 92*c* is connected to the negative electrode of the battery cell 90*g* and the positive electrode of the battery cell 90*c*. The lead plate 92*d* is connected to the negative electrode of the battery cell 90*h* and the positive electrode of the battery cell 90*d*. The lead plate 92*e* is connected to the negative electrode of the battery cell 90*i* and the positive electrode of the battery cell 90*e*.

In addition, as shown in FIG. 9B, the lead plates 92*g*-92*k* are disposed spaced apart from one another in a manner similar to the lead plates 92*a*-92*f*. Accordingly, the lead plates 92*g*-92*k* are electrically insulated from one another by the gaps therebetween. The lead plates 92*g*-92*k* connect the battery cells that are adjacent in the up-down direction. Specifically, the lead plate 92*g* connects the negative electrode of the battery cell 90*e* and the positive electrode of the battery cell 90*j*. In addition, the lead plate 92*h* connects the negative electrode of the battery cell 90*d* and the positive electrode of the battery cell 90*i*. In addition, the lead plate 92*i* connects the negative electrode of the battery cell 90*c* and the positive electrode of the battery cell 90*h*. In addition, the lead plate 92*j* connects the negative electrode of the battery cell 90*b* and the positive electrode of the battery cell 90*g*. In addition, the lead plate 92*k* connects the positive electrode of the battery cell 90*a* and the negative electrode of the battery cell 90*f*. According to the above-mentioned configuration, the ten battery cells 90*a*-90*j* are electrically connected in series. Accordingly, the rated voltage of the battery pack 2 is 36V. It is noted that, although not shown, electrically insulating sheets are affixed to the right-side surface 80*e* and the left-side surface 80*f* of the cell case 80.

According to the above-mentioned configuration, the lead plates 92*a*, 92*f*, which are connected to the control board 82 via respective power-supply lines (not shown), can be connected to the battery cells 90*f*, 90*j*, which are on the upper side. The electric current that flows in (through) the lead plates 92*a*, 92*f*, which are connected to the control board 82, is larger than the electric current that flows in (through) the other lead plates. Consequently, the width of each of the lead plates 92*a*, 92*f* is preferably large. Owing to the arrangement of parts in the above-mentioned configuration, the width of the lead plates 92*a*, 92*f* can be sufficiently ensured. In this regard, it is noted that, if at least one of the lead plates 92*a*, 92f connected to the control board 82 were to instead be connected to one of the lower level battery cells 90a-90e, then it would become necessary to wire the corresponding power-supply line from a lower portion of cell case 80 up to the control board 82 that is above the cell case 80. Because the clearance between the cell case 80 and a right-side surface of the outer case 12 is small in the lower portion of the cell case 80, wiring the power-supply line would be difficult in such an arrangement. On the other hand, according to the above-mentioned configuration of the present teachings, because both of the lead plates 92a, 92f, which are connected to the control board 82, are connected to the battery cells 90f, 90j, which are on the upper side, the power-supply lines that respectively connect the lead plates 92a, 92f and the control board 82 can be wired easily. In addition, because the length of the power-supply lines that connect the lead plates 92a, 92f and the control board 82 can be made shorter than in an embodiment in which at least one of the lead plates 92a, 92f is connected to a battery cell 90 in the lower level, the resistance of the power-supply lines that connect the lead plates 92a, 92f and the control board 82 can be made smaller.

As shown in FIG. 10, when the cell case 80 holds the ten battery cells 90a-90j, the upper-level battery cells 90f-90j and the lower-level battery cells 90a-90e are disposed spaced apart from one another in the up-down direction. In addition, clearances (gaps) are provided between the battery cells 90a, 90b, 90f, 90g and the rearward-side coupling parts 88 and between the battery cells 90d, 90e, 90i, 90j and the forward-side coupling parts 88. Consequently, air that flows into the cell case 80 via the vent 81a or the vent 81b of the cell case 80 can pass between the upper-level battery cells 90f-90j and the lower-level battery cells 90a-90e, between the battery cells 90a, 90b, 90f, 90g and the rearward-side coupling parts 88, and between the battery cells 90d, 90e, 90i, 90j and the forward-side coupling parts 88.

As shown in FIG. 9A, the control board 82 is disposed upward of the cell case 80. The control board 82 is disposed along a plane orthogonal to the up-down direction and is fixed to the cell case 80 via fasteners 100.

A plurality of terminals 102 is provided on the upper surface of the control board 82. The terminals 102 include: a battery-side, negative-electrode terminal 104a and a battery-side, positive-electrode terminal 104b, which are used for discharging or charging when the battery pack 2 is mounted on the power tool 200 or the charger 300; and a plurality of battery-side signal terminals 106a-106d used for the transmission and receipt of signals. The battery-side, negative-electrode terminal 104a and the battery-side, positive-electrode terminal 104b are provided outward of the battery-side signal terminals 106a-106d in the left-right direction and may each be constituted by four discrete terminals that are electrically connected, as shown in FIG. 9A. The battery-side, negative-electrode terminal 104a is provided on the control board 82 on the right side thereof, and the battery-side, positive-electrode terminal 104b is provided on the control board 82 on the left side thereof. The battery-side signal terminals 106a, 106b are provided such that they are lined up (colinear) in the front-rear direction. The battery-side signal terminals 106c, 106d are provided such that they are lined up (colinear) in the front-rear direction and thus extend in parallel to the battery-side signal terminals 106a, 106b. As shown in FIG. 12B, the battery-side, negative-electrode terminal 104a is disposed at a location corresponding to the terminal-opening part 22a of the upper-part case 14, the battery-side signal terminals 106a, 106b are disposed at a location corresponding to the terminal-opening part 22b, the battery-side signal terminals 106c, 106d are disposed at a location corresponding to the terminal-opening part 22c, and the battery-side, positive-electrode terminal 104b is disposed at a location corresponding to the terminal-opening part 22d.

Figure 12A:
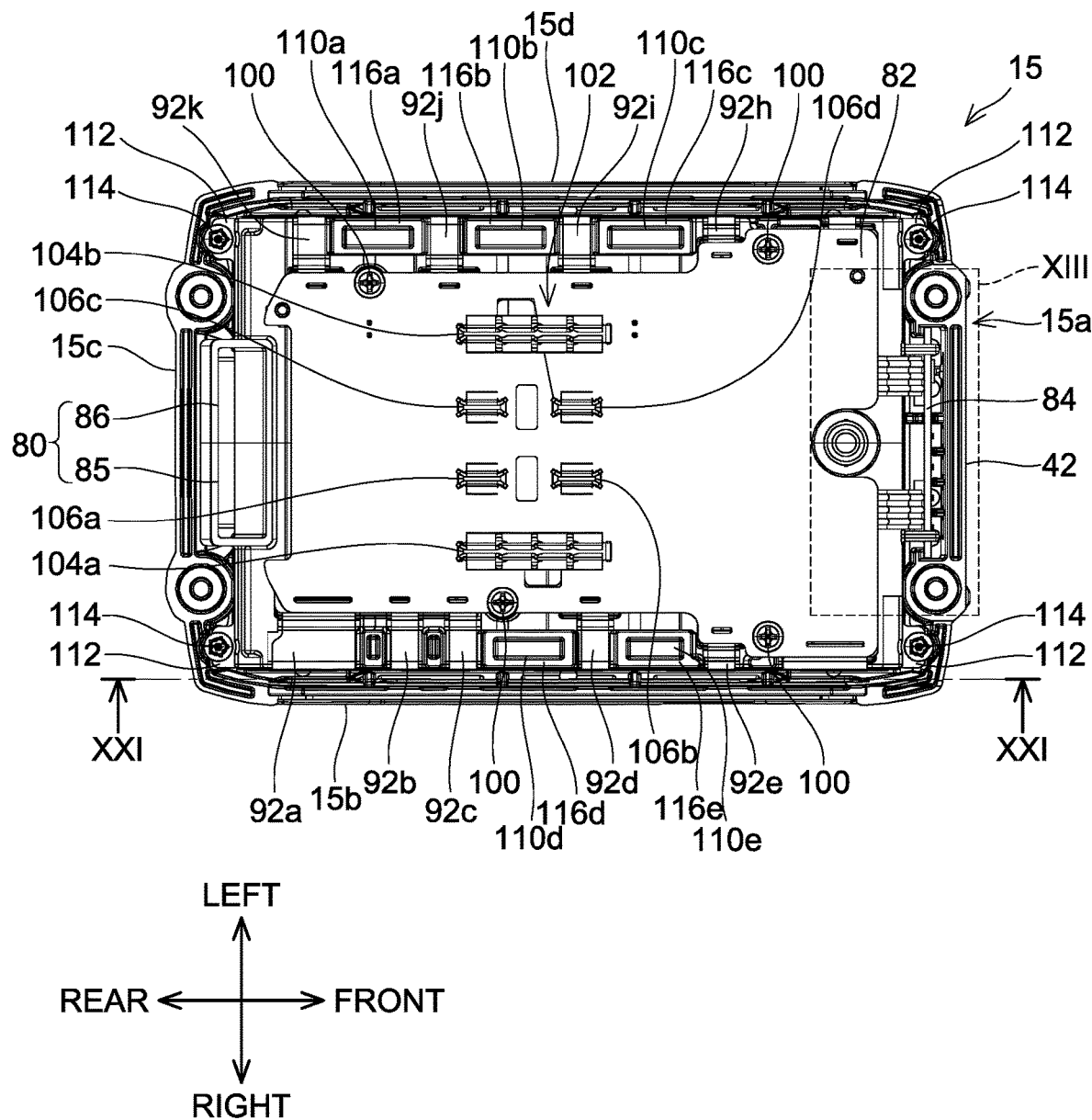
FIG. 12A is a top view that shows the state in which, in the first embodiment, the battery module 10 and the lower-part case 15 are fixed to one another.

As shown in FIG. 9A, FIGS. 9B, 11C and 12A, four screw holders (fixing parts) 112 are provided on the cell case 80. The screw holders 112 are provided at locations corresponding to the screw holes 62 (FIG. 6) of the lower-part case 15. As shown in FIG. 12A, the lower-part case 15 and the battery module 10 are fixed to one another by four screws 114 that respectively pass through the screw holes 62 and into the screw holders 112.

As shown in FIG. 9A, the LED board 84 is connected to the control board 82 via signal lines 120. The LED board 84 comprises four LEDs 84a and a switch 84b, which may be, e.g., a push-button switch. As shown in FIG. 13A, when the battery module 10 and the lower-part case 15 are fixed to one another, the LED board 84 is disposed in the vicinity of a rear surface of the display part 42 of the lower-part case 15. Specifically, the LEDs 84a are respectively disposed on the rear surfaces of the remaining-battery-charge display parts 42a, and the switch 84b is disposed on the rear surface of the button 42b. That is, inward of the lower-part case 15, the LED board 84 opposes the front surface 14a. In addition, the LED board 84 is inserted into the groove part 50a of the front-part rib 50 of the lower-part case 15 and is mounted on the front-part ribs 48, 56. Consequently, the LED board 84 is held by the lower-part case 15. In addition, a front surface of the LED board 84 makes contact with rear ends of the front-part ribs 52, 54 and the light-shielding wall part 56a of the front-part rib 56. In addition, the vents 58a-58d are provided in the surface that opposes a lower surface 84c of the LED board 84.

Engagement clearances C1, which are respectively located between the first ridge parts 30 of the upper-part case 14 and the first recessed parts 110 of the battery module 10, and engagement clearances C2, which are respectively located between second ridge parts 34a-34d of the upper-part case 14 and second recessed parts 64a-64d of the lower-part case 15, are explained below, with reference to FIG. 14 to FIG. 17.

Figure 14:
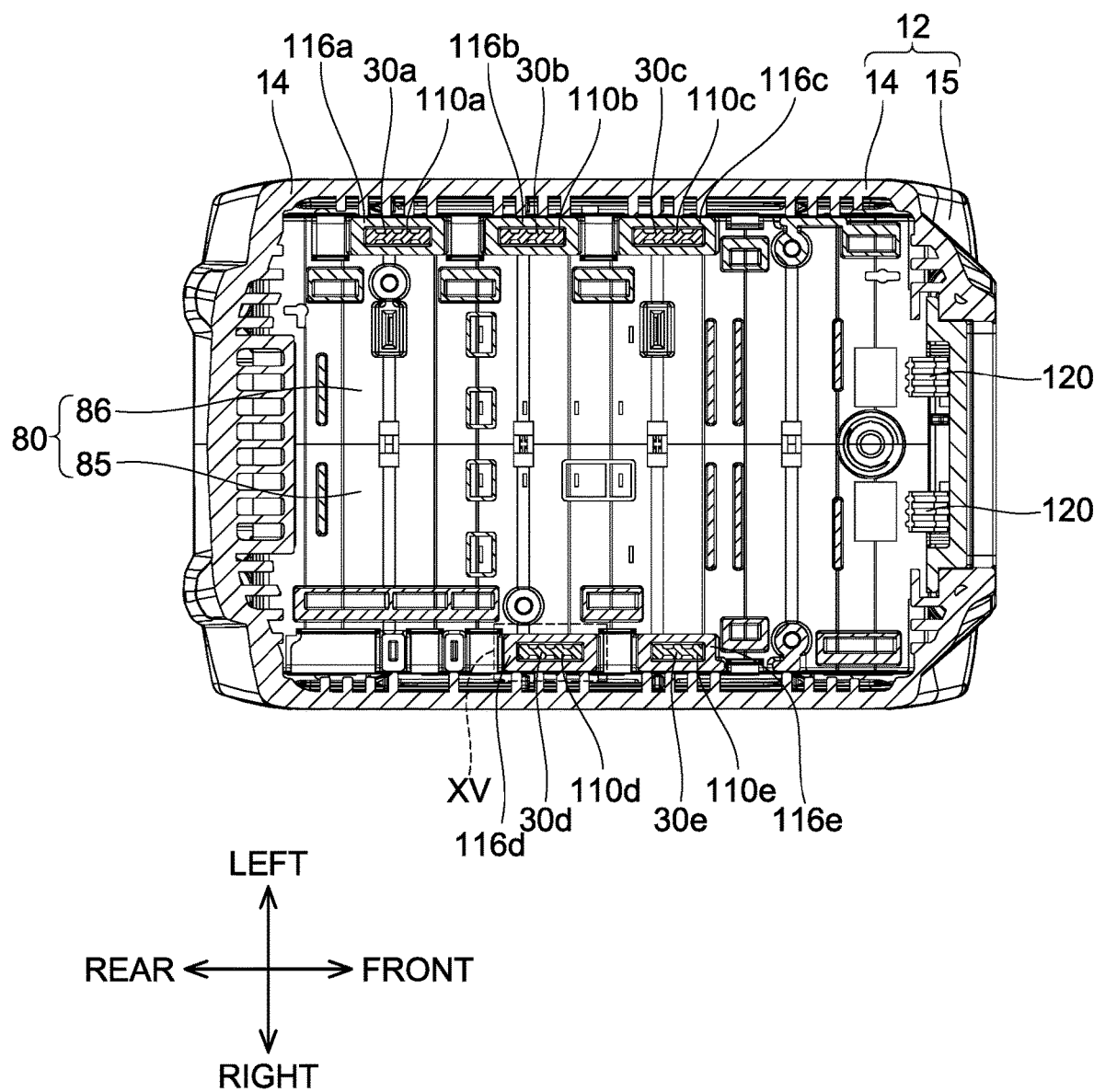
FIG. 14 is a cross-sectional view, viewed from above, of the battery pack 2 according to the present embodiment.

As shown in FIG. 14, the first ridge parts (protrusions) 30a-30e of the upper-part cases 14 are received in the first recessed parts (recesses, slots, blind holes) 110a-110e of the battery module 10, respectively. As shown in FIG. 15, engagement clearances (gaps) C1 are provided between the first ridge parts (30d) and the first recessed parts (110d) in the front-rear direction and in the left-right direction. The same engagement clearances C1 are also provided with regard to the other first ridge parts 30a-30c and first recessed parts 110a-110c.

Figure 16:
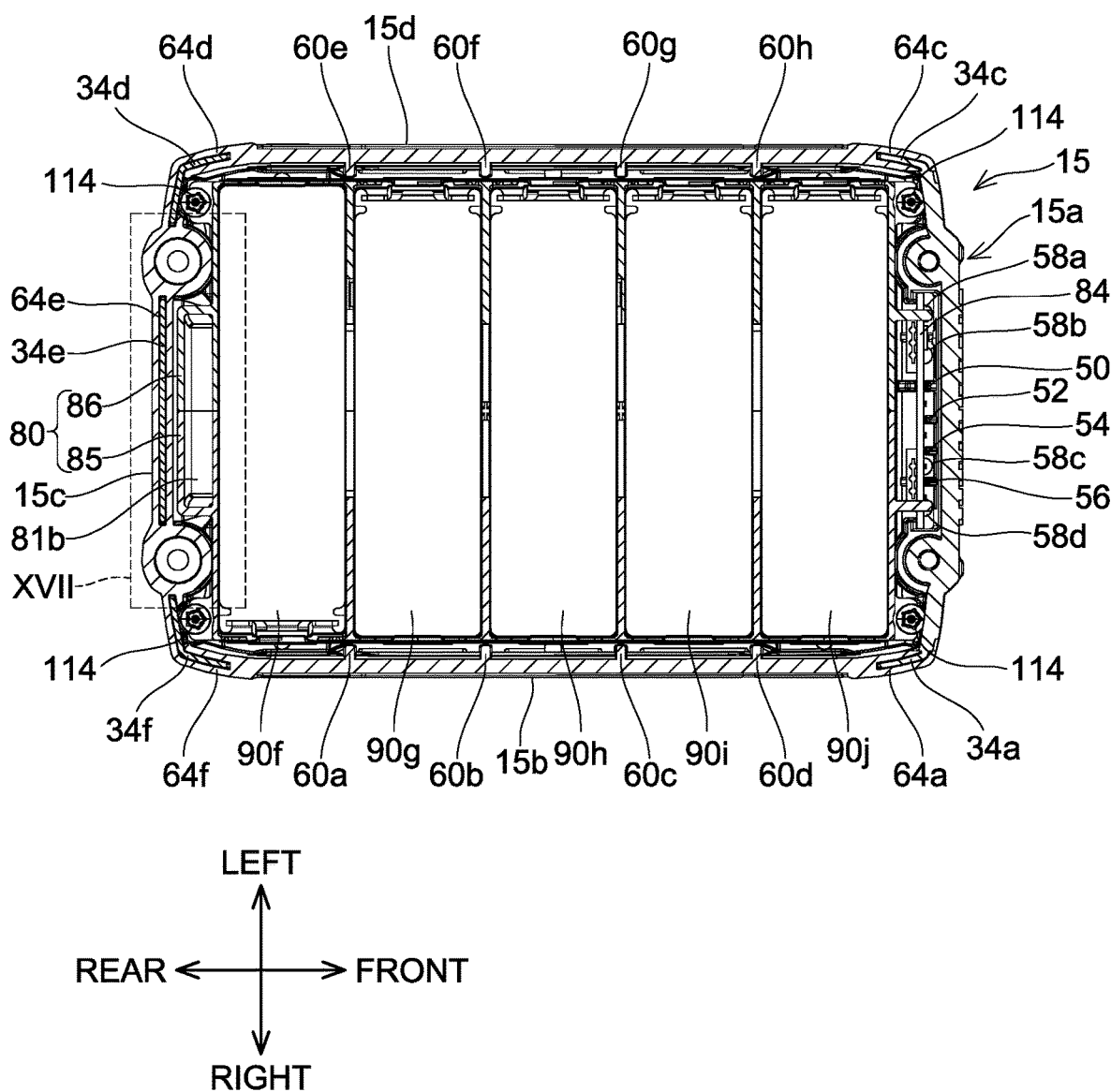
FIG. 16 is a cross-sectional view, viewed from above, of the battery pack 2 according to the present embodiment.
Figure 17:
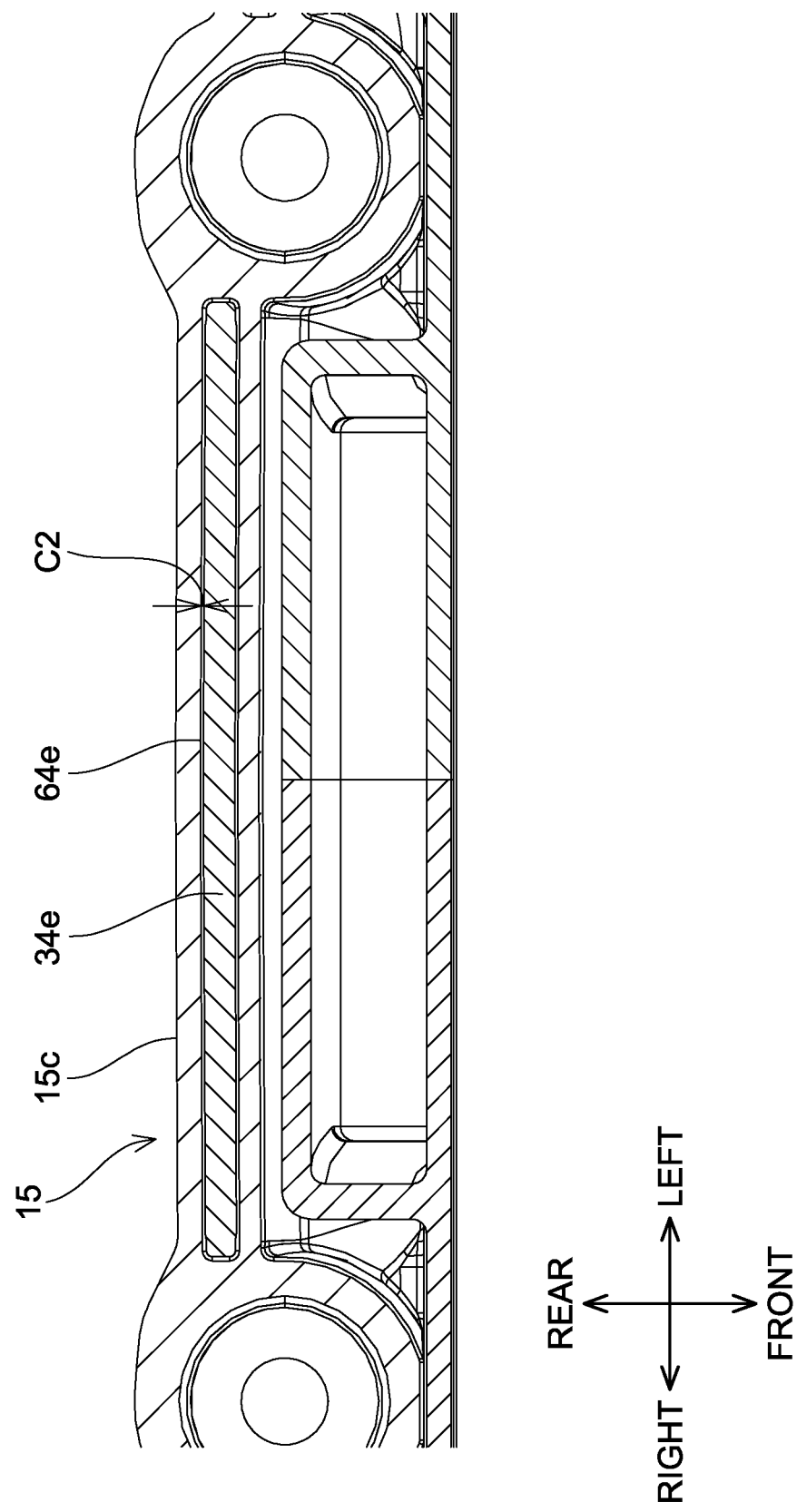
FIG. 17 is an enlarged view of the broken-line area XVII in FIG. 16.

In addition, as shown in FIG. 16, the second ridge parts (protrusions) 34a-34f of the upper-part case 14 are respectively received in the second recessed parts (recesses, slots, blind holes) 64a-64f of the lower-part case 15. As shown in FIG. 17, engagement clearance (gap) C2 is provided, e.g., between the second ridge part 34e and the second recessed part 64e. The same engagement clearances (gaps) C2 are also provided with regard to the other second ridge parts 34a-34d and 34f and second recessed parts 64a-64d and 64f. These engagement clearances C2 are designed (configured) to position (retain) the upper-part case 14 relative to the lower-part case 15 in directions perpendicular to the up-down direction, i.e. in a plane defined by the front-rear direction and the left-right direction. The engagement clearances C1 shown in FIG. 14 are designed (configured) to reduce the likelihood of mispositioning (misalignment) between the upper-part case 14 and the cell case 80. More specifically, the engagement clearances C1 should be set (designed, configured) such that mispositioning between the upper-part case 14 and the cell case 80 tends not to occur and contact between the upper-part case 14 and the control board 82 is thereby hindered or prevented. The engagement clearances C1 are preferably larger than the engagement clearances C2. It is noted that, as shown in FIG. 16, a labyrinth structure (tortious path) is formed by the interaction of the second ridge parts 34a-34f and the second recessed parts 64a-64f Thereby, the ingress of water into the outer case 12 via these parts is hindered.

Next, case clearances (gaps) C11-C13, which are located between the lower surface of the cell case 80 of the battery module 10 and the lower-part case 15, will be explained, with reference to FIG. 18 and FIG. 19. As described above, FIG. 18 is a cross-sectional view of the battery pack 2 at its center position in the left-right direction, and FIG. 19 is a cross-sectional view of the battery pack 2 at the location at which the right-side, rearward depression 16c of the lower-part case 15 is provided.

Figure 27:
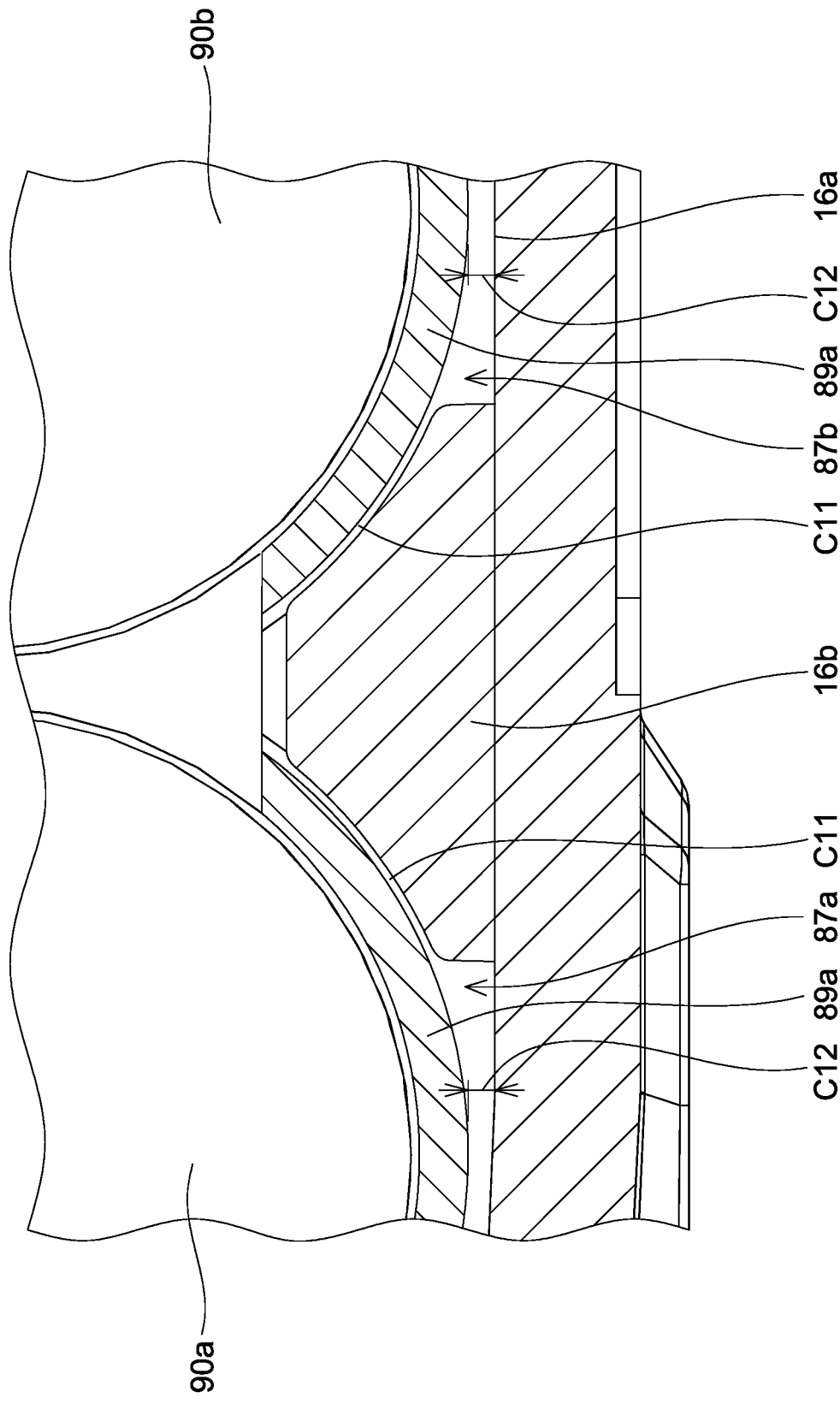
FIG. 27 shows an enlarged view of the lower left portion of the battery pack 2 that is shown in FIG. 18.

As shown in FIG. 18, the (entire) lower surface of the cell case 80 does not make contact with the upper surface of bottom wall 15e of the lower-part case 15. Specifically, referring to the enlarged view of the lower left portion of FIG. 18 that is shown in FIG. 27, case clearances C11 are provided between the center holding parts 89a of the cell-holding parts 87a-87c and the projections 16b, which protrude upward (i.e., inward in the up-down direction) from the bottom wall 15e of the lower-part case 15. In addition, case clearances C12 are provided between the center holding parts 89a and the flat part 16a. The case clearances C12 are larger than the case clearances C11.

In addition, as shown in FIG. 19, case clearance C13 is provided between the depression 16c and the end-surface-side holding part 89b corresponding to the battery cell 90a disposed at the location closest to the corresponding corner part 15f of the lower-part case 15. The step part 16d is provided between the portion of the bottom wall 15e of the lower-part case 15 that opposes a side surface 93a of the battery cell 90a and the portion of the bottom wall 15e of the lower-part case 15 that opposes a side surface 93b of the battery cell 90b. The same case clearance C13 is provided at each of the recessed parts 16a, 16b and 16d. It is noted that the step part 16d is not provided between the portion of the bottom wall 15e of the lower-part case 15 that opposes the side surface 93b of the battery cell 90b and the portion of the bottom wall 15e of the lower-part case 15 that opposes a side surface 93c of the battery cell 90c. Consequently, the case clearances C13 are larger than the case clearances C12.

Next, the positional relationship between the battery cell 90c, from among the plurality of battery cells 90a-90j, located in (at) the center of the lower level and the holes 40c, 40h provided rightward of the battery cell 90c will be explained in an exemplary, with reference to FIG. 20. It is noted that, in FIG. 20, the lead plate 92i is omitted to facilitate understanding.

As shown in FIG. 20, holes 40c, 40h are provided in the right-side surface 15b at locations at which they face an end surface of the (lower level) battery cell 90c in the longitudinal direction. It is noted that a hole is not provided in the right-side surface 15b at a location facing an end surface of the (upper level) battery cell 90h, which is located upward of the battery cell 90c, in the longitudinal direction. At least a portion of the holes 40c, 40h faces an end surface of the battery cell 90c in the longitudinal direction.

The metal part 91, which constitutes the positive electrode of the battery cell 90c, is provided on the right-side end surface of the battery cell 90c. The lower end (edge) 43h of the hole 40h in the upper level and the lower end (edge) 43c of the hole 40c in the lower level are provided downward of an upper end 94a of the battery cell 90c and downward of longitudinal-direction axis A1 of the battery cell 90c. In addition, the lower end 43c of the hole 40c in the lower level is provided downward of a lower end 91a of the metal part 91 and downward of a lower end 94b of the battery cell 90c.

Figure 21:
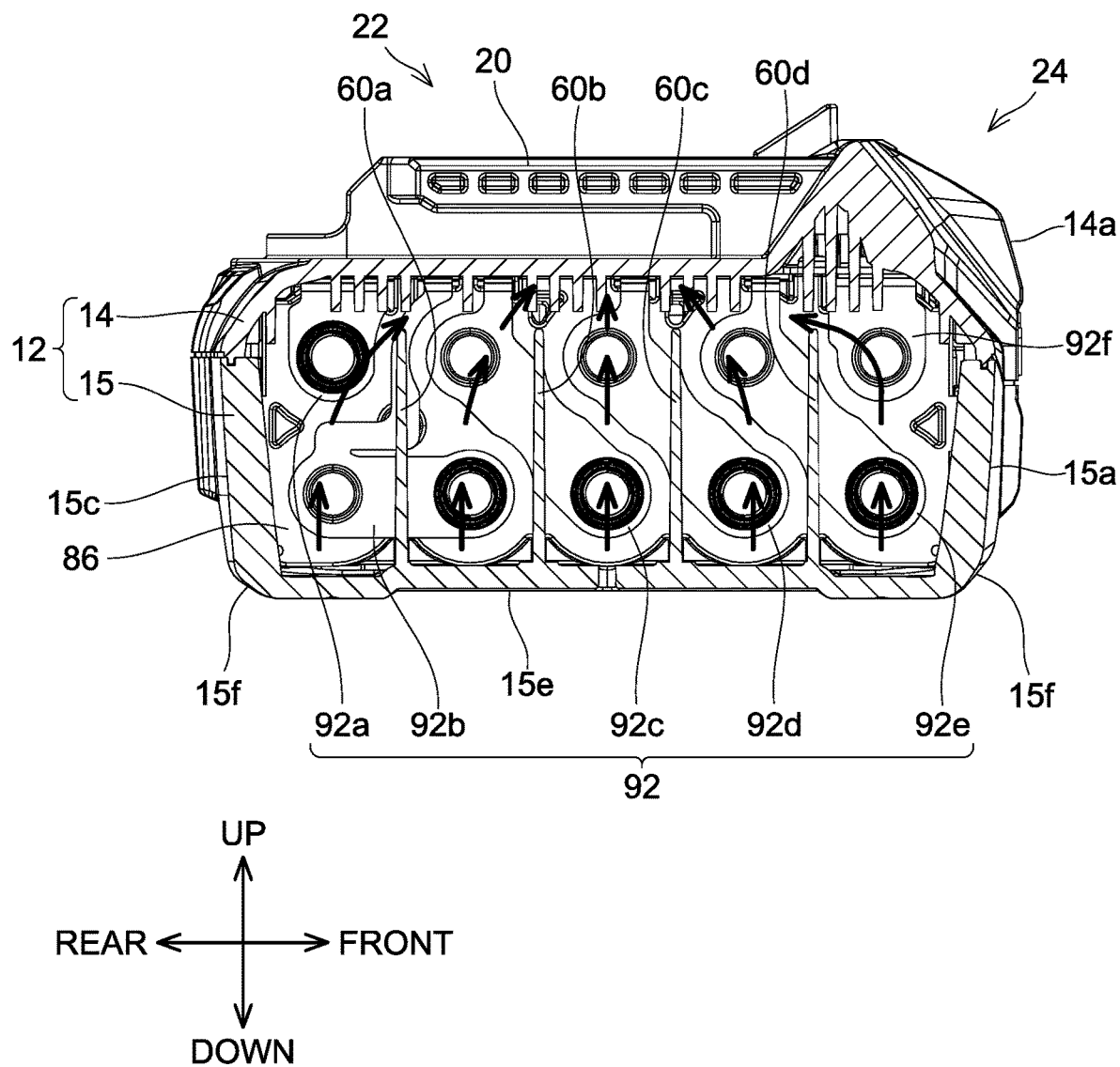
FIG. 21 is a cross-sectional view taken along line XXI-XXI in FIG. 12A and FIG. 12B.

Next, the flow of air inside the battery pack 2 will be explained, with reference to FIG. 21. Let us assume the circumstance in which, for example, the battery pack 2 was mounted on the power tool 200, the power tool 200 was used by the user, and then the battery pack 2 was removed from the power tool 200. During operation of the power tool 200, the temperature of the battery pack 2 increases owing to the discharge of current. Therefore, the vents 40, 41, which are provided at (in) the lower portion of the lower-part case 15, as shown in FIG. 1A, FIG. 3, and FIG. 8, function as air-suction holes through which air is introduced from outside into the interior of the battery pack 2. Specifically, the air around the battery cells 90a-90j within the battery pack 2 warms up, which causes the (cooler) air around the battery pack 2 to flow into the interior of the battery pack 2 via the vents 40, 41. The air introduced via the vent 40 (i.e. through the holes 40a-40j) into the battery pack 2 flows into the partitioned spaces between the plurality of battery cells 90a-90j and the lower-part case 15 in the following manner. As was described above, the side-part ribs 60a-60d are provided between the holes 40a-40j. Consequently, as shown in FIG. 20, the air introduced via the holes 40c, 40h flows into the space (vertical channel) between the battery cells 90c, 90h and the right-side surface 15b of the lower-part case 15. Likewise, the air introduced via the holes 40a, 40f flows into the space (vertical channel) between the battery cells 90b, 90g and the right-side surface 15b of the lower-part case 15, the air introduced via the holes 40b, 40g flows into the space (vertical channel) between the battery cells 90b, 90g and the right-side surface 15b of the lower-part case 15, the air introduced via the holes 40d, 40i flows into the space (vertical channel) between the battery cells 90d, 90i and the right-side surface 15b of the lower-part case 15, and the air introduced via the holes 40e, 40j flows into the space (vertical channel) between the battery cells 90e, 90j and the right-side surface 15b of the lower-part case 15. Accordingly, the plurality of battery cells 90a-90j is cooled reliably. After the air that has flowed into the spaces between the plurality of battery cells 90a-90j and the right-side surface 15b of the lower-part case 15 has cooled the plurality of battery cells 90, that heated air flows out to the exterior of the battery pack 2 via the terminal-opening part 22a, etc. of the terminal-receiving part 22 of the upper-part case 14. Thus, when the temperature of the battery cells 90a-90j inside the battery pack 2 is high, natural convection arises within the outer case 12. It is noted that the air introduced via the vent 41 into the battery pack 2 also flows into the spaces (vertical channels) between the battery cells 90a-90j and the left-side surface 15d of the lower-part case 15 and also is used in the cooling of the battery cells 90a-90j.

Next, the flow of air inside the battery pack 2 while the battery pack 2 is mounted on the charger 300 will be explained, with reference to FIG. 22 and FIG. 23. A ventilation fan (not shown) is installed in the charger 300 and is configured to suction air from the battery pack 2. In this state, the vents 40, 41 (refer to FIG. 1) and the vents 58a-58d (refer to FIG. 6) of the battery pack 2 function as air-suction holes through which air is introduced from the exterior into the interior of the battery pack 2, and the vent 26 (refer to FIG. 1) of the battery pack 2 functions as an air-exhaust hole through which air is exhausted from the interior of the battery pack 2 through the charger 300 to the outside (via a vent hole 310 in the charger 300 as shown in FIG. 25A).

As shown in FIG. 22, when the ventilation fan of the charger 300 is driven, air suctioned into the battery pack 2 via a vents 58*a*-58*d* (see also FIG. 1B) into the battery pack 2 flows into the space between the front part 80*a* of the cell case 80 and the front surface 15*a* of the lower-part case 15. The LED board 84 is provided between the front part 80*a* of the cell case 80 and the front surface 15*a* of the lower-part case 15. Therefore, the air that flows into the space between the front part 80*a* of the cell case 80 and the front surface 15*a* of the lower-part case 15 passes between the front part 80*a* of the cell case 80 and the LED board 84, passes through the vent 81*a* of (in) the cell case 80, and flows into the interior of the cell case 80. The air introduced into the cell case 80 passes through the spaces between the battery cells 90*f*-90*j* in the upper level and the battery cells 90*a*-90*e* in the lower level, the spaces between the battery cells 90*a*, 90*b*, 90*f*, 90*g* and the rearward-side coupling part 88, and the spaces between the battery cells 90*d*, 90*e*, 90*i*, 90*j* and the forward-side coupling part 88. Therefore, the air that passes through the interior of the cell case 80 cools the plurality of battery cells 90*a*-90*j*. Then, the heated air is suctioned into the charger 300 via the vent 81*b* of the rear part 80*b* of the cell case 80, the vent 26 of the upper-part case 14, and a vent 308 (refer to FIG. 25B) of the charger 300, which corresponds to the vent 26. As described above, when the battery pack 2 is mounted on the charger 300, the charger-side ridge part 306 of the charger 300 is inserted into the battery-side channel 27, which surrounds the vent 26. Consequently, the amount of air suctioned into the charger 300 through a gap, which may be (undesirably) present between the battery pack 2 and the charger 300, e.g., due to manufacturing tolerances, can be made less than in an embodiment in which the battery-side channel 27 is not provided around the vent 26. Thereby, the amount of air that flows inside the battery pack 2 can be increased because suctioning losses via the undesired gap are reduced. Accordingly, the battery cells 90*a*-90*j*, the lead plates 92, and the like inside the battery pack 2 can be cooled efficiently.

In addition, as shown in FIG. 23, the air introduced via the vent 40 into the battery pack 2 flows into the spaces (vertical channels) between the plurality of battery cells 90*a*-90*j* and the right-side surface 15*b* of the lower-part case 15 (more precisely, between the lead plates 92 and the right-side surface 15*b* of the lower-part case 15). The air that flows into the spaces between the battery cells 90*a*-90*j* and the right-side surface 15*b* of the lower-part case 15 flows toward the forward side, upward of the plurality of side-part ribs 60*a*-60*d*, and flows into the space between the front part 80*a* of the cell case 80 and the front surface 15*a* of the lower-part case 15. The flow of air thereafter is the same as is shown in FIG. 22. Thus, the air introduced via the vents 58*a*-59*d*, 40, 41 is used to cool the plurality of battery cells 90*a*-90*j*. It is noted that, in the present embodiment, the vent 40, 41 are provided at the lower portion of the lower-part case 15. Therefore, when the battery pack 2 is mounted on the charger 300, the vents 40, 41 are located at a height is higher than an upper surface of the charger 300. Because dust and the like tends to accumulate at lower locations, dust and the like tend not to be suctioned into the battery pack 2 owing to the fact the battery pack 2 is mounted above the charger 300 and the vents 40, 41 are located an upper most location at this time.

The effects of the battery-side channels (steps) 23*a*-23*d* of the upper-part case 14 of the battery pack 2 will be explained below, with reference to FIG. 24B. It is noted that FIG. 24B is a cross-sectional view, at the center position in the front-rear direction, of the battery-side signal terminal 106*a* (refer to FIG. 12A) of the battery pack 2 in the state in which the battery pack 2 is mounted on the power tool 200. As shown in FIG. 24B, the power tool 200 comprises a terminal-holding part 202. Tool-side ridge parts (protrusions) 206*a*-206*d*, which protrude toward the downward side (i.e., toward the battery pack 2), are provided on the terminal-holding part 202. The tool-side, negative-electrode terminal 208*a*, which corresponds to the battery-side, negative-electrode terminal(s) 104*a*, is provided on (in) the tool-side ridge part 206*a*, and the tool-side, positive-electrode terminal 208*b*, which corresponds to the battery-side, positive-electrode terminal(s) 104*b*, is provided on (in) the tool-side ridge part 206*d*. The tool-side signal terminal 210*a*, which corresponds to the battery-side signal terminal 106*a*, is provided on the tool-side ridge part 206*b*. It is noted that a tool-side signal terminal (not shown), which corresponds to the battery-side signal terminal 106*b*, is provided, forward of the tool-side signal terminal 210*a*, on the tool-side ridge part 206*b*. The tool-side signal terminal 210*c*, which corresponds to the battery-side signal terminal 106*c*, is provided on the tool-side ridge part 206*c*. It is noted that, because the battery-side signal terminal 106*d* is configured (adapted) to be used only while the battery pack 2 is mounted on the charger 300, a tool-side signal terminal corresponding to the battery-side signal terminal 106*d* is not provided, forward of a tool-side signal terminal 210*c*, on (in) the tool-side ridge part 206*c*. When the battery pack 2 is mounted on the power tool 200, the tool-side ridge parts 206*a*-206*d* are inserted into the battery-side channels 23*a*-23*d*, respectively. Owing to this design, the creepage distance between adjacent terminals of the power tool 200 in the left-right direction can be made longer than in an embodiment in which the tool-side ridge parts 206*a*-206*d* are not provided on the terminal-holding part 202 of the power tool 200. More specifically, the increase of the creepage distance corresponds to the combined heights of each pair of adjacent tool-side ridge parts 206*a*-206*d*. Accordingly, a short circuit between two adjacent terminals of the power tool 200 in the left-right direction is less likely to occur.

As shown in FIG. 1 to FIG. 13, a battery pack 2 according to the first embodiment comprises: the outer case 12, which comprises the upper-part case 14 and the lower-part case 15 fixed to the upper-part case 14; the battery cells 90; and the cell case 80, which houses the battery cells 90. In addition, as shown in FIG. 18 and FIG. 19, one or more clearances (gaps) C11-C13 are provided between the lower-part case 15 and the entire lower surface of the cell case 80 such that the entire lower surface of the cell case 80 does not directly contact the lower-part case 15. According to the above-mentioned configuration, even if the lower-part case 15 of the outer case 12 is subjected to an impact (e.g., due to a drop) and thereby the lower-part case 15 deforms, it is less likely that the lower-part case 15 will contact the lower surface of the cell case 80. Accordingly, in the event that the lower-part case 15 is subjected to an impact, deformation of (damage to) the battery cells 90 housed in the cell case 80 is less likely to occur owing to the clearances C11-C13. Although the entire lower surface of the cell case 80 does not directly contact the lower-part case 15, the depth (vertical distance) of the clearance(s) (C11-C13) may vary within a horizontal plane that is parallel to the bottom wall 15e of the lower-part case 15. Thus, in one or more areas, the depth of the clearance (C13) may be greater than the depth of the clearance (C11, C12) in other areas. In other words, the depth of the clearance(s) (C11-C13) need not be uniform across the entire plane of separation (gap) between the lower surface of the cell case 80 and the upper surface of the bottom wall 15e.

In one or more embodiments, as shown in FIG. 12A, the cell case 80 is screw-fastened to the lower-part case 15, e.g., by screws 114 passing through screw holders 112 and screw holes 62. According to the above-mentioned configuration, if the user drops the battery pack 2, the likelihood of mispositioning (misalignment) between the lower-part case 15 and the cell case 80 can be reduced. Accordingly, even if an impact is imparted to the lower-part case 15, the likelihood of damage to the battery cells 90 housed in the cell case 80 can be further reduced.

In one or more embodiments, as shown in FIG. 10, five of the battery cells 90a-90e are housed, in the lower-part case 15 (more specifically, in the cell case 80), lined up parallel to the bottom wall 15e of the lower-part case 15. The five battery cells 90a-90e include the (outward) battery cells 90a, 90e, which are respectively closest to the corner parts 15f of the lower-part case 15 (i.e. the corner parts 15f that are opposite of each other in the front-rear direction of the battery pack 2), and the (inward) battery cells 90b-90d, which are provided (disposed) inward of (between) the battery cells 90a, 90e. As shown in FIG. 19, case clearance C13 between the cell-holding part 87a, which holds the (outward) battery cell 90a, and the lower-part case 15 is larger than case clearance C12 between the cell-holding part 87b, which holds the (inward) battery cell 90b, and the lower-part case 15. In other words, the depth (distance in the up-down direction of the battery pack 2) of the clearance (gap) C13 is greater than the depth (distance in the up-down direction of the battery pack 2) of the clearance (gap) C12. According to the above-mentioned configuration, even if the corner part 15f at one of the four corners of the bottom wall 15e of the lower-part case 15 has been deformed, e.g., by an impact caused by dropping the battery pack 2, the likelihood that the lower-part case 15 will contact the lower surface of the cell case 80 can be reduced. Accordingly, if the lower-part case 15 is subjected to an impact, the likelihood of damage to the battery cells 90 housed in the cell case 80 can be further reduced.

In one or more embodiments, as shown in FIG. 18 and FIG. 19, the cell-holding part 87a, which holds the (outward) battery cell 90a, comprises the end-surface-side holding part 89b, which holds (supports) one longitudinal end-surface side (one longitudinal end portion) of the battery cell 90a in the longitudinal direction, and the center holding part 89a, which holds (supports) a central portion of the battery cell 90a in the longitudinal direction of the battery cell 90a. The case clearance C13 (i.e. the depth of the gap) between the end-surface-side holding part 89b and the lower-part case 15 (i.e. the upper surface of the bottom wall 15e) is larger than the case clearance C12 (i.e. the depth of the gap) between the center holding part 89a and the lower-part case 15 (i.e. the upper surface of the bottom wall 15e). That is, the depth of case clearance C13 is again greater than the depth of case clearances C11, C12. The end-surface-side holding parts 89b are respectively disposed closer to the corner parts 15f at the four corners of the bottom wall 15e of the lower-part case 15 than are the center holding parts 89a. According to the above-mentioned configuration, even if the corner part 15f at one of the four corners of the bottom wall 15e of the lower-part case 15 has been deformed, the likelihood that the lower-part case 15 will contact the lower surface of the cell case 80 can be reduced. Accordingly, if the lower-part case 15 is subjected to an impact, in particular at one of the corner parts 15f, the likelihood of damage to the battery cells 90 housed in the cell case 80 can be further reduced.

In one or more embodiments, as shown in FIG. 6 and FIG. 19, the step part 16d is provided within the bottom wall 15e of the lower-part case 15, for example, between the side surface 93a of the (outward) battery cell 90a and the side surface 93b of the battery cell 90b. The step part 16d descends downward from the battery cell 90b side toward the battery cell 90a side. It is noted that, preferably, four of the step parts 16d are provided within the bottom wall 15e of the lower-part case 15 in the vicinity of the four corner parts 15f, respectively. Each of the step parts 16d has a border at a location in the bottom wall 15e that is vertically below a position between the side surface (93a) (or the longitudinal axis A1) of one of the (outward) battery cells 90a, 90e and the side surface (93b) (or the longitudinal axis A1) of one of the (inward) battery cells 90b, 90d. Each of the step parts 16d has a base or bottom that farther away from the (outward) battery cell 90a, 90e in the up-down direction of the battery pack 2 than the flat part 16a of the bottom wall 15e. As can be seen in FIG. 6, each of the step parts 16d also has a border that descends in the left-right direction of the battery pack 2, such that the flat part 16a of the bottom wall 15e is disposed between two of the step parts 16d in the left-right direction. According to the above-mentioned configuration, the case clearance(s) C13 between the cell-holding part 87a, which holds the battery cell 90a, and the lower-part case 15 (in particular, the base or bottom of the step part(s) 16d) can be made larger than the case clearance C12 between the cell-holding part 87b, which holds the battery cell 90b, and the lower-part case 15 (in particular, the flat part 16a of the bottom wall 15e). Consequently, even if the corner part 15f at one of the four corners of the bottom wall 15e of the lower-part case 15 has been deformed, the likelihood that the lower-part case 15 will contact the lower surface of the cell case 80 can be reduced, thereby reducing the likelihood of damage to the battery cells 90 housed in the cell case 80 in the event that the battery pack 2 is dropped.

In one or more embodiments, as shown in FIG. 19, thickness t11 of the thick-wall part 80c of the corner portion at one of the four corners of the lower portion of the cell case 80 is thicker than thickness t12 of the cell case 80 downward of the longitudinal-direction axis A1 of the adjacent battery cell 90a. Preferably, the thickness t11 of the thick-wall parts 80c of each of the corner portions at the four corners of the lower portion of the cell case 80 is thicker than thickness t12 of the cell case 80 downward of the longitudinal-direction axis A1 of the adjacent battery cell 90a, 90e. According to the above-mentioned configuration, it is possible to increase the strength of the portion(s) of the cell case 80 where there is a higher likelihood that the lower-part case 15 will make contact with the cell case 80 in the event that the battery pack 2 is dropped and, e.g., hits the ground at one of the corner parts 15f. Accordingly, even if the lower-part case 15 makes contact with the cell case 80 in such a situation, the likelihood of damage to the battery cells 90 housed in the cell case 80 can be reduced.

(Correspondence Relationships)

Each of the battery cells 90a, 90e is one example of an "outward battery cell." Each of the battery cells 90b-90d is one example of an "inward battery cell." The cell-holding part 87a, which holds the battery cell 90a, [[and] the cell-holding part 87b, which holds the battery cell 90b, and the cell-holding part 87e, which holds the battery cell 90e, are examples of a "first cell-holding part," [and] a "second cell-holding part," and a "third cell-holding part", respectively.

Second Embodiment

Battery pack 602 according to a second embodiment will now be explained, with reference to FIG. 26. In the battery pack 602 according to the second embodiment, the structure of lower-part case 615 of outer case 612 differs from the structure of the lower-part case 15 of the outer case 12 of the battery pack 2 according to the first embodiment. In addition, in the battery pack 602, the size, etc. of the battery cells (not shown) housed inside the outer case 612 differ from those of the battery cells 90a-90j housed inside the outer case 12 according to the first embodiment. Specifically, the battery cells of the present embodiment are 21700-type, lithium-ion battery cells and have a rated voltage of 3.6V. Consequently, the size of the outer case 612 is larger than that of the outer case 12 in the first embodiment. It is noted that, because the ten battery cells 90a-90j are housed inside the outer case 612 in the same manner as in the battery pack 2 of the first embodiment, the method of connecting the battery cells is the same as in the battery pack in the first embodiment. Accordingly, the rated voltage of the battery pack 602 in the present embodiment is likewise 36V.

Figure 26:
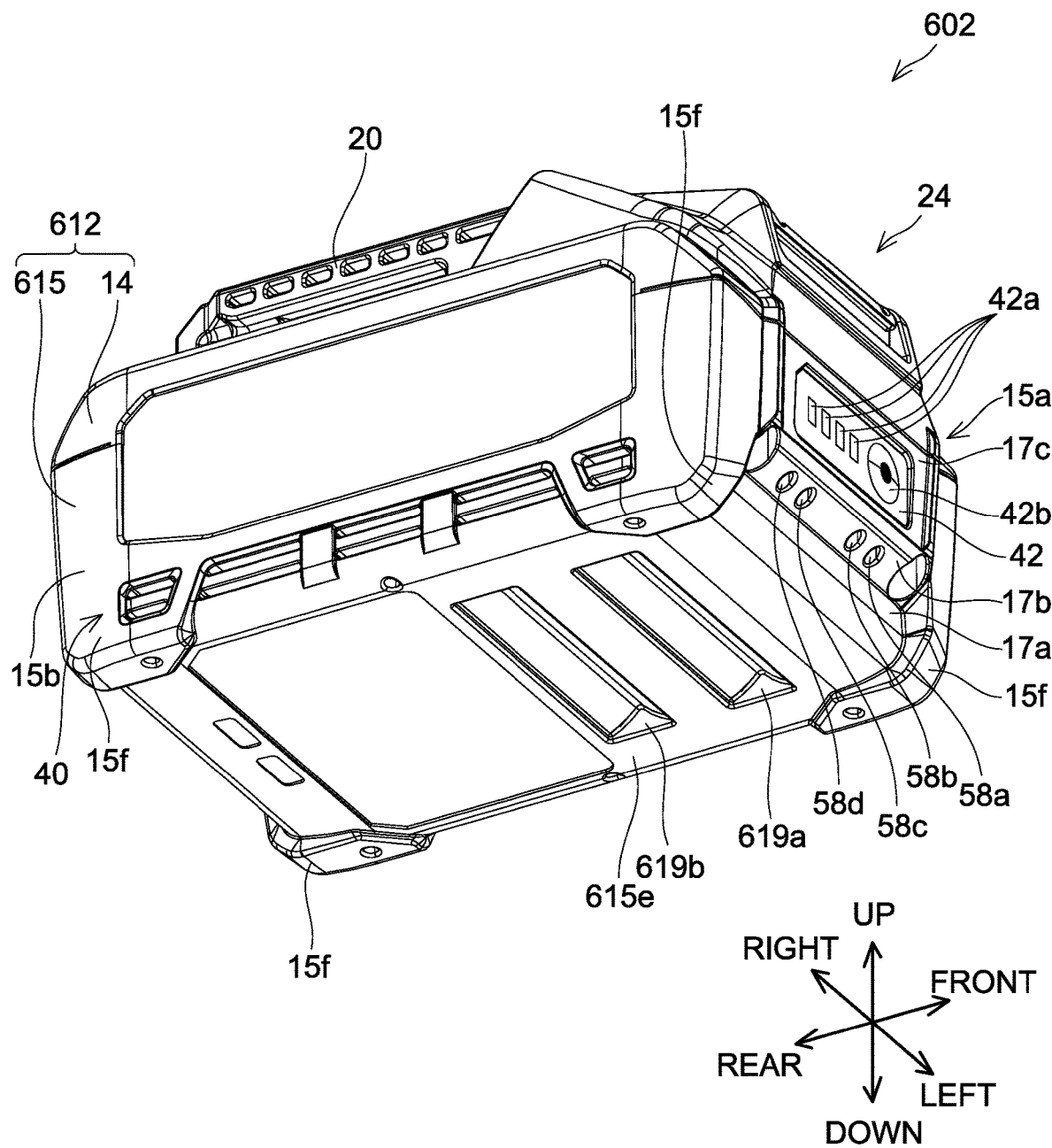
FIG. 26 is an oblique view, viewed from the front, the right, and below, of a battery pack 602 according to a second embodiment of the present teachings.

As shown in FIG. 26, two hook parts 619a, 619b, which are lined up (parallel) in the front-rear direction, are provided on bottom surface 615e of the lower-part case 615. Therefore, when the user wishes to remove the battery pack 2 from the power tool 200 or the charger 300, the user can insert one or more fingers into one of the two hook parts 619a, 619b, that is best suited to the length of the user's finger(s). Accordingly, removal of the battery pack 2 from the power tool 200 or the charger 300 can be made easier.

Additional configurations of the battery pack disclosed by the present specification are described below.

(Configuration 1)
A battery pack mountable, by sliding, on a power tool, comprising:
  a first terminal;
  a second terminal;
  an outer case, which houses the first terminal and the second terminal;
  wherein:
  a first terminal-opening part, which is provided at a location corresponding to the first terminal, and a second terminal-opening part, which is provided at a location corresponding to the second terminal, are provided in an upper surface of the outer case; and
  a first battery-side channel (recessed part) is provided between the first terminal-opening part and the upper surface and a second battery-side channel (recessed part) is provided between the second terminal-opening part and the upper surface.

(Configuration 2)
The battery pack according to configuration 1, wherein the battery-side channels (recessed parts) have a shape that matches (corresponds to, is complementary to) tool-side ridge parts of the power tool.

(Configuration 3)
The battery pack according to configuration 1 or 2, wherein:
  the first terminal is a discharge terminal; and
  the second terminal is a signal terminal.

(Configuration 4)
A battery pack comprising:
  a first terminal;
  a second terminal;
  a third terminal;
  a fourth terminal; and
  an outer case, which houses the first terminal, the second terminal, the third terminal, and the fourth terminal;
  wherein:
  the outer case comprises a pair of slide rails that receive a power tool by being slid;
  a first terminal-opening part, which is provided at a location corresponding to the first terminal, a second terminal-opening part, which is provided at a location corresponding to the second terminal, a third terminal-opening part, which is provided at a location corresponding to the third terminal, and a fourth terminal-opening part, which is provided at a location corresponding to the fourth terminal, are provided in an upper surface of the outer case between the pair of slide rails;
  the first terminal-opening part, the second terminal-opening part, the third terminal-opening part, and the fourth terminal-opening part are disposed, from one slide rail of the pair of slide rails toward the other slide rail, in the order of the first terminal-opening part, the second terminal-opening part, the third terminal-opening part, and the fourth terminal-opening part; and
  a battery-side channel (recessed part) is provided between the first terminal-opening part and the upper surface, a battery-side channel (recessed part) is provided between the second terminal-opening part and the upper surface, a battery-side channel (recessed part) is provided between the third terminal-opening part and the upper surface, and a battery-side channel (recessed part) is provided between the fourth terminal-opening part and the upper surface.

(Configuration 5)
The battery pack according to configuration 4, wherein the battery-side channels (recessed parts) have a shape that matches (corresponds to, is complementary to) tool-side ridge parts of the power tool.

(Configuration 6)
The battery pack according to configuration 4 or 5, wherein:
  the first terminal and the fourth terminal are discharge terminals; and
  the second terminal and the third terminal are signal terminals.

(Configuration 7)
A battery pack, which is mountable, by the being slid from the front to the rear, on an external apparatus, comprising:
  an outer case;
  wherein:
  the outer case comprises:
  a pair of slide rails that receive the external apparatus by being slid;
  a terminal-opening part, which is provided between the pair of slide rails;
  a surface that is between the pair of slide rails and rearward of the terminal-opening part;
  a vent; and
  a battery-side channel (recessed part), which is provided between the pair of slide rails and between the vent and the surface rearward of the terminal-opening part.

(Configuration 8)

The battery pack according to configuration 7, wherein the battery-side channel (recessed part) has a shape that matches a (corresponding, complementary, matching) apparatus-side ridge part of the external apparatus.

Concrete examples of the present invention are explained above in detail, but these are merely illustrative examples and do not limit the claims. The techniques described in the claims include variations and modifications of the concrete examples illustrated above.

First Modified Example

The cell case 80 may be screw-fastened to the upper-part case 14.

Second Modified Example

Case clearances C11-C13 may be the same, i.e. have the same depth in the up-down direction. In addition, case clearances C11, C12 optionally may be larger than case clearances C13.

Third Modified Example

The step parts 16d do not have to be provided on (in) the bottom wall 15e of the lower-part case 15.

Fourth Modified Example

The thick-wall parts 80c do not have to be provided at the corner portions at the four corners of the lower portion of the cell case 80. That is, when the cell case 80 is viewed from the right, the corner portions at the four corners of the lower portion of the cell case 80 may have a shape that matches (corresponds to) the outer shape of the battery cells 90.

The technical elements explained in the present specification and the drawings exhibit technical utility on their own or in various combinations and are not limited to the combinations recited in the claims at the time of application. In addition, the techniques illustrated in the present specification and the drawings can simultaneously achieve multiple objects and, by achieving one among those objects, have technical utility on their own.

This application hereby incorporates by reference the entire disclosure of application Ser. No. 17/036,356, and the entire disclosure of application Ser. No. 17/036,411.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved battery packs for cordless tools.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EXPLANATION OF THE REFERENCE NUMBERS

2 Battery pack
10 Battery module
12 Outer case
14 Upper-part case
14a Front surface
14b1 Forward-upper surface
14b2 Rearward-upper surface
15 Lower-part case
15a Front surface
15b Right-side surface
15c Rear surface
15d Left-side surface
15e Bottom surface
15f Corner part
16a Flat part
16b Projection
16c Depression
16d Step part
17a First upward-extending surface
17b Tilted surface
17c Second upward-extending surface
18 Screw
19 Hook part
20 Slide rail
20a Base part
20b Upward-extending part
20c First rightward-extending part
20d Second rightward-extending part
20e Slots
22 Terminal-receiving part
22a-22d Terminal-opening parts
23a-23d Battery-side channels
24 Hook
24a Manipulatable part
24b Projection
26 Vent
27 Battery-side channel
28 Screw hole
30a-30e First ridge parts
32a Thick-wall part
32b Thin-wall part
34a-34f Second ridge parts
40 Vent
40a-40j Holes
41 Vent
41a-41j Holes
42 Display part
42a Remaining-battery-charge display part
42b Button
43c Lower end
43h Lower end
46 Screw hole 48 Front-part rib
50 Front-part rib
50a Groove part
52 Front-part rib
54 Front-part rib
56 Front-part rib
56a Light-shielding wall part
56b Flat part
58a-58d Vents
60a-60h Side-part ribs
62 Screw hole
64a-64f Second recessed parts
80 Cell case
80a Front part
80b Rear part
80c Thick-wall part
80d Upper surface
80e Right-side surface
80f Left-side surface
80g Hollow part
81a Vent
81b Vent
82 Control board
83 Screw boss
84 LED board
84a LED
84b Switch
84c Lower surface
85 Right cell case
86 Left cell case
87a-87j Cell-holding parts
88 Coupling part
89a Center holding part
89b End-surface-side holding part
90a-90j Battery cells
91 Metal part
91a Lower end
92a-92k Lead plates
93a-93c Side surfaces
94a Upper end
94b Lower end
95 Waterproof ring
100 Fastener
102 Terminal
104a Battery-side, negative-electrode terminal
104b Battery-side, positive-electrode terminal
106a-106d Battery-side signal terminals
110a-110e First recessed parts
112 Screw holder
114 Screw
116a-116e Protruding parts
120 Signal line
200 Power tool
202 Terminal-holding part
206a-206d Tool-side ridge parts
208a Tool-side, negative-electrode terminal
208b Tool-side, positive-electrode terminal
210a, 210c Tool-side signal terminals
300 Charger
302 Slide rail
304 Housing
306 Charger-side ridge part
308 Vent
602 Battery pack
612 Outer case
615 Lower-part case
615e Bottom surface
619a, 619b Hook parts

The invention claimed is:

1. A battery pack comprising:
an outer case that comprises an upper case fixed to a lower case;
at least one battery cell; and
a battery cell case, which houses the at least one battery cell and has a lower surface, the battery cell case being disposed within the outer case;
wherein:
the battery cell case is fixedly attached to the outer case such that a continuous clearance is provided between the entire lower surface of the battery cell case and the lower case,
the continuous clearance is defined by a single air gap of varying depths that extends continuously between the entire lower surface of the battery cell case and the lower case,
two rails configured to slidably mount the battery pack to a power tool are defined on the upper case,
at least two battery terminals are electrically connected to the at least one battery cell and respectively project into terminal openings defined in the upper case,
the at least two battery terminals are disposed between the two rails,
the at least one battery cell includes three or more of the battery cells provided, in the battery cell case, lined up parallel to a bottom wall of the lower case;
the three or more battery cells include first and second outward battery cells respectively disposed closest to corner portions of the lower case, and an inward battery cell disposed between the first and second outward battery cells;
the lower surface of the battery cell case includes a first cell-holding part that holds the first outward battery cell, a second cell-holding part that holds the inward battery cell and a third cell-holding part that holds the second outward battery cell; and
portions of the continuous clearance disposed between the bottom wall of the lower case and a bottommost portion of both the first cell-holding part and the third cell-holding part have a first depth that is larger than a second depth of another portion of the continuous clearance disposed between the bottom wall of the lower case and a bottommost portion of the second cell-holding part.

2. The battery pack according to claim 1, wherein:
the first cell-holding part comprises an end-surface-side holding part that holds one longitudinal end portion of the first outward battery cell, and a center holding part that holds a longitudinally central portion of the first outward battery cell; and
the first depth of the continuous clearance at a bottommost point of the end-surface-side holding part is larger than the second depth of the continuous clearance at a bottommost point of the center holding part.

3. The battery pack according to claim 2, wherein:
a wall thickness (t11) of a corner portion of a lower portion of the battery cell case is thicker than a wall thickness (t12) of the battery cell case downward of a longitudinal-direction axis (A1) of the first outward battery cell;
the battery cell case is screw-fastened to the upper case;
the battery cell case is also screw-fastened to the lower case by screws passing through screw holders on side surfaces of the battery cell case and screw holes in the lower case;

at least two battery terminals extend upward from an upper surface of the upper case and are electrically connected to the battery cells; and the upper surface of the upper case is opposite of the bottom wall of the lower case.

4. The battery pack according to claim 1, wherein:
the bottom wall has a flat part in a central portion and a depression in one of the corner portions and located directly below a portion of the first cell-holding part,
a step is provided within the bottom wall of the lower case between the flat part and the depression and is located between a side surface of the first outward battery cell and a side surface of the inward battery cell; and
the step descends downward away from the first outward battery cell in a lateral direction from the inward battery cell toward the first outward battery cell such that a surface of the flat part is higher than a surface of the depression, the lateral direction being perpendicular to a direction of the first depth of the continuous clearance.

5. The battery pack according to claim 4, wherein the first depth of continuous clearance between the step and the side surface of a longitudinal end portion of the first outward battery cell is greater than the second depth of the continuous clearance between a flat part of the lower case and the side surface of a central portion of the first outward battery cell in a longitudinal direction of the first outward battery cell, the longitudinal direction being perpendicular to the lateral direction and to the direction of the first depth of the continuous clearance.

6. The battery pack according to claim 4, wherein the bottom wall has a uniform thickness such that a portion of the bottom wall having the step protrudes downward in the direction of the first depth of the continuous clearance more than a central portion of the bottom wall.

7. The battery pack according to claim 1, wherein:
the corner portions of the lower case include first, second, third and fourth corner portions;
first, second, third and fourth steps are provided within the bottom wall of the lower case adjacent to the first, second, third and fourth corner portions, respectively;
the first and second steps are provided between a side surface of the first outward battery cell and a side surface of the inward battery cell and descend downwardly away from the first outward battery cell in a lateral direction from the inward battery cell toward the first outward battery cell, the lateral direction being perpendicular to a direction of the first depth of the continuous clearance;
the third and fourth steps are provided between a side surface of the second outward battery cell and the side surface of the inward battery cell or a side surface of another inward battery cell and descend downwardly away from the second outward battery cell in the lateral direction from the inward battery cell toward the second outward battery cell; and
the first, second, third and fourth steps are disposed between a flat part of the bottom wall and depressions in the bottom wall such that an upper surface of the depressions is lower than an upper surface of the flat part.

8. The battery pack according to claim 1, wherein:
at least one projection is provided on the bottom wall of the lower case;
the continuous clearance between the first holding part and the at least one projection has a smaller depth than the second depth of the continuous clearance; and the continuous clearance between the second holding part and the at least one projection also has a smaller depth than the second depth of the continuous clearance.

9. The battery pack according to claim 1, wherein a wall thickness (t11) of a corner portion of a lower portion of the battery cell case directly adjacent to the first outward battery cell is thicker than a wall thickness (t12) of the battery cell case downward of a longitudinal-direction axis (A1) of the first outward battery cell.

10. The battery pack according to claim 1, wherein the battery cell case is screw-fastened to the outer case.

11. The battery pack according to claim 1, wherein the battery cell case is screw-fastened to the upper case.

12. The battery pack according to claim 1, wherein the battery cell case is screw-fastened to the lower case by screws passing through screw holders on side surfaces of the battery cell case and screw holes in the lower case.

13. The battery pack according to claim 1, wherein:
the at least one battery terminals extend upward from an upper surface of the upper case and are electrically connected to the battery cells;
wherein the upper surface of the upper case is opposite of a bottom wall of the lower case.

14. A battery pack comprising:
an outer case that comprises an upper case that is screw-fastened to a lower case;
at least first second and third battery cells; and
a battery cell case disposed inside the outer case and holding the first, second and third battery cells in a plane parallel to a bottom plate of the lower case such that longitudinal axes of the first, second and third battery cells extend in parallel and the second battery cell is disposed between the first and third battery cells in the plane,
wherein:
the lower case includes walls respectively integrally extending perpendicularly from all sides of the bottom plate,
a bottom wall of the battery cell case has a bottom surface that faces an interior surface of the bottom plate,
the battery cell case is fixedly attached to the outer case such that no portion of the bottom wall of the battery cell case directly contacts the lower case and a continuous air gap having varying depths is provided between the entire bottom wall of the battery cell case and the lower case, and
portions of the continuous air gap disposed between the bottom surface of the lower case and a bottommost portion of the battery cell case directly below the first and third battery cells has a first depth that is larger than a second depth of another portion of the continuous air gap disposed between the bottom surface of the lower case and a bottommost portion of the battery cell case directly below the second battery cell.

15. The battery pack according to claim 14, wherein:
at least one side wall of the battery cell case extends perpendicularly to the lower surface of the battery cell case, and
the at least one side wall of the battery cell case is fixedly attached to at least one of the side walls of the lower case.

16. The battery pack according to claim 15, wherein:
two rails configured to slidably mount the battery pack to a power tool are defined on the upper case, at least two battery terminals are electrically connected to the first, second and third battery cells and respectively project into terminal openings defined in the upper case, and the at least two battery terminals are disposed between the two rails.

17. The battery pack according to claim 16, wherein:

the bottom plate of the lower case has four corners, at each of the four corners, portions of the continuous air gap between the bottommost surface of the battery cell case and the interior surface of the bottom plate of the lower case have a first depth, at a center position in a longitudinal direction of the at least one battery cell between any two of the four corners, another portion of the continuous air gap between the bottommost surface of the battery cell case and the interior surface of the bottom plate of the lower case has a second depth, and the first depth is greater than the second depth.

18. The battery pack according to claim 17, wherein:

the two rails are defined on an upper wall of the upper case, and the battery cell case is screw fastened to the lower case.

19. The battery pack according to claim 18, wherein:

cell-holding parts are defined in the bottom wall of the battery cell case, the cell-holding parts are each arc shaped, and the battery cells are respectively disposed in the cell-holding parts.

20. A battery pack comprising:

an outer case that comprises an upper case fixed to a lower case;

at least first second and third battery cells; and a battery cell case housing the first, second and third battery cells, the battery cell case being disposed within the outer case, wherein:

the battery cell case holds the first, second and third battery cells in a plane parallel to a bottom plate of the lower case such that longitudinal axes of the first, second and third battery cells extend in parallel and the second battery cell is disposed between the first and third battery cells, the battery cell case has a lower surface comprising all portions of the battery cell case on which the battery cell case would rest if placed on a planar surface, the battery cell case is fixedly attached to the outer case such that no point on the lower surface of the battery cell case, and no point located between any two points on the lower surface of the battery cell case, contacts an interior bottom wall of the lower case, and a first gap between the interior bottom wall of the lower case and a bottommost portion of the lower surface of battery cell case directly below the first and third battery cells is larger than a second gap between the interior bottom wall of the lower case and a bottommost portion of the lower surface battery cell case directly below the second battery cell.

21. The battery pack according to claim 20, wherein the outer case includes a pair of rails configured to slidably mount the battery pack to a power tool.

22. The battery pack according to claim 21, wherein the outer case includes a hook configured to releasably secure the battery pack to a power tool and a button configured to move the hook to release the battery pack from the power tool.

23. The battery pack according to claim 20, wherein:

the first gap is located between an end-surface-side holding part of the battery cell case that holds one longitudinal end portion of the first battery cell, a third gap is located between a center holding part of the battery cell case that holds a longitudinally central portion of the first battery cell; and the first gap is larger than the third gap.

24. The battery pack according to claim 20, wherein a wall thickness (t11) of a corner portion of a lower portion of the battery cell case directly adjacent to the first battery cell is thicker than a wall thickness (t12) of the battery cell case directly downward of a longitudinal-direction axis (A1) of the first battery cell.

* * * * *